United States Patent
Jana et al.

(10) Patent No.: US 9,495,870 B2
(45) Date of Patent: Nov. 15, 2016

(54) VEHICULAR COMMUNICATIONS USING A SCALABLE AD HOC GEOGRAPHIC ROUTING PROTOCOL

(75) Inventors: Rittwik Jana, Parsippany, NJ (US); Vaneet Aggarwal, Parsippany, NJ (US); Josh Auzins, Madison, NJ (US); Robert Hall, Berkeley Heights, NJ (US); Rajesh Panta, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/277,895

(22) Filed: Oct. 20, 2011

(65) Prior Publication Data

US 2013/0099941 A1    Apr. 25, 2013

(51) Int. Cl.
| | |
|---|---|
| *G08G 1/09* | (2006.01) |
| *G08G 1/0967* | (2006.01) |
| *G08G 1/14* | (2006.01) |
| *H04W 4/02* | (2009.01) |
| *H04W 4/04* | (2009.01) |

(52) U.S. Cl.
CPC ........ *G08G 1/093* (2013.01); *G08G 1/096716* (2013.01); *G08G 1/096758* (2013.01); *G08G 1/096791* (2013.01); *G08G 1/143* (2013.01); *G08G 1/144* (2013.01); *H04W 4/021* (2013.01);
(Continued)

(58) Field of Classification Search
CPC .................... G08G 1/161; G08G 1/093; G08G 1/143–1/144; G08G 1/096708–1/096791; H04L 67/12; B60N 2/2863; B60W 10/06; B60W 10/18; H04W 4/02; H04W 4/021–4/046; H04W 84/18; A63F 13/12; A63F 13/216; A63F 2300/406
USPC ..................... 340/901–905, 932.2, 933–936, 340/988–996; 701/117, 300, 532; 455/3.01,
(Continued)

(56) References Cited

U.S. PATENT DOCUMENTS

| | | |
|---|---|---|
| 5,483,667 A | 1/1996 | Faruque |
| 6,015,344 A | 1/2000 | Kelly et al. |

(Continued)

FOREIGN PATENT DOCUMENTS

WO    WO 2007/016641 A2    2/2007

OTHER PUBLICATIONS

Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.

(Continued)

*Primary Examiner* — Hai Phan
*Assistant Examiner* — Orlando Bousono
(74) *Attorney, Agent, or Firm* — Baker & Hostetler LLP

(57) ABSTRACT

Vehicle-to-vehicle and vehicle-to-infrastructure communications are accomplished via a scalable ad hoc geographic routing protocol. As vehicles move along roadways, they can query other vehicles and entities for information. Responses to queries can be used to determine information such as traffic conditions, a retail store sale, that a restaurant has tables available, and/or that parking spaces are available, for example. Businesses, vehicles, and other entities along roadways can geocast pertinent information to vehicles passing by. Vehicles can cache information as it is received.

20 Claims, 40 Drawing Sheets

(52) U.S. Cl.
CPC ............. *H04W 4/023* (2013.01); *H04W 4/027* (2013.01); *H04W 4/046* (2013.01)

(58) Field of Classification Search
USPC ...... 455/3.05–3.06, 41.2–41.3, 456.1–456.3, 455/456.6, 457, 117, 300, 532
See application file for complete search history.

(56) References Cited

U.S. PATENT DOCUMENTS

| | | | |
|---|---|---|---|
| 6,069,885 A | 5/2000 | Fong et al. | |
| 6,119,976 A | 9/2000 | Rogers | |
| 6,195,751 B1 | 2/2001 | Caronni | |
| 6,304,556 B1 | 10/2001 | Haas | |
| 6,628,620 B1 | 9/2003 | Cain | |
| 6,781,971 B1 | 8/2004 | Davis et al. | |
| 6,807,165 B2 | 10/2004 | Belcea | |
| 6,816,460 B1 | 11/2004 | Ahmed et al. | |
| 6,870,846 B2 | 3/2005 | Cain | |
| 6,873,613 B1 | 3/2005 | Dent | |
| 6,879,574 B2 | 4/2005 | Naghian et al. | |
| 6,909,706 B2 | 6/2005 | Wilmer et al. | |
| 6,937,602 B2 | 8/2005 | Whitehill et al. | |
| 6,940,832 B2 | 9/2005 | Saadawi et al. | |
| 6,954,435 B2 | 10/2005 | Billhartz et al. | |
| 6,958,986 B2 | 10/2005 | Cain | |
| 7,027,822 B1 | 4/2006 | Hwang et al. | |
| 7,152,110 B2 | 12/2006 | Pierce | |
| 7,179,166 B1 | 2/2007 | Abbott | |
| 7,197,326 B2 | 3/2007 | Acampora | |
| 7,295,521 B2 | 11/2007 | Choi et al. | |
| 7,307,978 B2 | 12/2007 | Carlson | |
| 7,435,179 B1 | 10/2008 | Ford | |
| 7,525,933 B1 | 4/2009 | Hall | |
| 7,540,028 B2 | 5/2009 | Ahmed et al. | |
| 7,613,467 B2 | 11/2009 | Fleischman | |
| 7,669,052 B2 | 2/2010 | Asano et al. | |
| 7,813,326 B1 | 10/2010 | Kelm et al. | |
| 7,864,168 B2 | 1/2011 | French | |
| 7,917,169 B1 | 3/2011 | Hall | |
| 7,957,390 B2 | 6/2011 | Furlong et al. | |
| 7,969,914 B1 | 6/2011 | Gerber et al. | |
| 7,970,749 B2 | 6/2011 | Uhlir et al. | |
| 8,001,189 B2 | 8/2011 | Nielsen et al. | |
| 8,073,327 B2 | 12/2011 | Mayer | |
| 8,074,275 B2 | 12/2011 | Ramaiah et al. | |
| 8,085,813 B2 | 12/2011 | Melick et al. | |
| 8,128,405 B2 | 3/2012 | Preston et al. | |
| 8,149,801 B2 | 4/2012 | Hall | |
| 8,248,367 B1 | 8/2012 | Barney et al. | |
| 8,332,544 B1 | 12/2012 | Ralls et al. | |
| 8,341,271 B2 | 12/2012 | Cho et al. | |
| 8,355,410 B2 | 1/2013 | Hall | |
| 8,359,643 B2 | 1/2013 | Low et al. | |
| 8,376,857 B1 | 2/2013 | Shuman et al. | |
| 8,483,652 B2 | 7/2013 | Hall | |
| 8,599,848 B2 | 12/2013 | Janneteau | |
| 2001/0014094 A1 | 8/2001 | Epley | |
| 2002/0085582 A1 | 7/2002 | Kim | |
| 2002/0141454 A1 | 10/2002 | Muniere | |
| 2002/0155846 A1 | 10/2002 | Shiraga | |
| 2002/0163912 A1 | 11/2002 | Carlson | |
| 2002/0167960 A1 | 11/2002 | Garcia-Luna-Aceves | |
| 2002/0169971 A1 | 11/2002 | Asano et al. | |
| 2003/0074413 A1 | 4/2003 | Nielsen et al. | |
| 2003/0105956 A1 | 6/2003 | Ishiguro et al. | |
| 2003/0145095 A1 | 7/2003 | Liu | |
| 2003/0174690 A1 | 9/2003 | Benveniste | |
| 2003/0193394 A1 | 10/2003 | Lamb | |
| 2003/0235158 A1 | 12/2003 | Lee | |
| 2004/0013062 A1 | 1/2004 | Hino et al. | |
| 2004/0032847 A1 | 2/2004 | Cain | |
| 2004/0083385 A1 | 4/2004 | Ahmed et al. | |
| 2004/0121792 A1 | 6/2004 | Allen et al. | |
| 2004/0151144 A1 | 8/2004 | Benveniste | |
| 2004/0185881 A1 | 9/2004 | Lee et al. | |
| 2004/0213270 A1 | 10/2004 | Su et al. | |
| 2004/0259563 A1 | 12/2004 | Morton et al. | |
| 2005/0036448 A1 | 2/2005 | Leeuwen | |
| 2005/0058151 A1 | 3/2005 | Yeh | |
| 2005/0086350 A1 | 4/2005 | Mai | |
| 2005/0096065 A1* | 5/2005 | Fleischman | 455/456.1 |
| 2005/0129051 A1 | 6/2005 | Zhu et al. | |
| 2005/0152318 A1 | 7/2005 | Elbatt et al. | |
| 2005/0152378 A1 | 7/2005 | Bango et al. | |
| 2005/0243788 A1 | 11/2005 | Janczak | |
| 2005/0254453 A1 | 11/2005 | Barneah | |
| 2005/0259597 A1 | 11/2005 | Benedetto et al. | |
| 2005/0271057 A1 | 12/2005 | Kim et al. | |
| 2006/0013154 A1 | 1/2006 | Choi et al. | |
| 2006/0023677 A1 | 2/2006 | Labrador | |
| 2006/0084444 A1 | 4/2006 | Kossi et al. | |
| 2006/0126535 A1 | 6/2006 | Sherman | |
| 2006/0128349 A1 | 6/2006 | Yoon | |
| 2006/0148516 A1 | 7/2006 | Reddy et al. | |
| 2006/0153157 A1 | 7/2006 | Roh et al. | |
| 2006/0227787 A1 | 10/2006 | Furlong et al. | |
| 2007/0008925 A1 | 1/2007 | Dravida et al. | |
| 2007/0019591 A1 | 1/2007 | Chou et al. | |
| 2007/0019594 A1 | 1/2007 | Perumal et al. | |
| 2007/0104096 A1 | 5/2007 | Ribera | |
| 2007/0110092 A1 | 5/2007 | Kangude et al. | |
| 2007/0180533 A1 | 8/2007 | Ramaiah et al. | |
| 2007/0198731 A1 | 8/2007 | Li et al. | |
| 2007/0217346 A1 | 9/2007 | Zheng | |
| 2007/0259716 A1 | 11/2007 | Mattice et al. | |
| 2007/0259717 A1 | 11/2007 | Mattice et al. | |
| 2007/0263571 A1 | 11/2007 | Hermann et al. | |
| 2007/0265088 A1 | 11/2007 | Nakada et al. | |
| 2007/0265089 A1 | 11/2007 | Robarts | |
| 2007/0266396 A1 | 11/2007 | Estermann | |
| 2007/0283001 A1 | 12/2007 | Spiess et al. | |
| 2007/0287437 A1 | 12/2007 | Cartmell | |
| 2008/0015024 A1 | 1/2008 | Mullen | |
| 2008/0039113 A1* | 2/2008 | Liu et al. | 455/456.1 |
| 2008/0058099 A1 | 3/2008 | Schwartz et al. | |
| 2008/0080401 A1 | 4/2008 | Ribiere | |
| 2008/0144493 A1 | 6/2008 | Yeh | |
| 2008/0147854 A1 | 6/2008 | Van Datta et al. | |
| 2008/0159236 A1 | 7/2008 | Ch'ng | |
| 2008/0163355 A1 | 7/2008 | Chu | |
| 2008/0186206 A1* | 8/2008 | Reumerman | 340/902 |
| 2008/0192737 A1 | 8/2008 | Miyazaki | |
| 2008/0262928 A1 | 10/2008 | Michaelis | |
| 2009/0005140 A1 | 1/2009 | Rose et al. | |
| 2009/0017913 A1 | 1/2009 | Bell et al. | |
| 2009/0030605 A1* | 1/2009 | Breed | 701/208 |
| 2009/0041039 A1 | 2/2009 | Bear | |
| 2009/0045977 A1 | 2/2009 | Bai et al. | |
| 2009/0046628 A1 | 2/2009 | Hall | |
| 2009/0073912 A1 | 3/2009 | Bauchot et al. | |
| 2009/0122753 A1 | 5/2009 | Hughes et al. | |
| 2009/0138353 A1 | 5/2009 | Mendelson | |
| 2009/0175223 A1 | 7/2009 | Hall | |
| 2009/0201860 A1 | 8/2009 | Sherman et al. | |
| 2009/0207783 A1 | 8/2009 | Choi et al. | |
| 2009/0245518 A1 | 10/2009 | Bae et al. | |
| 2009/0248420 A1 | 10/2009 | Basir | |
| 2009/0292926 A1 | 11/2009 | Daskalopoulos et al. | |
| 2009/0298461 A1 | 12/2009 | O'Reilly | |
| 2009/0323579 A1* | 12/2009 | Bai et al. | 370/315 |
| 2009/0325603 A1 | 12/2009 | Van Os et al. | |
| 2010/0008259 A1 | 1/2010 | Yoon et al. | |
| 2010/0029245 A1 | 2/2010 | Wood et al. | |
| 2010/0042601 A1 | 2/2010 | Kelley et al. | |
| 2010/0060480 A1* | 3/2010 | Bai et al. | 340/901 |
| 2010/0064307 A1* | 3/2010 | Malhotra et al. | 725/24 |
| 2010/0067451 A1 | 3/2010 | Hall | |
| 2010/0069109 A1 | 3/2010 | Hall | |
| 2010/0074234 A1 | 3/2010 | Banks et al. | |
| 2010/0082513 A1 | 4/2010 | Liu | |
| 2010/0128653 A1 | 5/2010 | Tateson | |
| 2010/0150129 A1* | 6/2010 | Jin et al. | 370/343 |
| 2010/0162149 A1 | 6/2010 | Sheleheda et al. | |
| 2010/0169009 A1* | 7/2010 | Breed et al. | 701/208 |

(56) References Cited

U.S. PATENT DOCUMENTS

| | | | |
|---|---|---|---|
| 2010/0214987 | A1 | 8/2010 | Mori |
| 2010/0215040 | A1* | 8/2010 | Kappler et al. ............... 370/390 |
| 2010/0226342 | A1 | 9/2010 | Coiling et al. |
| 2010/0235633 | A1 | 9/2010 | Asano et al. |
| 2010/0245124 | A1* | 9/2010 | Bai et al. ...................... 340/905 |
| 2010/0248618 | A1* | 9/2010 | Bai et al. ..................... 455/11.1 |
| 2010/0248843 | A1 | 9/2010 | Karsten |
| 2010/0250106 | A1* | 9/2010 | Bai et al. ...................... 701/117 |
| 2010/0250346 | A1* | 9/2010 | Bai et al. ..................... 705/14.1 |
| 2010/0279776 | A1 | 11/2010 | Hall |
| 2010/0287011 | A1 | 11/2010 | Muchkaev |
| 2010/0304759 | A1 | 12/2010 | Leppanen et al. |
| 2010/0329463 | A1 | 12/2010 | Ratliff et al. |
| 2011/0002243 | A1 | 1/2011 | Sherman et al. |
| 2011/0081973 | A1 | 4/2011 | Hall |
| 2011/0102459 | A1 | 5/2011 | Hall |
| 2011/0103302 | A1 | 5/2011 | Hall |
| 2011/0105151 | A1 | 5/2011 | Hall |
| 2011/0177829 | A1 | 7/2011 | Platt et al. |
| 2011/0201369 | A1 | 8/2011 | Kim et al. |
| 2011/0230202 | A1 | 9/2011 | Wood et al. |
| 2011/0244887 | A1 | 10/2011 | Dupray et al. |
| 2012/0058814 | A1 | 3/2012 | Lutnick et al. |
| 2012/0079080 | A1 | 3/2012 | Pishevar |
| 2012/0084364 | A1 | 4/2012 | Sivavakeesar |
| 2012/0128010 | A1 | 5/2012 | Huang et al. |
| 2014/0082369 | A1 | 3/2014 | Waclawsky et al. |
| 2014/0100027 | A1 | 4/2014 | Harris et al. |

OTHER PUBLICATIONS

U.S. Appl. No. 13/683,025, filed Nov. 21, 2012, Panta.
U.S. Appl. No. 13/712,353, filed Dec. 12, 2012, Hall.
U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.
U.S. Appl. No. 13/169,829, filed Jun. 27, 2011, Hall.
Ko et al., "Geocasting in Mobile Ad Hoc Networks: Location-based Multicast Algorithms", Technical Report TR-98-018 Texas A&M University, Sep. 1998.
Ko, et al., "Flooding-Based Geocasting Protocols for Mobile Ad Hoc Networks," Mobile Networks and Applications, Dec. 2002, 7, 471-480.
Hall et al., "A Two-Level Quality of Service Scheme for Collision based on Mobile Ad Hoc Networks", IEEE, 1-4244-1513-06/07, 2007, 8 pages.
Hall, "RTEQ: Modeling and Validating Infinite-State Hard-Real-Time Systems", AT&T Labs Research, ASE 2007, Nov. 2007, 4 pages.
Hall, "Cheating Attacks and Resistance Techniques in Geogame Design," Proc. 2010 ACM FuturePlay Symposium, 2010,82-89.
Hall, "An Improved Geocast for Mobile Ad Hoc Networking," IEEE Transactions on Mobile Computing, 2010, 14 pages.
Illyas, "Body Personal, and Local Ad Hoc Wireless Networks", Chapter 1, CRC Press, 2003, 22 pages.
Liao et al., "GRID: A Fully Location-Aware Routing Protocol for Mobile Ad Hoc Networks", Telecommunication Systems, 2001, 18, pp. 1-26.
Shih et al., A Distributed Slots Reservation Protocol for QoS Routing on TDMA-based Mobile Ad Hoc Networks, 2004, (ICON 2004), Proceedings, 12th IEEE International Conference, Nov. 2004, 2, 660-664.
Shih et al., "CAPC: A Collision Avoidance Power Control MAC Protocol for Wireless Ad Hoc Networks", IEEE Communications Letters, Sep. 2005, 9(9), 859-861.
Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.
Corbett, et al. "A Partitioned Power and Location Aware MAC Protocol for Mobile Ad Hoc Networks," Technical Report No. 553, University of Sydney, School of Information Technologies, Jul. 2004, 7 pages.
Panta, "GeoV2V: Vehicular Communications Using a Scalable Ad Hoc Geocast Protocol," AT&T Labs Research, 14 pages.
Balasubramaniam, et al. "Interactive WiFi Connectivity for Moving Vehicles," Proceedings of SIGCOMM, Aug. 17-22, 2008, 12 pages.
Maihofer, "A Survey of Geocast Routing Protocols," IEEE Communications Surveys, 6 (2), Jun. 2004, 32-42.
Das, et al., "SPAWN: A Swarming Protocol for Vehicular Ad-Hoc Wireless Networks," Proceedings of 1st ACM Vanet, Oct. 2004, 2 pages.
German Aerospace Center, "SUMO Simulation of Urban Mobility," http://sumo.sourceforge.net/, 2010.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Heissenbëttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem in a Mobile Ad Hoc Network," Proceedings of the 5th Annual ACM/IEEE International Conference on Mobile Computing and Networking, ACM, 1999, 151-162.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.
Niculescu, et al., " Trajectory Based Forwarding and Its Applications," Proc. Mobicom 2003, ACM, 2003, 13 pages.
Ns-2, "The Network Simulator," http://isi.edu/nsnam/ns, 2010.
Schwingenschlogl, "Geocast Enhancements of AODV for Vehicular Networks," ACM SIGMOBILE Mobile Computing and Communications Review, Jun. 2002, 18 pages.
Shevade, et al., "Enabling High-Bandwidth Vehicular Content Distribution," Proceedings of CoNEXT 2010, Nov. 30-Dec. 3, 2010, 12 pages.
Yassein, et al., "Performance Analysis of Adjusted Probabilistic Broadcasting in Mobile Ad Hoc Networks," Proc. 11th Intl. Conf. on Parallel and Distributed Systems Workshops, 2005, 27 pages.
Zahn, et al., "Feasibility of Content Dissemination Between Devices in Moving Vehicles," Proceedings of CoNEXT 2009, Dec. 1-4, 2009, 11 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.
Social + Gaming—SWiK: http://swik.net/social+ gaming.
http://askville.amazon.conn/Wii-games-play-Internet-Family/AnswerViwer.do?requestId=6796582(2007).
Schutzberg, "Phone-based GPS-based Games: Missing Pieces"; http://www.directionsmag.com/articlephp?article_id=939 (Aug. 17, 2005).

(56) References Cited

OTHER PUBLICATIONS

"Boost Mobile introduces First Location-based, GPS games in US" http://www.physorg.corm/news5824.html (Aug. 16, 2005).
"Sony bigwig hints at GPS-enabled PSP games"; http:www.vespacious.com/sony-bigwig-hints-at-gps-enabled-psp-games,html (Dec. 22, 2008).
Steve:"GPS-enabled Cell Phone Games" http://www.strangenewproducts.com/2005/08/gps-enabled-cell-phone-games.html (Aug. 15, 2005.
Location-Enabled Mobile Gaming; http://www.nn4d.com/site/global/market/affiliate_sites/Ibsglobe/Ibsapplications/mobilegaming.jsp (2007).
U.S. Appl. No. 13/327,472, filed Dec. 15, 2011, Hall.
U.S. Appl. No. 13/333,084, filed Dec. 21, 2011, Hall.
U.S. Appl. No. 13/890,423, filed May 9, 2013, Hall.
U.S. Appl. No. 13/875,735, filed May 2, 2013, Hall.
Nicklas, D., and Mitschang, B., "On building location aware applications using an open platform based on the NEXUS Augmented World Model." Software and Systems Modeling, 2004, 3, 303-313.
Nintendo, The computer game "Mario Kart DS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.
Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.
Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
bzflag(6):tank battle game—linux man page, Google date Feb. 1, 2001, downloaded from http://linux.die.net/man/6/bzflag.
de Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14 pages, downloaded from http://www.dialogic.com/~/media/products/docs/signaling-and-ss7-components/9862_Add_Locationbased_Servs_an.pdf.
Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.
Hales, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.asp?ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.
Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based multi-user gaming", Proceedings of Computer Games and Digital Cultures Conference, Tampere University Press, 2002, pp. 35-44.
U.S. Appl. No. 14/338,962, filed Jul. 23, 2014, Hall.
U.S. Appl. No. 14/279,441, filed May 16, 2014, Hall.
Hall, "Combinatorial Communications Modeling of Real-Time Engagement Adjudication Architectures", 2005 IEEE Military Communications Conference, Oct. 2005, vol. 3, 1488-1494.
Harris, RF-6920 C2CE-CNR Situational Awareness Application Brochure, downloaded from http:/ /rf. harris.com/media/R F-6920 tcm26-9172.pdf, Nov. 2008, 2 pages.
Kaplan, et al., "The Analysis of a Generic Air-to-Air Missile Simulation Model", NASA Technical Memorandum 109057, Jun. 1994, 48 pages.
Trivette, Sensor integration for the One Tactical Engagement Simulation System (One TESS), downloaded from http://vault.swri .org/cms/papers/3793 Presentation_2005 SensorsGov OneTESS.pdf, 2006, 28 pgs.

\* cited by examiner

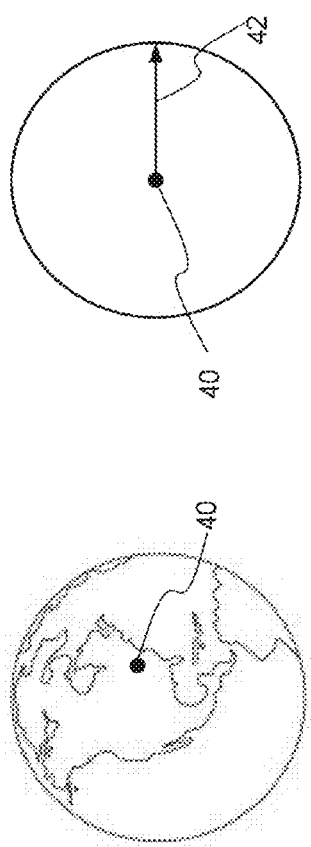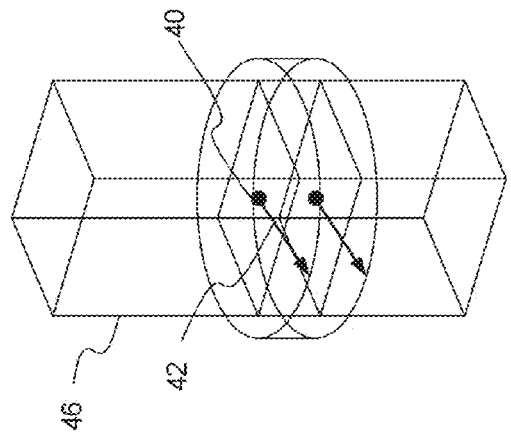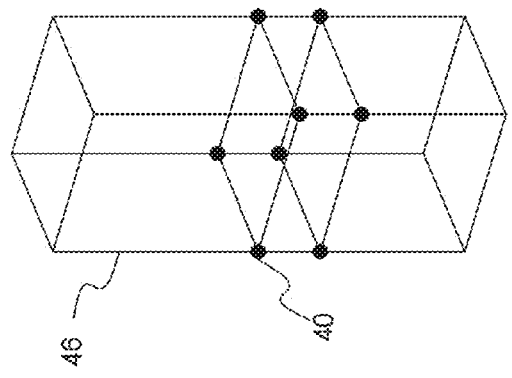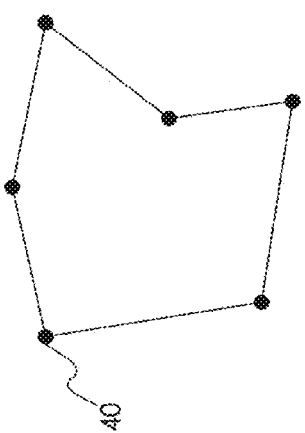
FIGURE 4

Table 1: Experimental and Simulation Results

| Run | # Devices | Max Speed | Targets | PS Hit % | Simulation | % Difference | Targets | UAV Hit % | Simulation | % Difference |
|---|---|---|---|---|---|---|---|---|---|---|
| 1 | 12 | 16 | 803 | 94.5 | 99.4 | 5.2 | 22.6 | 86.3 | 98.3 | 12.2 |
| 2 | 12 | 10 | 1111 | 99.6 | 98.5 | -0.1 | 41.4 | 92.6 | 100.0 | 8.0 |
| 3 | 12 | 5 | 1166 | 99.9 | 97.9 | -2.0 | 36.8 | 94.0 | 102.0 | 8.5 |
| 4 | 12 | 10 | 2680 | 97.7 | 99.9 | 2.3 | 89.3 | 90.0 | 92.9 | 3.2 |
| 5 | 9 | 10 | 1976 | 98.3 | 98.5 | 0.2 | 75.9 | 87.3 | 88.4 | 1.3 |
| 6 | 6 | 10 | 0 | — | — | — | 44.5 | 97.7 | 85.5 | -12.5 |
| Overall | — | — | 7716 | 98.1 | 99.1 | 1.0 | 310.5 | 91.0 | 93.0 | 4.3 |

FIGURE 8

Table 2

| Run | # of nodes | # Total unique Geocasts | # Total Tx. | # Tx per Geocast | # Tx Flooding |
|---|---|---|---|---|---|
| 1 | 12 | 2136 | 15051 | 6.885 | 12 |
| 2 | 12 | 1402 | 9590 | 6.84 | 12 |
| 3 | 12 | 2215 | 15189 | 6.857 | 12 |
| 4 | 12 | 5007 | 35184 | 7.027 | 12 |
| 5 | 9 | 4186 | 26903 | 6.427 | 9 |
| 6 | 6 | 805 | 4413 | 5.482 | 6 |

FIGURE 9

Table 3

| Metric/Parameter | Variable | Definition |
|---|---|---|
| Geocast region | $G$ | 20m |
| Radius of geocast region | $r_{gr}$ | 50m to 500m |
| Geocast Length | $G_L$ | 100m |
| Radio range | $R_{tr}$ | 2 |
| M-heuristic | $M$ | 40m |
| T-heuristic | $T$ | 1 |
| R-heuristic | $R$ | |
| Feasible Targets | $N_f$ | # of nodes having network connection to originator |
| Out of bound | $N_{ob}$ | # of nodes moved out of G |
| Non target hits | $N_{none}$ | # of new nodes moved into G |
| Total Hits | | |
| Hit% | $\frac{T_{hits}}{N_f} \times 100$ | |

FIGURE 11

|  | Sparse Network | Dense Network |
|---|---|---|
| SAGP | $O(k/c)$ | $O(k/c)$ |
| Flooding | $O(k/c)$ | $O(kn)$ |

FIGURE 17

ted the message, and determining if an originator's neighbor has received the first transmission of a geocast message.

VEHICULAR COMMUNICATIONS USING A SCALABLE AD HOC GEOGRAPHIC ROUTING PROTOCOL

TECHNICAL FIELD

The technical field generally relates to communications and more particularly to inter-vehicular communications, and even more particularly to inter-vehicular communications utilizing an ad hoc geographic routing (geocast) protocol.

BACKGROUND

There are a myriad of situations in which it would be helpful to know what lies ahead or to know the conditions at a location other than a current location. For example, imagine the frustration of being stuck on a highway with traffic jammed for miles ahead. It would be convenient to determine, in real time, before becoming stuck in the jam, that a traffic jam exists and its location. It could be helpful to know if alternative routes exist. It also could be helpful to receive suggestions and comments about the traffic jam (e.g., accident, construction, etc.).

Or, imagine the frustration of trying to find a parking space when a parking lot is full. It could be helpful to determine in real time if and where parking spaces exist.

SUMMARY

Systems and methods for providing location based services with particular applications to vehicular networks are described herein. In example embodiments, a scalable ad hoc geographic routing protocol (SAGP) is utilized to facilitate vehicle-to-vehicle (V2V) and vehicle to infrastructure (V2I) communications. SAGP is particularly useful for sending messages to a group of vehicles in a specified geographic region. The application of the SAGP to facilitate V2V communications is referred to herein as GeoV2V. GeoV2V is ad hoc, scalable and can handle communications under high traffic volume. In various embodiments of GeoV2V, multiple heuristics are employed to meet the challenges of implementing vehicle to vehicle communications.

Using a scalable ad hoc wireless geocast protocol to support vehicle-to-vehicle messaging does not swamp a network infrastructure with high overhead messaging, even in very dense traffic jam situations. Also, since it is ad hoc, operating vehicle to vehicle, GeoV2V requires no network coverage. Thus, GeoV2V can work in rural areas lacking wide area network (WAN) coverage or in areas where infrastructure is disabled, such as disaster areas. GeoV2V also can operate independently and separately from a WAN, thereby avoiding overburdening the WAN resources which can therefore be used for other purposes.

In an example embodiment of GeoV2V, an originator geocasts a message one or more times. Each device receiving the geocast message, queues the message for possible retransmission. Each receiving device determines, based on heuristic criteria, whether to retransmit the message. Example heuristic criteria include determining the number of copies of a geocast message received by a device, determining if a device is sufficiently far from all devices that have previously transmitted a copy of the message, determining if a receiving device is closer to the destination of the packet than all devices that have previously transmit-

BRIEF DESCRIPTION OF THE DRAWINGS

FIG. 4, comprising FIG. 4A, FIG. 4B, FIG. 4C, FIG. 4D, and FIG. 4E depicts example geocast regions or boundaries which can be utilized to facilitate inter-vehicle communications utilizing a scalable ad hoc geocast protocol.

FIG. 8 illustrates a table, Table 1, depicting results for both the real world experiments and the simulations of the runs.

FIG. 9 illustrates a table, Table 2, indicting low level statistics measured during the test runs.

FIG. 11 illustrates a table, Table 3, summarizing the meaning of some terms and parameters used in simulation experiments.

depicts the number of hops to the target vehicles, graph (c) depicts time delay to deliver geocast messages to the target vehicles, and graph (d) depicts the number of transmissions per geocast.

FIG. 17 depicts a table summarizing results of a comparison between transmissions for a flooding protocol as compared to the number of transmission for SAGP.

Figure 18:
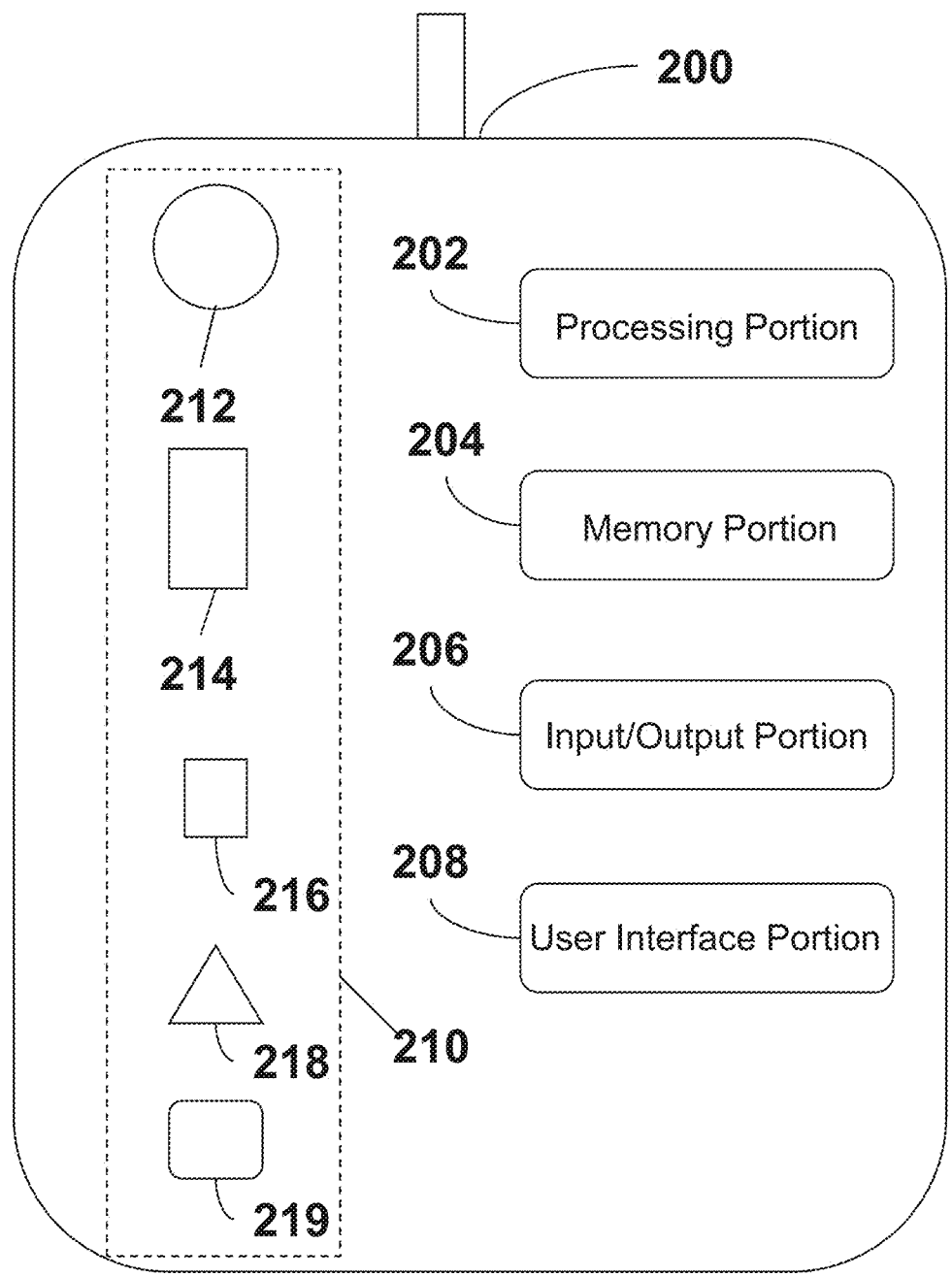

FIG. 18 is a block diagram of an example wireless communications device that is configurable to facilitate GeoV2V.

Figure 19:
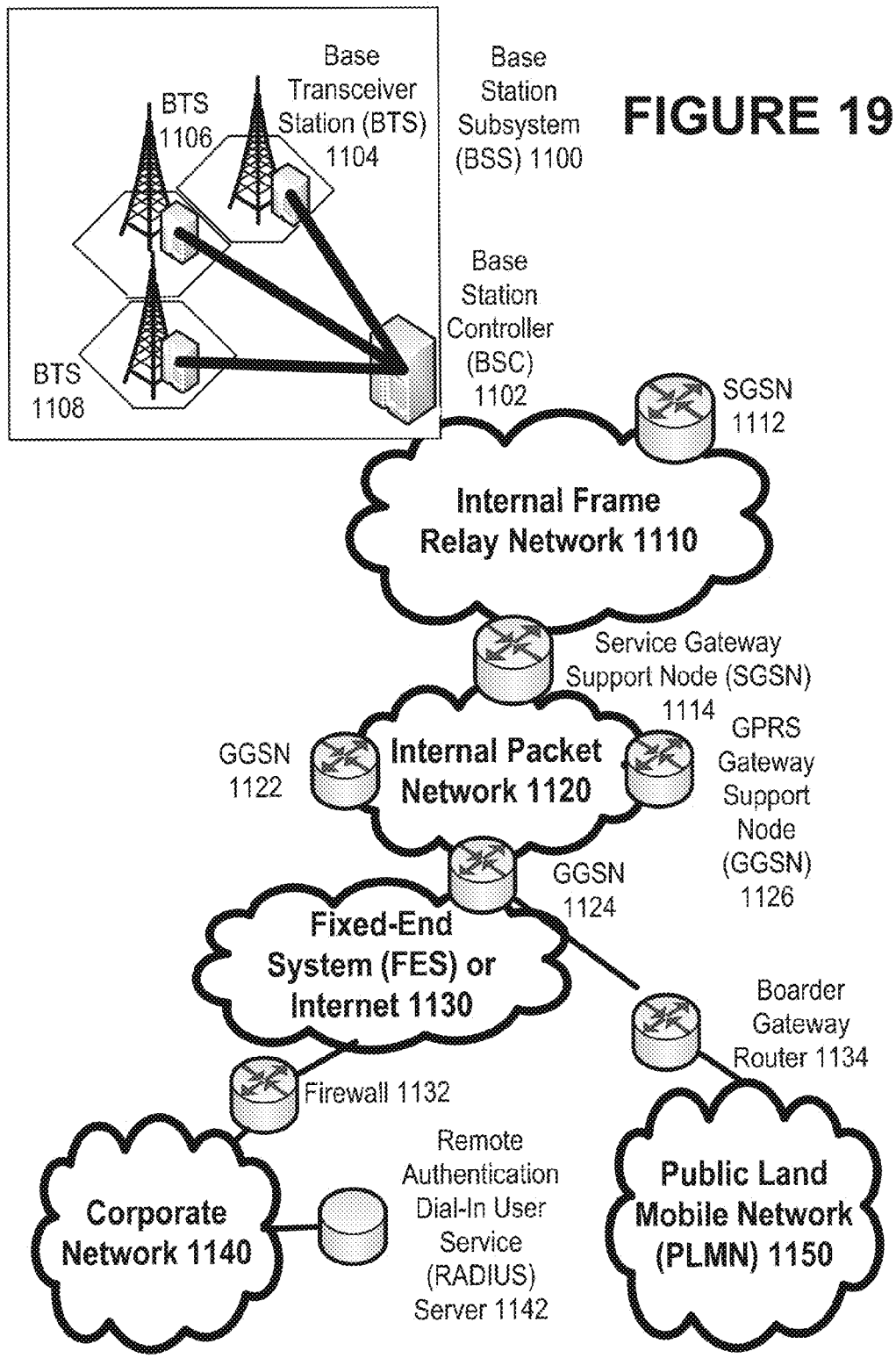

FIG. 19 depicts an overall block diagram of an exemplary packet-based mobile cellular network environment, such as a GPRS network, within which a mobile device configured to facilitate GeoV2V can be implemented.

Figure 20:
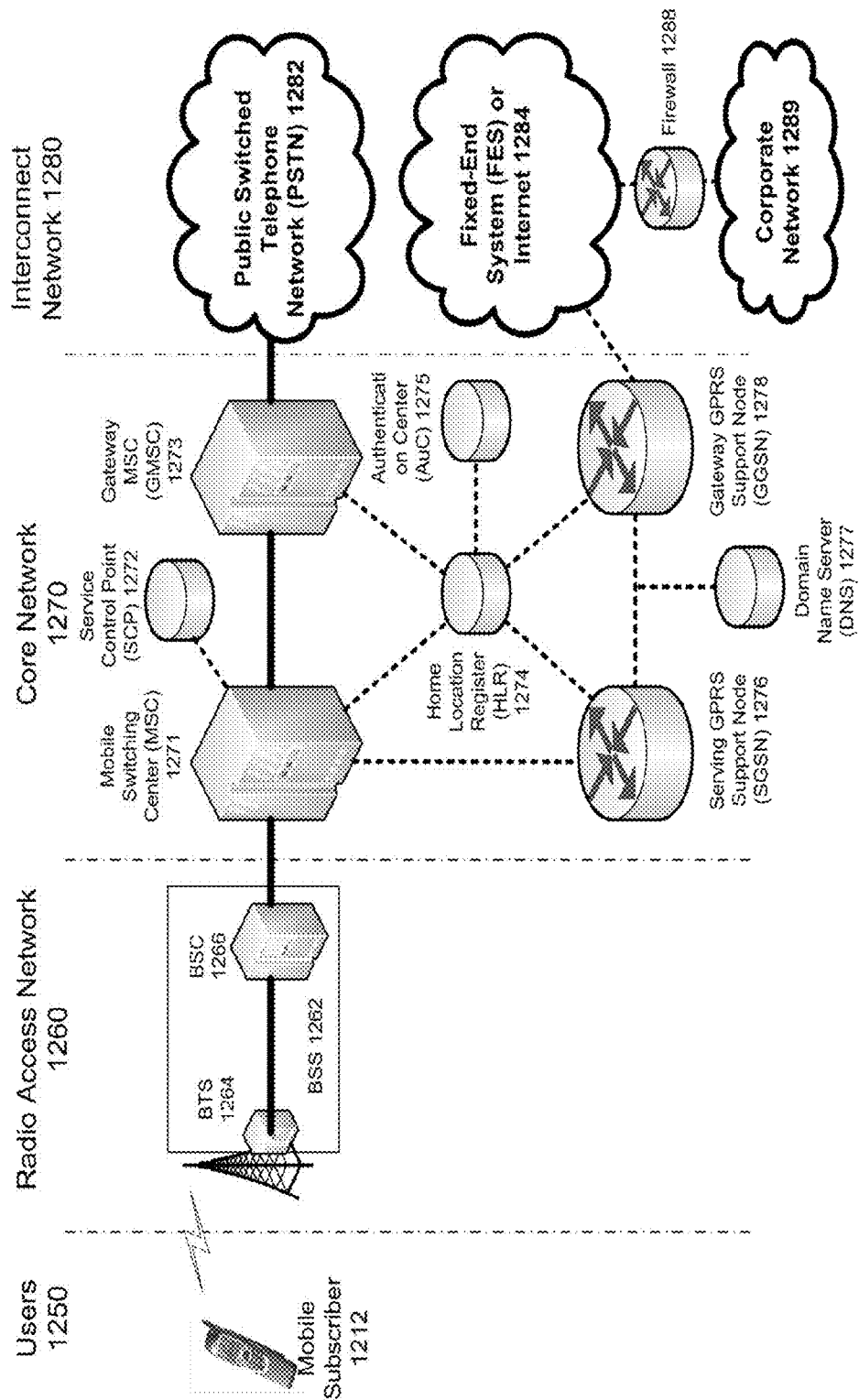

FIG. 20 illustrates an architecture of a typical GPRS network within which a mobile device configured to facilitate GeoV2V can be implemented.

Figure 21:
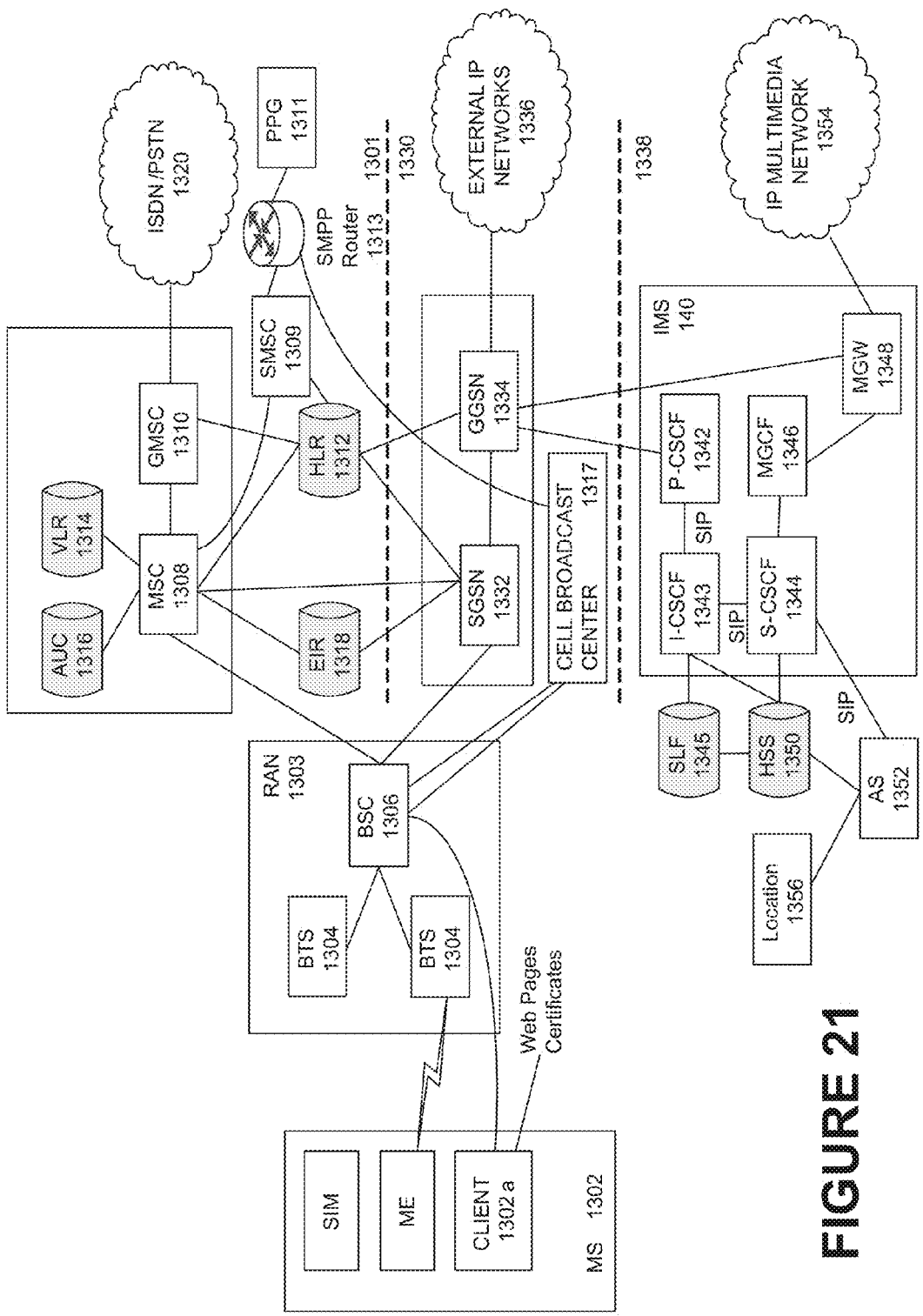

FIG. 21 illustrates an exemplary block diagram view of a GSM/GPRS/IP multimedia network architecture within which a mobile device configured to facilitate inter-vehicle communications utilizing a scalable ad hoc geocast protocol can be implemented.

Figure 22:
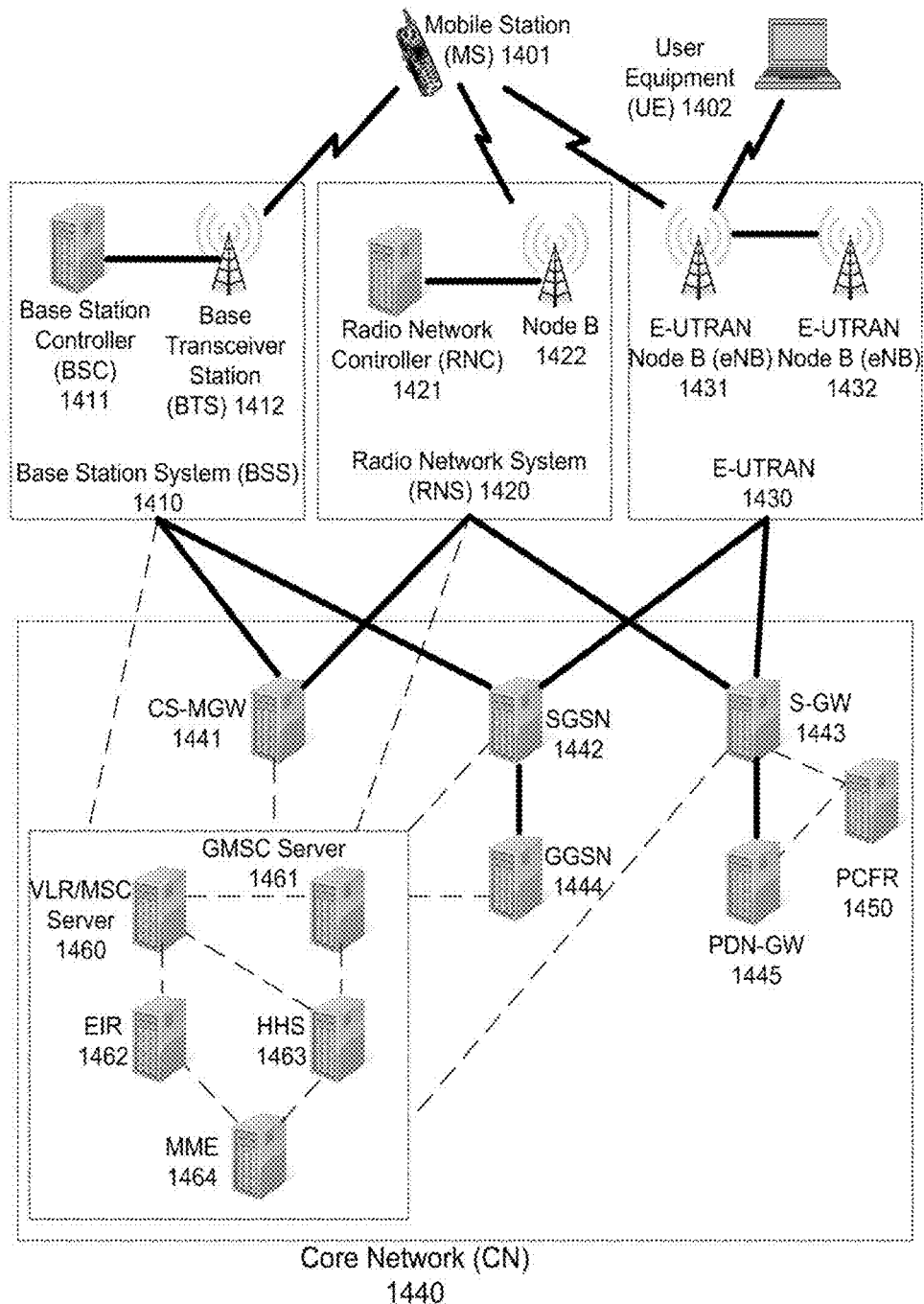

FIG. 22 illustrates a PLMN block diagram view of an exemplary architecture in which a mobile device configured to facilitate inter-vehicle communications utilizing a scalable ad hoc geocast protocol may be incorporated.

DETAILED DESCRIPTION OF ILLUSTRATIVE EMBODIMENTS

Location based services with particular application to vehicles are described herein. A geographic routing (also referred to herein as geocast) protocol is utilized to facilitate vehicle-to-vehicle communications and vehicle-to-infrastructure communications. The geocast protocol is scalable and ad hoc, and accordingly referred to as a scalable ad hoc geographic routing protocol, SAGP.

There are challenges associated with implementing viable vehicle-to-vehicle (V2V) communications. For example, due to the highly mobile and dynamic nature of moving vehicles, there is a high link breakage rate of moving vehicles and networks. Also, there may be incomplete infrastructure coverage such as in urban canyons, in a tunnel, or out in rural areas (e.g., country side, mountains, etc.). And, there may be high variability in vehicular density. For example, one can be in a traffic jam where there may be hundreds of vehicles in a given area or vehicular density can be very sparse in fast flowing highway.

As described herein, GeoV2V, a novel V2V system, enables a mobile or an embedded device in a vehicle to communicate with devices located in a particular geographic area (also referred to herein as a geocast region) without using any fixed infrastructure. In example embodiments, GeoV2V can support highly mobile vehicles, high data rates (e.g., at least 1 Mbps), short ranges (1 to 2 miles), and multi-channel communications to support multiple simultaneous communication groups. In an example embodiment, GeoV2V uses a geographic routing scheme that provides an efficient message suppression mechanism in dense networks to avoid redundant multiple transmissions from devices. GeoV2V also provides reliability in sparse networks by choosing appropriate devices (nodes) to forward packets so that the geocast message has a better chance of reaching its destination. GeoV2V is applicable to high vehicle mobility conditions because it provides robustness against rapid network topology changes by selecting packet forwarding paths on the fly. GeoV2V is stateless. That is, GeoV2V does not need to maintain states, such as, for example, a neighbor table, routing information, etc. Under high mobility cases, these states change very rapidly. And attempting to maintain such states at a high frequency of topology change can render a stateful approach ineffective. GeoV2V does not require traditional network coverage. For example, GeoV2V can work in rural areas lacking wide area network (WAN) cellular coverage and in networks that are heavily congested. GeoV2V can operate without relying on a WAN altogether, thereby avoiding overburdening the WAN resources which can therefore be used for other purposes. Being wireless, GeoV2V requires no connections to fixed infrastructure nodes, servers in the Internet, or any other such costly installations.

GeoV2V utilizes a scalable ad hoc geocast protocol (SAGP) that provides an efficient and reliable delivery of information to a group of destination vehicles/nodes in a network identified by their respective geographical locations. In various example applications utilizing GeoV2V, businesses and other entities along roadways can geocast pertinent information, such as operating hours, real-time availability of parking, sales, wait times at restaurants, etc., to vehicles passing by. The vehicles can cache this information as it is received. As vehicles move along roadways, they can query vehicles traveling near them (for example, vehicles moving in the opposite direction). Thus, it could be determined if there are parking spots available at a train station, mall, restaurant, down town, etc., for example. Similarly, a choice of a restaurant can be determined based on what deals are being offered and/or crowding conditions. SAGP can form the basis of an ad hoc social networking capability among vehicles.

For example, revisiting the foregoing traffic jam scenario, a driver may issue a query (e.g., by voice or text menu selection), such as "Show traffic conditions ahead for five miles from exit 33". The SAGP enabled source node can formulate a query message and geocast the query message to all vehicles currently located within the road boundaries ahead for several miles (e.g., 5 miles). The query can be responded to by each recipient vehicle with a message that includes its position and speed, etc. The originator's device can integrate the response information and provide a real time rendering (e.g., visual display and/or audible description, etc.) of vehicle flow over the next five miles. The rendering can indicate the beginning and end of traffic jams.

In another example application of GeoV2V, a point and click mechanism can be utilized to facilitate point-to-point communications. A driver with an appropriately configured (GeoV2V configured) installed on his/her mobile device could point the mobile device at another vehicle and "shoot" a message (e.g., query). This also could have applications in location-based advertising, for example, wherein the message is an advertisement or the like.

The performance of GeoV2V in both simulated and real world tests using an application suite running on mobile devices is described herein. Experiments were parameterized by varying the number of vehicles and speeds of vehicles. Field deployment results indicate that the number of transmissions per geocast message is kept low, significantly outperforming conventional flooding algorithms and at the same time maintaining a high (over 90%) percentage of successful transmissions. Further, it is analytically shown that throughput scales as a function of node density (sparse network to highly dense networks). That is, the achievable sum throughput increases with increase in the area of the destination region.

As previously mentioned, GeoV2V uses a scalable ad hoc geocast protocol to facilitate communications between vehicles. Geocast is a network primitive supporting geographic addressing of messages. In an example embodiment, a device addresses each packet with a description of a physical area, such as, for example, a circle defined by the latitude and longitude of its center and its radius. The network can transfer the message to all devices (if any) currently located in that area. Packets are relayed from device to device using ad hoc networking techniques that do not require connection to infrastructure networks or base stations. In addition to the advantage of using ad hoc networking, supporting remote and naturalistic venues, the geocast protocol is scalable with a number of devices. Additionally, the geocast protocol can be used with long range networking if available, within the context of a tiered geocast protocol that allows long distance communications between vehicles.

To better understand GeoV2V, a description of geocasting is provided. In an example embodiment, geocasting refers to addressing, transferring, and delivering a message (e.g., query, response, etc.) via a network in accordance with a geocast protocol wherein the address comprises a geocast region, and/or other conditions. Geocasting provides the ability to transfer a message, via a geocast protocol, from a sender to each member of a set of devices currently occupying the geocast region and, if applicable, satisfying appropriate conditions. Geocasting can provide very efficient tracking of sets of devices. Geocasting allows a network to propagate a message completely without need for any centralized server based on local device information.

Geocasting is particularly suited to facilitating communications between vehicles without requiring connection to an infrastructure-based communications network. A mobile ad hoc network is an example of such a set of devices. Mobile ad hoc networks extend the reach of data networking into areas and scenarios in which infrastructure-based networking is impossible or impractical. Mobile ad hoc networks can allow networking among low resource nodes by allowing units to relay each other's short-range transmissions, instead of each unit transmitting long range directly to the destination.

Geocast protocols differ from a traditional Internet protocol (IP) such as the uniform datagram protocol (UDP) in that messages are addressed to a destination geocast region instead of an IP address, such as an UDP address. Utilizing the geocast protocol, devices in a target area do not need to register to a group address, as required of some other protocols. In some example embodiments, each geocast data packet is assigned, at origination, a globally unique packet serial number. The unique packet serial number is read by participating devices according to the protocol to, for example, determine whether a particular data packet is being received for a first time or has been received before. The packet serial number and all other packet information may be positioned in a header or body of the data packet.

Geocasting may be implemented with existing network infrastructure. Although basic geocasting via a single network (e.g., long-range network) enables communications in some situations where traditional networking is impractical or inadequate, it is in some embodiments preferable to selectively geocast over one or more of two or more networks (i.e., tiers) versus the flat configuration of a single network. The tiered geocast protocol provides the heuristics, or decision rules, for selectively propagating geocast data packets within a relatively short-range, peer-to-peer network, and bridging packets onto a long-range network for long-distance transport depending on various circumstances. In this example embodiment, each participating device and other device can implement forwarding rules, including geographical parameters, and a look-up table for use in implementing the rules.

In one embodiment, the geocast system is configured such that a transmitting device receives a confirmation that a geocast data packet was transmitted successfully. For example, at least one of the devices in a geocasting destination region, even if not a device actively participating in responding to a query, could return a geocast confirmation data packet indicating that the packet was received by a device in the region. In one contemplated embodiment, although the protocol is based on a geographical address and not a device-specific address, a device-specific address, or other appropriate identifier, of a target device could be included in a geocast and the target device could initiate inclusion in a return geocast data packet of a confirmation of receipt message to the originator of the query.

In addition, in some embodiments, a geocast data packet includes one or more fields, such as in a header or body of the packet, in which information related to a path taken by a packet is recorded. For example, a receiving device receiving a geocast can retrieve data from the geocast header to identify an ordered list of the devices whose transmissions led to the receiving device receiving it. In this way, path discovery is integrated into the transmission process. Any device can also use this information to send a source-routed unicast back to any device along the path, which is termed reverse-path forwarding (RPF).

Although a two-tiered communication system, including a first short-range peer-to-peer network and a long-range network, is described herein, the information acquisition/access via a geocast protocol application of the present disclosure may be implemented in connection with a protocol and communication system using other types of networks as well as or instead of those described herein, and in connection with more than two network tiers.

Propagations over a short-range network are made between devices programmed with the geocast protocol, whereby adjacent devices are within range of each other, such as, for example, radio range (e.g., 100 meters). In example embodiments, the devices and geocast protocol are configured to transmit geocast data packets over one or more short-range networks, including existing wireless local area networks (WLANs), such an IEEE 802.11 network, or the like. As an example, when a first device is about 900 meters from an edge of a geocasting region including a second device, a geocast data packet from the first device could be geocasted and participating intermediate devices could receive and retransmit the geocast data packet until it reaches the geocast region, without need for transmission over an Internet router or other base station. In this example, depending on the location of a retransmitting device, the geocast data packet can be broadcast to the geocast region in one or two hops.

To better understand inter-vehicle communications via a geocast protocol and applications thereof, a description of mobile ad hoc networks is provided. In an example embodiment, a mobile ad hoc network comprises communications devices (also referred to as nodes, or mobile devices) that communicate with each other via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and is incorporated by reference herein in its entirety. Geocasting uses a protocol in which an IP address is replaced with a geographic address. Thus, each geocast message comprises an indication of a location of a geographic region of intended reception of the geocast message. Generally, a packet is sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. No registration is required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device is capable of receiving and/or transmitting data packets to and/or from other communications devices in the mobile ad hoc network.

In an example embodiment, a communications device transfers packets to other communications devices according to heuristic decision rules that determine whether a receiving device will re-transmit a received packet. These rules effectively guide packets to their destinations and control communication traffic within the ad hoc network. The decision rules achieve this control by using statistics obtained and recorded by a communications device as it receives packets transmitted within reception range within its environment. This distributed packet transfer mechanism results in packets "flowing" to and throughout the geocast region specified in each packet. The communications devices in the geocast region receive and process each distinct packet, typically rendering the content to the user via a user interface of a communications device. Two packets are distinct if they contain distinct geocast identifiers. However, a re-transmitted copy of a packet generally will contain the same geocast identifier as the original packet.

Figure 1:
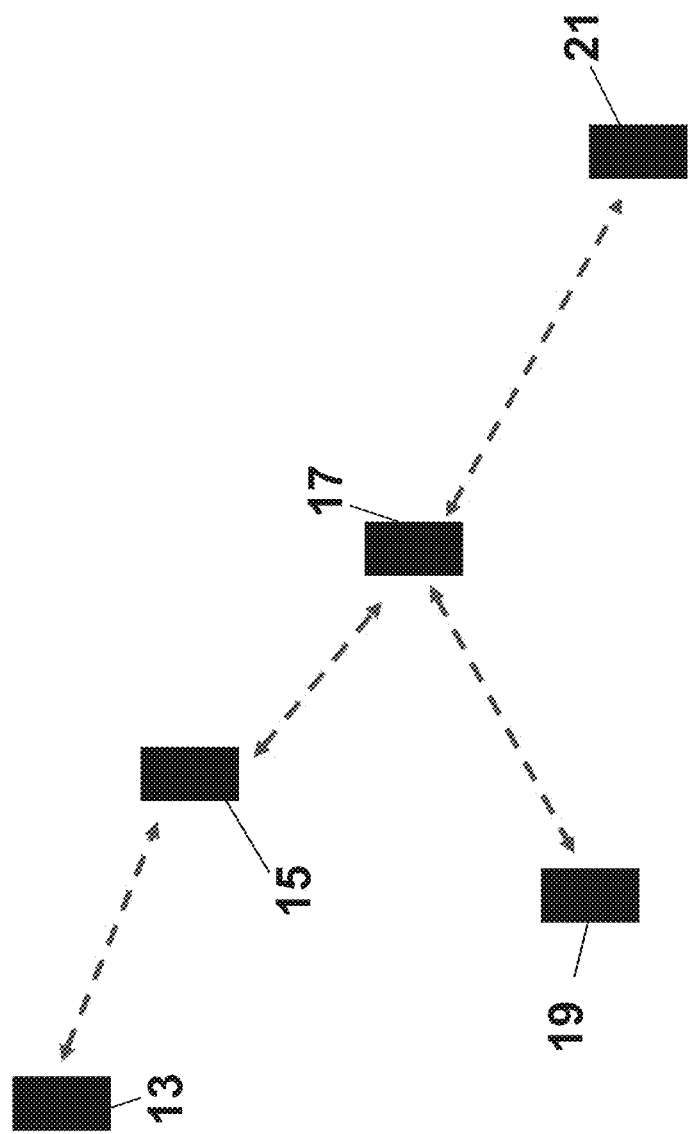
FIG. 1 illustrates an example mobile ad hoc network in which a mobile device configured to facilitate inter-vehicle communications utilizing a scalable ad hoc geocast protocol may be implemented.

FIG. 1 illustrates an example mobile ad hoc network in which a mobile device configured to facilitate inter-vehicle communications utilizing a scalable ad hoc geocast protocol may be implemented. Communications devices, also referred to herein as devices, mobile devices, or nodes, in the mobile ad hoc network can communicate via RF encoded with geographic information, via Bluetooth technology, via WiFI (e.g., in accordance with the 802.11 standard), or the like, or any combination thereof. For example, as depicted in FIG. 1, communication devices 13, 15, 17, 19, and 21 form a mobile ad hoc network. As shown in FIG. 1, communication device 13 communicates with communications device 15 directly (e.g., via Bluetooth). Communication device 15 communicates with communications device 17, and thus can retransmit information received from communications device 13 to communications device 17, and vice versa (retransmit information received from communications device 17 to communications device 13). Communications device 17 communicates with communications devices 19 and 21, and can relay information from/to communications devices 19 and/or 21 to/from communications devices 13 and/or 15.

Although not depicted in FIG. 1, it is possible, in a mobile ad hoc network, that, for a pair of nodes (A and B for example), node A can receive from node B but node B cannot receive from node A. This asymmetric style of communication is potential likely in a mobile ad hoc network.

In an example embodiment, communications devices that receive a message, such as a query or a response, can resend the query/response in accordance with the scalable wireless geocast protocol. For example, a communication device's ability to retransmit a query/response can be based on the number of times the query/response was previously received, the communication device's proximity with respect to the communications devices from which the query/response was sent, and/or the communication device's proximity to the geocast region. This can be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. First, in accordance with the location-based approach, the receiving communication device determines whether it has previously received the same query/response at least a predetermined number (N) of times. If not, it retransmits the query/response over the ad hoc network of communications devices. If so, the communications device progresses to the second step and determines whether the sending communications device is closer than some minimum distance away. If no prior transmitter of the query/response was closer than some minimum distance away, the communications device retransmits the query/response over the ad hoc network of communications devices. Otherwise, the communications device progresses to the third step and determines whether it is closer to the center of the geocast region than any sending communications device from which the query/response was received. If so, the communications device transmits the query/response over the ad hoc network of communications devices. If not, the communications device does not retransmit the query/response.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned above, a mobile ad hoc network does not require a communications network infrastructure or a WiFi access point. However, in an example configuration, a mobile ad hoc network can utilize WiFi access points and/or a communications network infrastructure.

Figure 2:
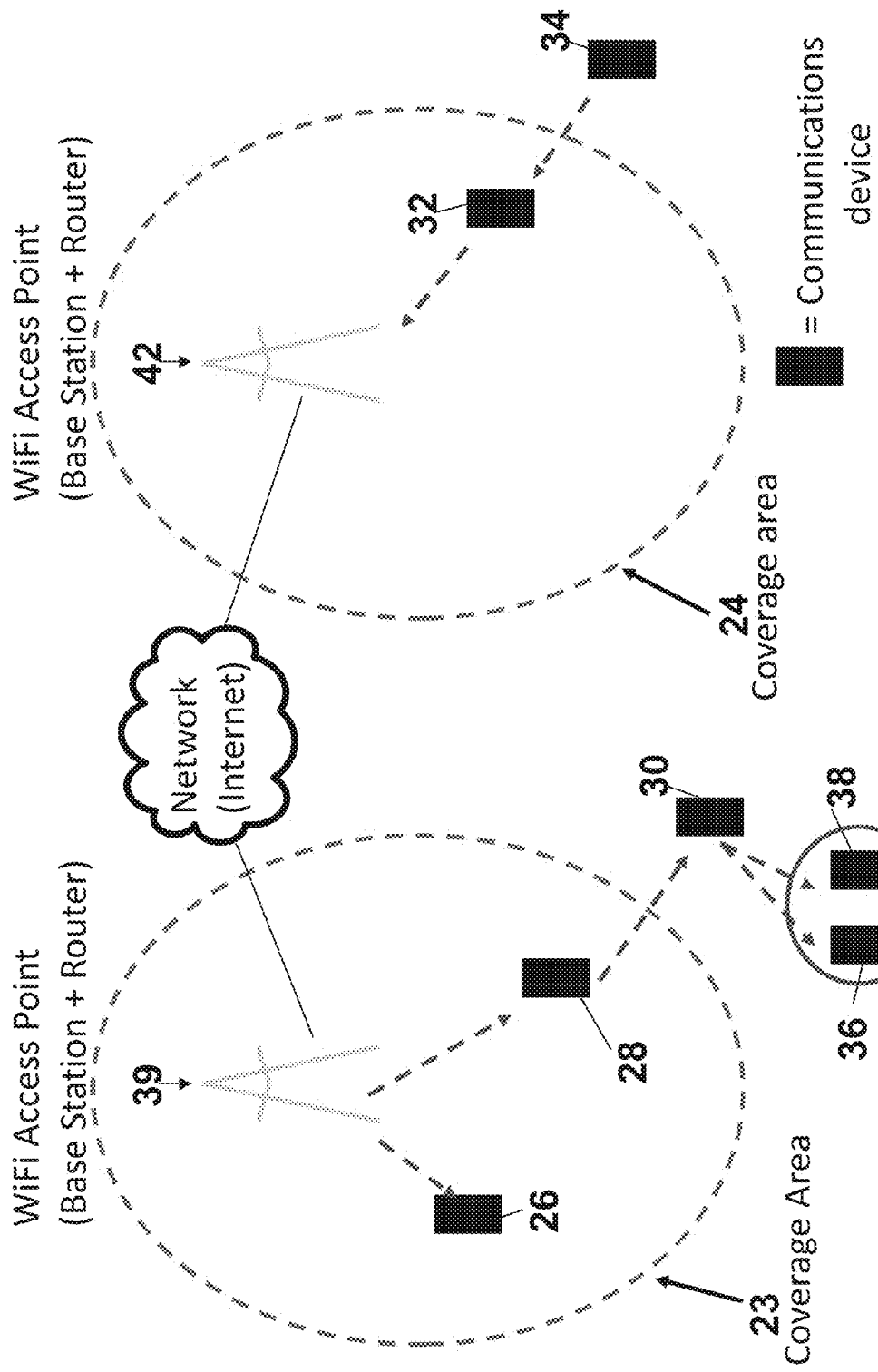
FIG. 2 illustrates an example ad hoc network utilizing a WiFi access point.

FIG. 2 illustrates an example ad hoc network utilizing a WiFi access point. As depicted in FIG. 2, communication devices 26, 28, 30, 36, and 38 form a mobile ad hoc network and communication device 32 and 34 form another mobile ad hoc network. Coverage area 23, which is the area covered by a WiFi access point 39, covers communication devices 26 and 28. Coverage area 24, which is the area covered by another WiFi access point 42 covers communication device 32. As shown in FIG. 2, communication device 34 transmits to communication device 32 directly (e.g., via Bluetooth). Communication device 32 retransmits to a WiFi access point 42 which in turn retransmits to the other WiFi access point 39. Communication devices 26 and 28 receive the transmission from the WiFi access point 39, and communication device 28 retransmits directly to communication device 30. And, as depicted, communication device 30 retransmits to other communication devices 36 and 38.

Figure 3:
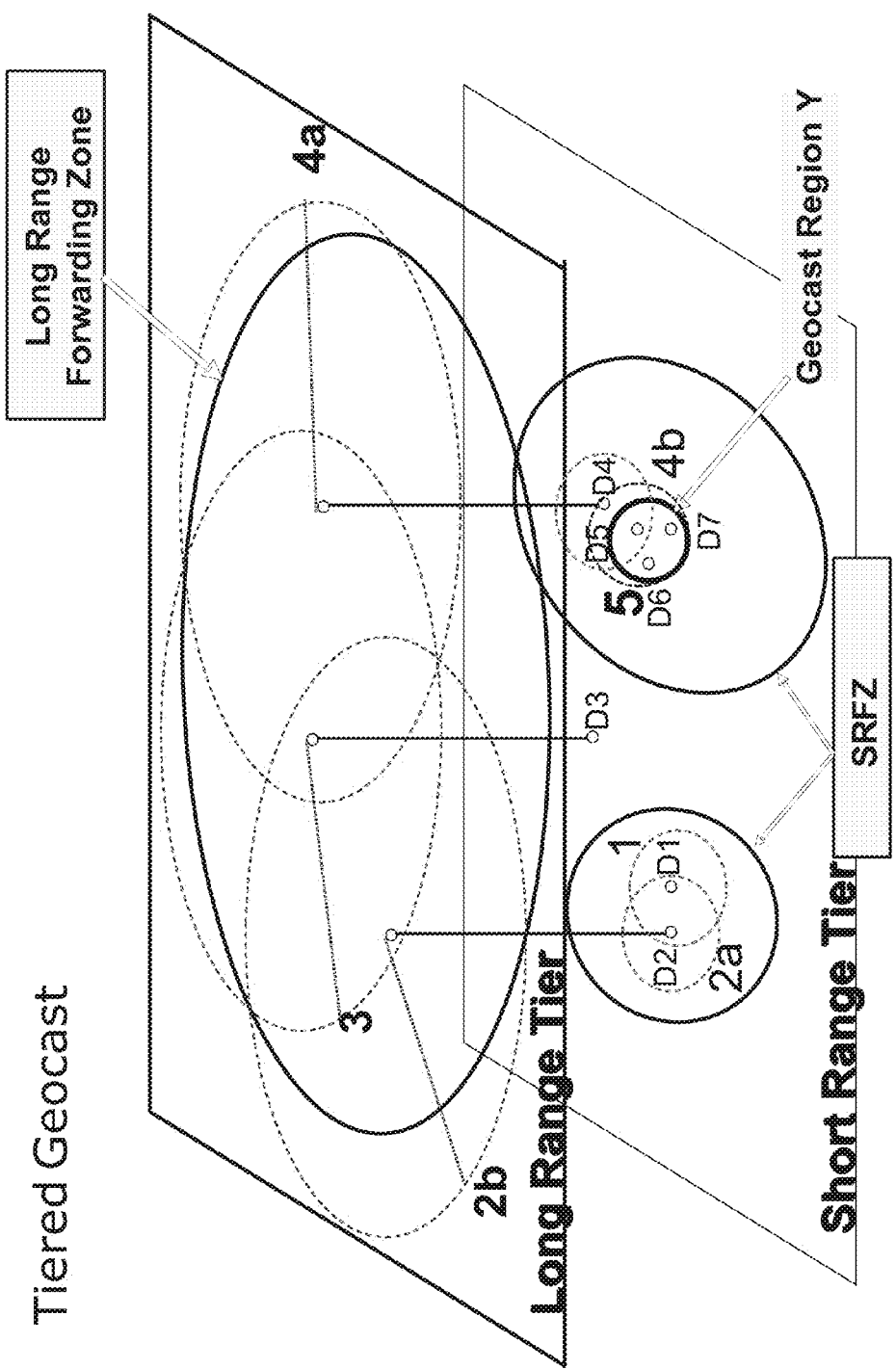
FIG. 3 illustrates an example mobile ad hoc network in which inter-vehicle communications utilizing a scalable ad hoc geocast protocol can be implemented utilizing tiered geocasting and forwarding zones.

FIG. 3 illustrates an example mobile ad hoc network in which inter-vehicle communications utilizing a scalable ad hoc geocast protocol can be implemented utilizing tiered geocasting and forwarding zones. Tiered geocasting uses long range (LR) transmitters (such as communications devices, etc), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 3, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

Geocast origination, destination, and termination regions can be defined by geographic parameters and may have any size and shape. As examples, the regions may be defined by three or more bounding geographic coordinates, forming a triangle, rectangle, or other shape, or a single geographic coordinate and a radius or diameter, forming a geocast region.

FIG. 4, comprising FIG. 4A, FIG. 4B, FIG. 4C, FIG. 4D, and FIG. 4E depicts example geocast regions or boundaries which can be utilized to facilitate inter-vehicle communications utilizing a scalable ad hoc geocast protocol. A geocast region may be defined to be a single point 40, as depicted in FIG. 4A. A point geocast region may be defined by a longitude value and a latitude value (not shown). A point above the surface of the earth could be defined by providing an altitude value in addition to longitude and latitude values. A geocast region may also comprise multiple single points (not shown) such as the single point 40. Location points such as point 40 may be used as the building blocks for more complex geocast region geometries, as described herein. FIG. 4B depicts a geocast region defined by a point 40 in combination with a radius 42. The geocast region of this example will comprise the area enclosed by the radius, and may include the space above the area as well. A geocast region could also be defined as the overlap region between two or more circular geocast regions (not shown). FIG. 4C depicts a more complex geometry formed from a series of points 40 interconnected with straight boundary lines. This technique of geocast region definition is similar to the techniques typically used in the definition of parcels of real property. FIGS. 5D and 5E depict the creation of one or more geocast regions within a single geographic footprint. FIG. 4D depicts creating a geocast region for a specific floor of a building 44. The single floor geocast region is defined as the volume of space between upper and lower areas, each formed using a series of points 40 set at corners of the buildings. FIG. 4E depicts an alternate technique for defining a single floor geocast region in building 44. Upper and lower points 40 are defined in the middle of the ceiling and the floor of the geocast region respectively. The single floor geocast region is then defined as the volume of space between an upper area and a lower area defined by a pair of radii 42 extending from the middle points. Geocast regions may also be defined to change in size, geographic location, etc. with time (not shown), essentially allowing the creation of geocast regions in four dimensions. For example a region may be defined to change size, shape, and/or geographic location over time as the number of participating nodes fluctuates. Information defining a particular geocast region (e.g., a series of points) can be communicated in an addressing portion of a geocast message. Geocast sub-regions may be defined within a particular geocast region using the above techniques. It should be noted that the techniques described with reference to FIGS. 4A-4E are merely examples, and the scope of the instant disclosure should not be limited thereto. Other region geometries and techniques for defining regions may be recognized by those skilled in the art, and are meant to be included within the scope of the instant disclosure.

In some embodiments, a geocast region can be selected by making one or more selections on a map and/or from a list. A region can be selected from a list displayed on a mobile communications device, or the like. The list can comprise real world locations. For example, one can scroll through a list by touching the display surface of a mobile communications device, or the like, by providing a voice command (e.g., "Scroll List"), by entering text on which to search, by moving the device, or any appropriate combination thereof. In another example embodiment, the selection of a region, or the like can be made by selecting a location on the map by a finger, fingers, and/or any other appropriate device, and, for example, dragging away or gesture-pinching, from the selected location to create the size of the a circle, oval, rectangular, square, polygon, or any appropriate shape (two dimensional or three dimensional) representing a destination, termination, boundary, region, or the like. In various example embodiments, locations, such as addresses, and/or region dimensions, building names, institution names, landmarks, etc. may be input in other ways by a player, such as by typing, gesture, and/or voice input.

Figure 5:
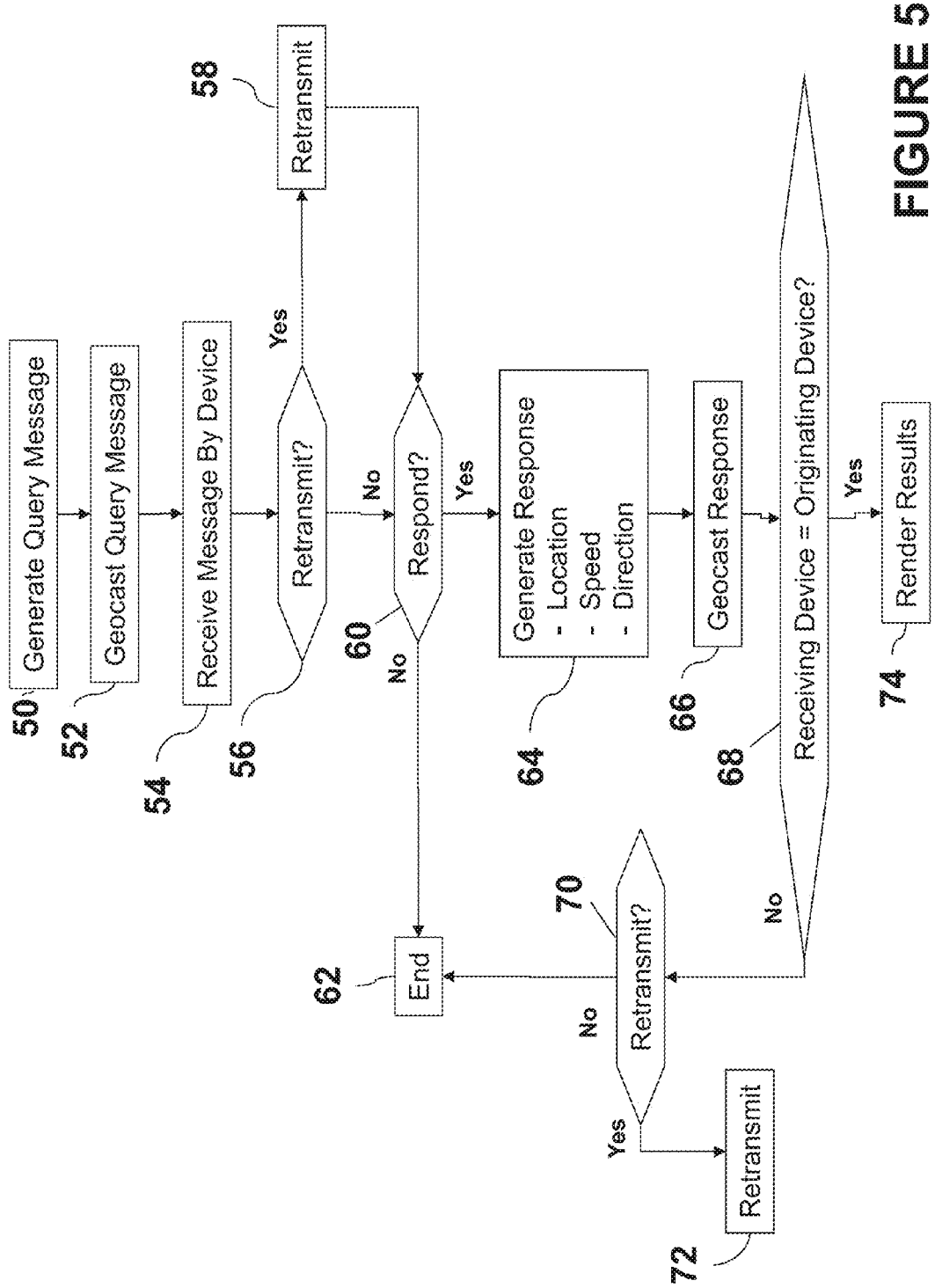
FIG. 5 is a flow diagram of an example process for implementing GeoV2V.

FIG. 5 is a flow diagram of an example process for implementing GeoV2V. A query message is generated at step 50. The query message can include any appropriate information, such as, for example, an indication of a geographic region to which the message is being sent, an indication (e.g., query) as to the type of information sought (traffic conditions, ongoing sales, crowding conditions, etc.), an indication of a temporal condition (e.g., time frame, start time, end time), or any combination thereof. For example, a driver may issue a query (e.g., voice or text menu selection, etc.), such as "Show traffic conditions ahead for five miles from the next exit". The query message can include information about the sender of the message, such as, the location of the sender, the direction the sender is moving, the name of a road on which the sender is traveling, the name of sender (e.g., name of restaurant, retail store, etc.), and/or the speed at which the sending is moving.

The query message is geocast at step 52. The query message can be geocast to any appropriate region, location, or the like. The geocast message is received by a device at step 54. It is to be understood that the geocast message can be received by multiple devices and the process depicted by steps 54 et seq. in FIG. 5 could occur for each device that receives the geocast message.

At step 56, it is determined if the device that received the query message is to retransmit (geocast) the query message. The criteria for determining if a query message is to be retransmitted are described in more detail below. If it is determined, at step 56, that the query message is to be retransmitted, the query message is retransmitted (geocast) at step 58. If it is determined, at step 56, that the query message is not to be retransmitted, the process proceeds to step 60.

The received message is analyzed, at step 60, to determine if a response is to be generated. For example, the received message can be analyzed to determine if the receiving device is in the geocast region of the message. If the receiving device is not in the geocast region of the message, the receiving device will not respond. In an example embodiment, if the receiving device is in the geocast region, the receiving device generates a response containing the current location of the device and the current speed and direction in which the device (and thus the vehicle in which the device is located) is moving, or any combination thereof. Additional information also can be included in the response. For example, if the nature of a traffic jam is known (e.g., accident, construction, etc.), information pertaining to the nature of the traffic jam can be included in the response. As another example, if alternate routes are known, information pertaining to alternate routes can be included in the response. In an example embodiment, a request for additional information can be included in the message, and the additional information, if known, can be included in the response. In another example embodiment, additional information can be included in the response regardless as to whether a request for additional information was included in the message. Additional information can be obtained in any appropriate manner. For example, additional information can be entered by a person, such as a driver and/or passenger in a vehicle in which a receiving device is located, additional information can be obtained via a network, additional information can be obtained from memory of the device (e.g., previously cached information, or any appropriate combination thereof.

If it is determined, at step 60, not to respond to the received geocast message, the process ends at step 62. If it is determined, at step 60, to respond to the received geocast message, a response is generated at step 64. The response can be generated as described above. The response can contain the current location of the device sending the response, the response can contain the current speed of the device sending the response, the response can contain the current direction of the device sending the response, the response can contain additional information (e.g., nature of event such as a traffic jam, alternate route, etc.), or any appropriate combination thereof.

The response is geocast at step 66. At step 68, it is determined if the device that received the response message is the device that originated the query message. If it is determined, at step 68, that the receiving device is not the originating device, it is determined, at step 70, if the response message is to be retransmitted (geocast). Criteria for determining if a response message is to be retransmitted are described in more detail below. If it is determined, at step 70, that the response message is to be retransmitted, the response message is retransmitted (geocast) at step 72. If it is determined, at step 70, that the response message is not to be retransmitted, the process proceeds to step 62.

If it is determined, at step 68, that the receiving device is the originating device, an indication of the content of the response message (e.g., results of the query) is rendered at step 74. The results can include an indication of a response to the query. For example, the results could indicate traffic conditions, for example, that traffic is jammed at the next exit and for three mile past the next exit. This can be accomplished by accumulating and processing the response received from various devices. As another example, the results could indicate that a retail store is having a sale, or that a restaurant has tables available. As yet another example, the results could indicate that parking spaces are available. The results can be rendered in any appropriate manner, such as, for example, visually and/or audibly. Results can include a map overlay of a location associated with the results. For example, the results could be rendered as a map showing the location of a traffic jam, or a map showing available parking spaces, location of a restaurant, etc.

In an example embodiment, each time a geocast packet is originated by a device, the geocast packet is assigned an identifier (e.g., globally unique identifier). The originating device (originator) broadcasts the geocast packet, with the packet header including, for example, originator location, a definition of the geocast region (e.g., center and radius for circular geocast regions, etc.), and other appropriate fields. Each device receiving a broadcast geocast packet stores the packet for a period of time. Storing a received packet can be accomplished in any appropriate manner. For example, the receiving device can generate a table entry comprising the received packet. In an example embodiment, the table entry can be short-lived (e.g., 10 seconds). The receiving device queues the packet for retransmission. In an example embodiment, an amount of time is allowed to pass before queuing the received packet for retransmission. The amount of time can be any appropriate amount of time. For example, the amount of time could be a random amount of time or a pseudo random amount of time. This amount of time may be referred to herein as a backoff time, backoff delay, or rolling backoff time. Waiting an amount of time before queuing the received packet for retransmission facilitates desynchronization of retransmissions among peer devices (avoid collisions). When the backoff delay expires, the device applies a heuristics check to decide whether retransmit the received geocast message or not to retransmit the received geocast message.

Figure 6:
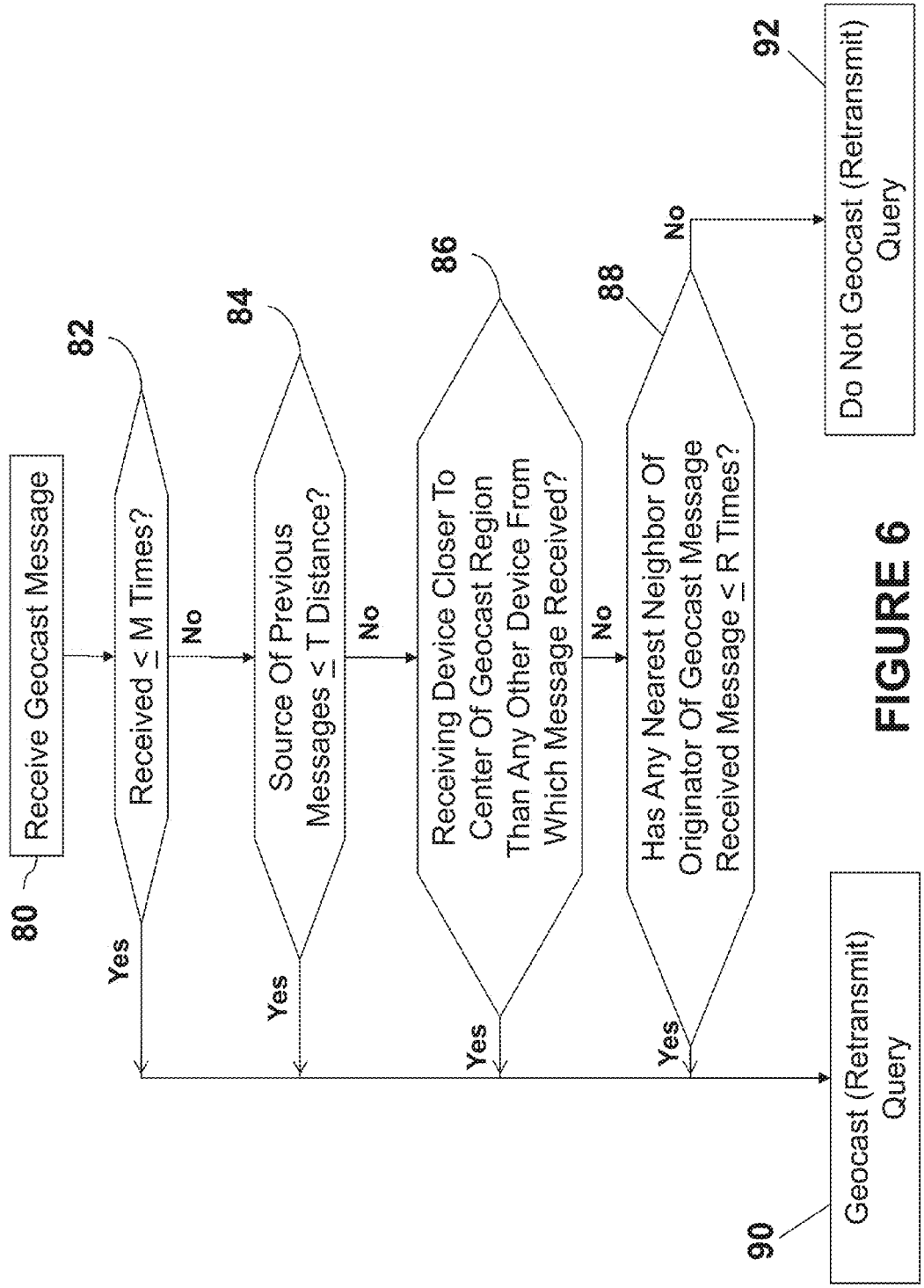
FIG. 6 is a flow diagram of an example process for determining whether to retransmit or not to retransmit a received geocast message.

FIG. 6 is a flow diagram of an example process for determining whether to retransmit or not to retransmit a received geocast message. A geocast message is received by a device at step 80. At step 82, it is determined if the received geocast message has been received a predetermined amount (M) of times. This determination is referred to herein as the M heuristic. The number of copies of each geocast message (e.g., transmissions having the same identifier) received by the device is counted. If this number is less than or equal to a parameter M (e.g., 2 for example), the device will transmit (geocast) the received geocast message. The M heuristic provides an efficient suppression mechanism in dense networks and makes SAGP scalable with node density. The M heuristic limits the number of transmissions in a local neighborhood, avoiding redundant transmissions and preventing congestion in the network. The M heuristic also provides redundancy in sparse networks. The M heuristic also helps the propagation get out of local minima it might otherwise be stuck in by hill climbing directly toward the destination. Thus, if it is determined, at step 82, that the geocast message has been received less than or equal to the predetermined amount (M) of times, the message is retransmitted (geocast) at step 90. If it is determined, at step 82, that the geocast message has not been received less than or equal to the predetermined amount (M) of times, the message is not retransmitted (geocast). And, the process proceeds to step 84.

At step 84, it is determined if the source of a geocast message is less than or equal to a predetermined distance, T, from the receiving device. This determination is referred to herein as the T heuristic. The T heuristic keeps track of how far away each copy of a geocast message is received from (using, for example, the sender location which is included in the geocast packet header). If all previously received copies were sent from devices that were at least a predetermined distance (e.g., 40 meters for example) away, the receiving device retransmits (geocasts) the message. A motivation for implementing the T heuristic is that if a node is sufficiently further away from all previous transmitters of a given geocast, the transmission from this node has a better chance of reaching nodes around corners and those that are not covered by previous transmitters. As a result, it helps to spread the geocast to distant areas not yet covered. Accordingly, if it is determined, at step 84, that the sources of all previously received copies of the geocast message are less than or equal to a predetermined distance away, the message is retransmitted (geocast) at step 90. If it is determined, at step 84, that the sources of all previously received copies of the geocast message are not less than or equal to a predetermined distance away, the message is not retransmitted (geocast). And, the process proceeds to step 86.

At step 86, it is determined if the receiving device is closer to a center point of a geocast region than any other device from which the geocast message was received. This determination is referred to as the CD heuristic herein. In an example embodiment, the receiving device determines a first distance from the receiving device to a point (e.g., the center point) in a geocast region. The receiving device also determines a plurality of distances between the point and each of a plurality of devices from which the receiving device has previously received a geocast message having an identifier that is the same as an identifier of the received geocast message. The receiving device will retransmit the received packet if the first distance is less than each of the plurality of distances. One of the problems that a geocast scheme needs to counter in the context of vehicular networks is that of obstacles. This is especially true in urban vehicular networks where a vehicle may not have a line of sight contact with another vehicle because of obstacles even if they are physically close to each other. The CD heuristic causes a node to forward a geocast message even if it has heard more than the threshold number of transmissions (M heuristic) from nodes which are within T distance from it. As a result, even if the transmissions from previous transmitters do not help in progressing the geocast message to its destination area (due to obstacles), the transmission from the node helps significantly to forward the message to the destination area Accordingly, if it is determined, at step 86, that the receiving device is closer to a center point of a geocast region than any other device from which the geocast message was received, the message is retransmitted (geocast) at step 90. If it is determined, at step 86, that the receiving device is not closer to a center point of a geocast region than any other device from which the geocast message was received, the message is not retransmitted (geocast). And, the process proceeds to step 88.

At step 88, it is determined if any of the nearest neighboring devices (one-hop devices from the originating device) of the originating device (the device that geocast the original message), has received the message less than or equal to a predetermined number, R, times. This determination is referred to herein as the R heuristic. If it is determined, at step 88, that any of the nearest neighboring devices of the originating device, have received the message less than or equal to the predetermined number of times, the message is retransmitted (geocast) at step 90. If it is determined, at step 88, that none of the nearest neighboring devices of the originating device, have received the message less than or equal to the predetermined number of times, the message is not retransmitted (step 92). In an example embodiment, R could equal 1, thus ensuring that the originating device transmits (geocasts) the message at least twice. In an example embodiment, the R heuristic is implemented at the originating device only. Implementing the R heuristic ensures at least R repetitions of the packet being sent by the originator.

It is to be understood that the order in which determinations are made, as depicted in FIG. 6 is exemplary. Determination can be made in any appropriate order.

Tests and simulations have been conducted to assess various aspects of performance of V2V and V2I geocast messaging. Testing utilized a smartphone application (IPHONE® and ANDROID®) that implemented the scalable ad hoc geocast protocol as well as several demonstration applications. One of the demonstration applications, public safety queryresponse, is a simple client that, on receiving a PSQuery geocast message responds by geocasting a PSResponse back to the area around the sender of the PSQuery. This simple PSQuery/PSResponse was used to test V2I messaging as all PSQuery geocasts originating from a stationary laptop placed in the test area. Another demonstration application used was a geocast location-based hide-and-seek game adding virtual elements like surveillance drones ("UAVs") and weapons fire to the real-world experience. In the testing, the UAV query/response protocol was used to implement V2V messaging, with the tracking player in one car and the tracked player in the other.

Figure 7:
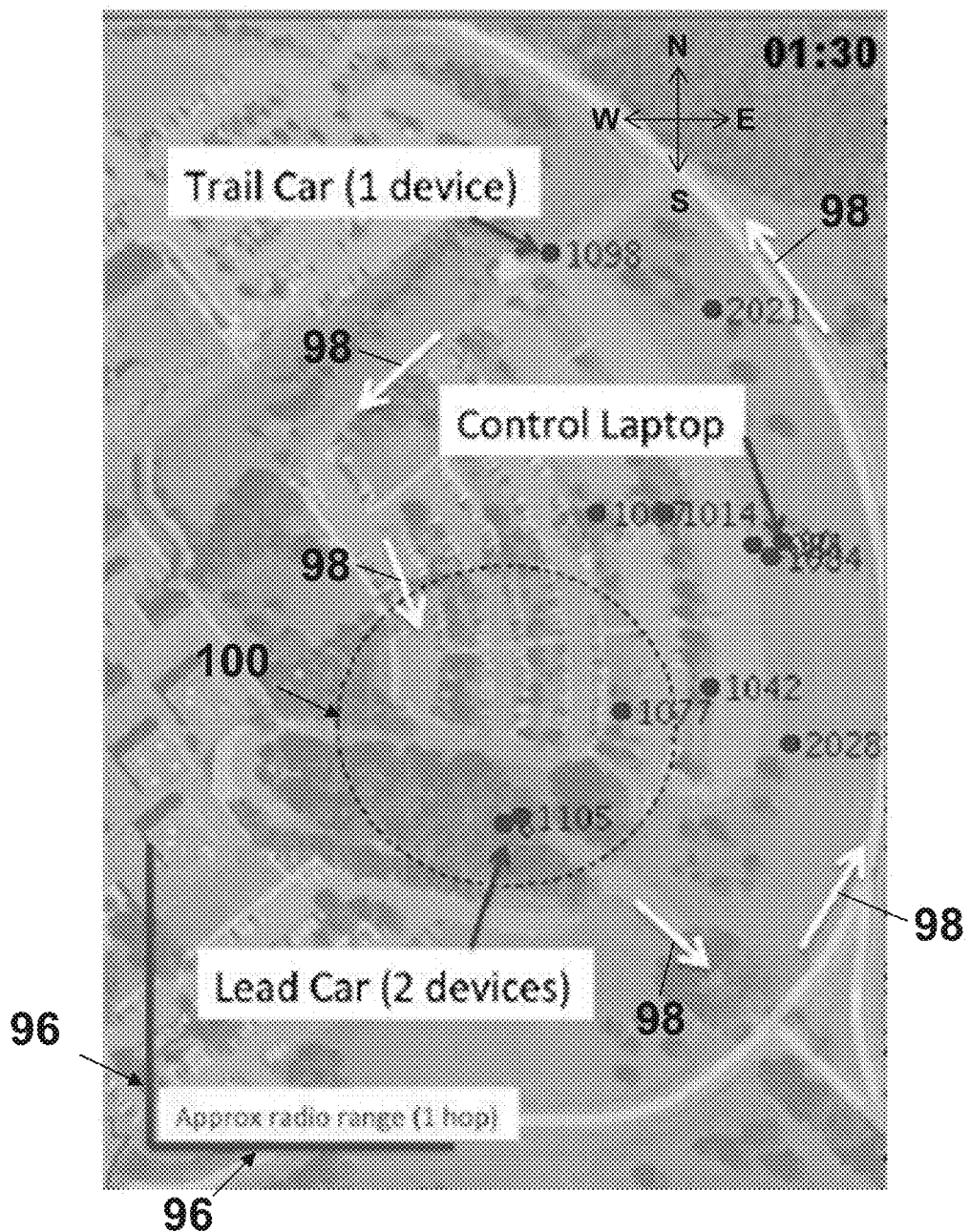
FIG. 7 depicts an example test layout as displayed on a smart phone.

The tests involved stationary devices, including the laptop and several smart phones, as well as three smart phones in cars. FIG. 7 depicts an example test layout as displayed on a smart phone. The area in the image shown in FIG. 7 is 288 meters west-to-east and 432 meters south-to-north. The horizontal and vertical lines in the lower left corner of the image indicate the approximate 1-hop radio range of the devices. As can been seen, no device was positioned to receive all transmissions. The arrows 98 show the driving route. All devices (indicated as dots on the image of FIG. 7) are stationary except the two in the lead car and the one in the trail car. The circle 100 represents the geocast region of a UAVQuery message sent from the trail car to devices within the circle at a particular time. Note that as the cars move, from time to time the UAVQuery geocast region will sweep over stationary devices as well, which will also respond.

The control laptop was used to periodically send PSQuery messages (once per 2 seconds) to a geocast region covering the entire area, as well as to capture transmissions of geocast message packets on the WiFi medium. Note that the laptop could not be heard by all positions in the test area, so these PSQuery messages did have to be relayed to reach all targets. The test proceeded with the cars driving around the loop (shown by arrows 98), with the trail device attempting to keep the lead car within the circle 100 at all times. UAVQuery messages were sent once per 2 seconds. Six tests were performed, varying (a) the top speeds of the vehicles between 5 and 16 meters/sec, and (b) the number of active devices from 6 to 9 to 12.

A rider in the trail car used the game controls (in this case by tapping on the screen) to keep the UAVQuery green region centered on the lead car as the rides proceeded, though occasionally, due to jumps in location sensing, for example, a UAVQuery had no devices in the region. Such queries were left out of the result statistics.

One of the goals of performing the experiments was to measure the effectiveness of geocasts in V2V and V2I scenarios in getting messages through. To this end, we the completion rate (hit %) was measured, defined as the number of devices in the geocast region of a geocast message receiving the geocast message, divided by the number of devices in the geocast region of the message. In other words, how often does a device targeted by a geocast message actually receive the message? Another goal was to mutually validate experimental results and simulation models' results by crosschecking them with each other. Thus, a tool was used to translate the originated geocasts recovered from the packet captures taken during the experiment into simulator model inputs, including locations of devices over time and geocast messages originated at times. A simulation then was run corresponding to each real-world (RW) test run and the same Hit % metrics were gathered.

A method based on the control laptop capturing packets transmitted on the common 802.11 channel used by the devices for ad hoc geocast networking was used. The method is referred to herein as Capture Based Measurement (CBM). The laptop was placed centrally to try to cover as much of the experiment area as possible. It is believed that at least one transmission of each of well over 95% of all geocasts was recorded. Note that for the measurements, all transmissions did not have to be captured. At least one transmission or retransmission of each geocast was sufficient. To run experiments in larger areas, one could place multiple capture laptops and merge the captures.

Captures were obtained for six runs. The captures were processed to track positions and count PSQuery geocasts and UAVQuery geocasts. Completions to targets were inferred from the observation of corresponding PSQueryResponse or UAVQueryResponse packets coming from the targets afterward. The CBM tool also used the tracked positions to infer which devices are potential targets as well. A variant of CBM tool also can dump out positions over time, as well as time and content of geocast originations, to simulator format. These input files could then processed by a network simulator, referred to herein as NS-2-based geocast models.

FIG. 8 illustrates a table, Table 1, depicting results for both the real world experiments and the simulations of the runs. For each of Runs 1-6, the number of geocast devices and maximum speed of vehicles is shown. The experiments took place partially in a functioning parking lot, so maintaining the maximum speed was not always feasible or safe. In each run, exactly three devices were in moving vehicles, and the rest were stationary. The columns headed "Targets" in Table 1 indicate the total number of devices inside geocast regions of all query geocasts of the corresponding type. The results are divided between PSQuery and UAVQuery messages, with the former being originated from a stationary device and having very large geocast region, and the latter being originated from a moving vehicle and having relatively quite small geocast region. The columns marked "Hit %" in Table 1 indicate completion rate (as defined above) for the corresponding query type. The columns marked "Simulation" in Table 1 indicate the analogous completion rate measured by the NS-2 simulation of the run. The columns marked "Diff %" in Table 1 indicate the relative difference between RW and Simulation results, with difference as a percentage of the RW result. For example, Run 1 had 12 devices, max speed of 16 meters per second, 803 PSQuery targets, reaching 94.5% of those in the real world experiment and 99.5% of them in Simulation. The Simulation result is 5.2% higher than the RW result for that run.

The bottom row in Table 1 indicates the overall result, obtained by summing targets and hits and computing percentages. Thus, overall, for stationary sender and large region, geocast completed over 98% of all deliveries in the RW, and 99.1% in Simulation. RW measurement and Simulation agree to within 1% here. Note that for all PSQuery geocasts, exactly three targets were in moving vehicles and the others were stationary. For the case of small region and moving originator, the numbers are 91% and 93%, with agreement to within 2.2% between RW and Simulation.

FIG. 9 illustrates a table, Table 2, indicting low level statistics measured during the test runs. The first column, labeled "Run," indicates the experiment index. The second column, labeled "# of nodes," indicates the number of devices taking part in the run. The third column, labeled "# Total unique Geocasts," indicates the total number of distinct geocasts originated, and the fourth column, labeled "Total Tx.," indicates the resulting total number of transmissions. The fifth and sixth columns, labeled "Tx per Geocast" and "Tx Flooding," respectively, compare the bandwidth used by SAGP and flooding. Flooding indicates that a transmission node broadcasts a geocast packet to all nodes nearby. Subsequently all receiving nodes also broadcast geocast packets to their nearby nodes within range. The consequence of flooding results in a large number of transmissions. The fifth column indicates the number of transmissions divided by number of geocasts, and the sixth column indicates the number of transmissions that would have been seen had a simple flooding algorithm been running instead of SAGP.

As shown in Table 2, in every case, SAGP uses fewer transmissions than flooding. Moreover, as the number of devices doubles from 6 to 12, the advantage of SAGP increases, as it grows only from 5.5 to 7.0, whereas flooding's cost would have doubled from 6 to 12. There are several reasons why SAGP's field performance does not quite match the ideal analytical result of zero growth. First, the nodes are spread out nonuniformly in two dimensions instead of strung out linearly, second, some nodes are far away (leading to the T heuristic firing for every geocast) from others, while others are close. The zero growth with n result really only applies when all nodes can hear all other nodes.

These results demonstrate the effectiveness of scalable ad hoc geocasts in implementing geographic messaging between vehicles and between vehicles and stationary devices. There appears to be a consistent trend that UAVQuerymessages complete at a somewhat lower rate than the PSQuery messages. It is surmised that this has more to do with small geocast region size, combined with noise in the system due to position sensing inaccuracy. Essentially, the effects of jumpiness in position sensing and imprecision in targeting the region are magnified when the area of the region is small; it does not take much sensor error to "move" devices spuriously into or out of the geocast region. Consider also that when region size is large (PSQuery case), completion is much higher completion, even to moving targets.

The differences between results measured in the real world and those captured in simulation are small. It is surmised that some of the difference is due to a difference between the way the devices use location information and the way the simulator interpolates position information between fixes. Thus, it is surmised that RW and Simulation can be brought even more closely into alignment with enhancements to the tools.

Figure 10:
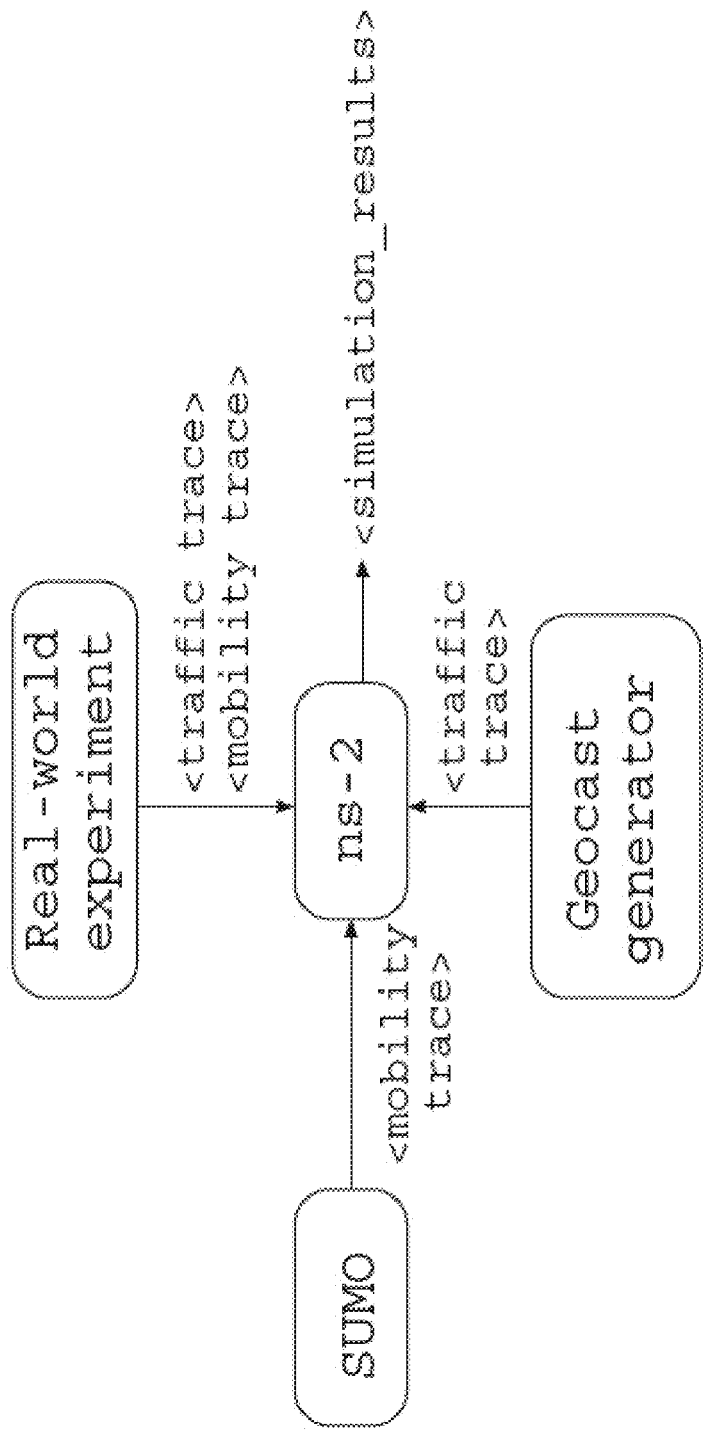
FIG. 10 illustrates components of the simulation environment.
Figure 12A:
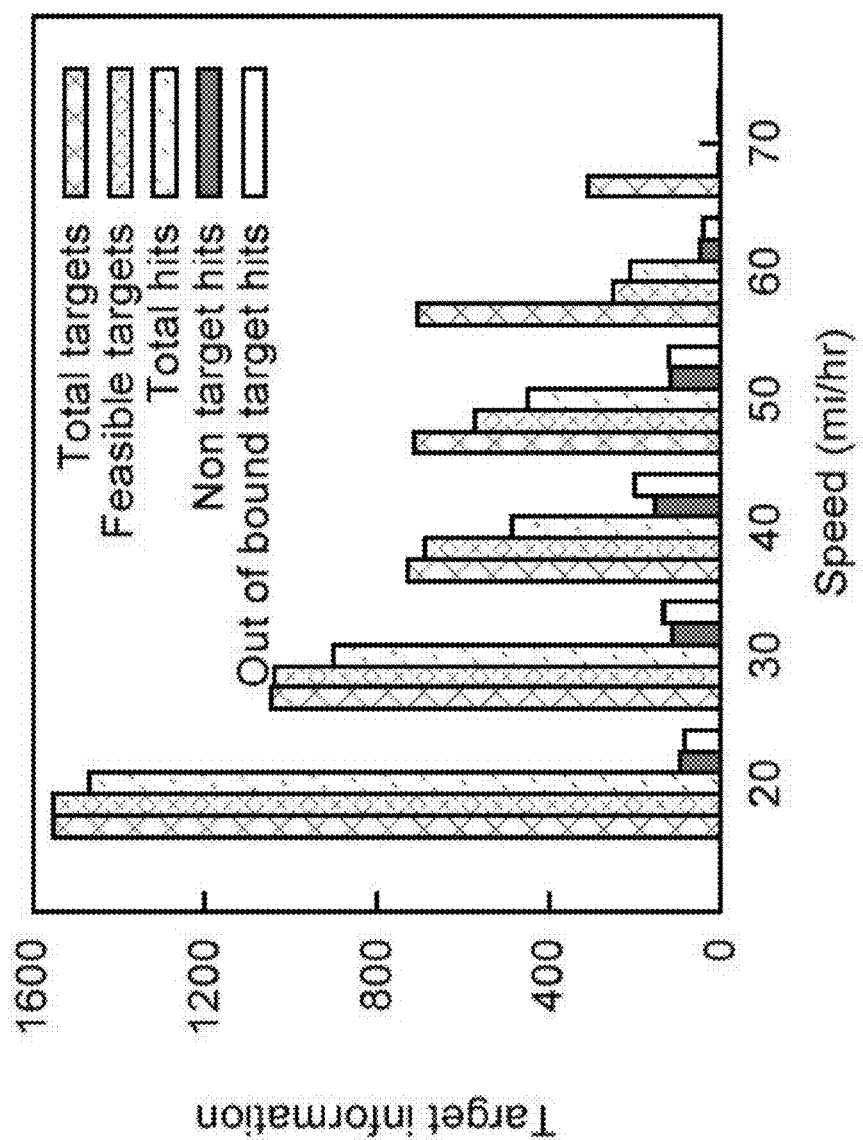
FIG. 12 illustrates graphs depicting results for different vehicle speeds. Graph (a) depicts target information, graph (b) depicts network density, graph (c) depicts feasible targets, graph (d) depicts hit %, graph (e) depicts the number of hops to the target vehicles, graph (f) depicts the time delay incurred to deliver geocast message to the target vehicles, and graph (g) depicts the number of transmission per geocast.
Figure 12B:
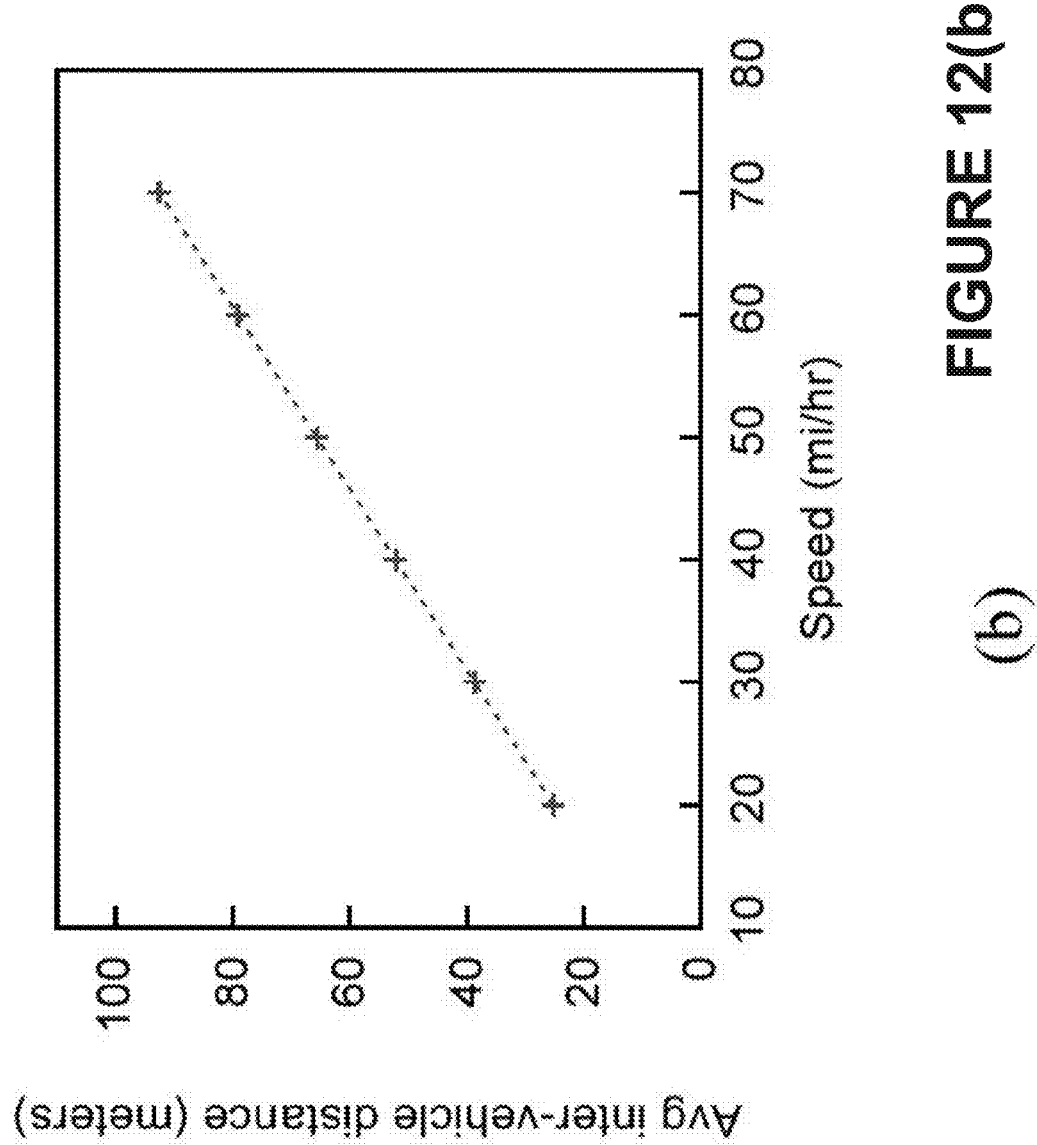
Figure 12C:
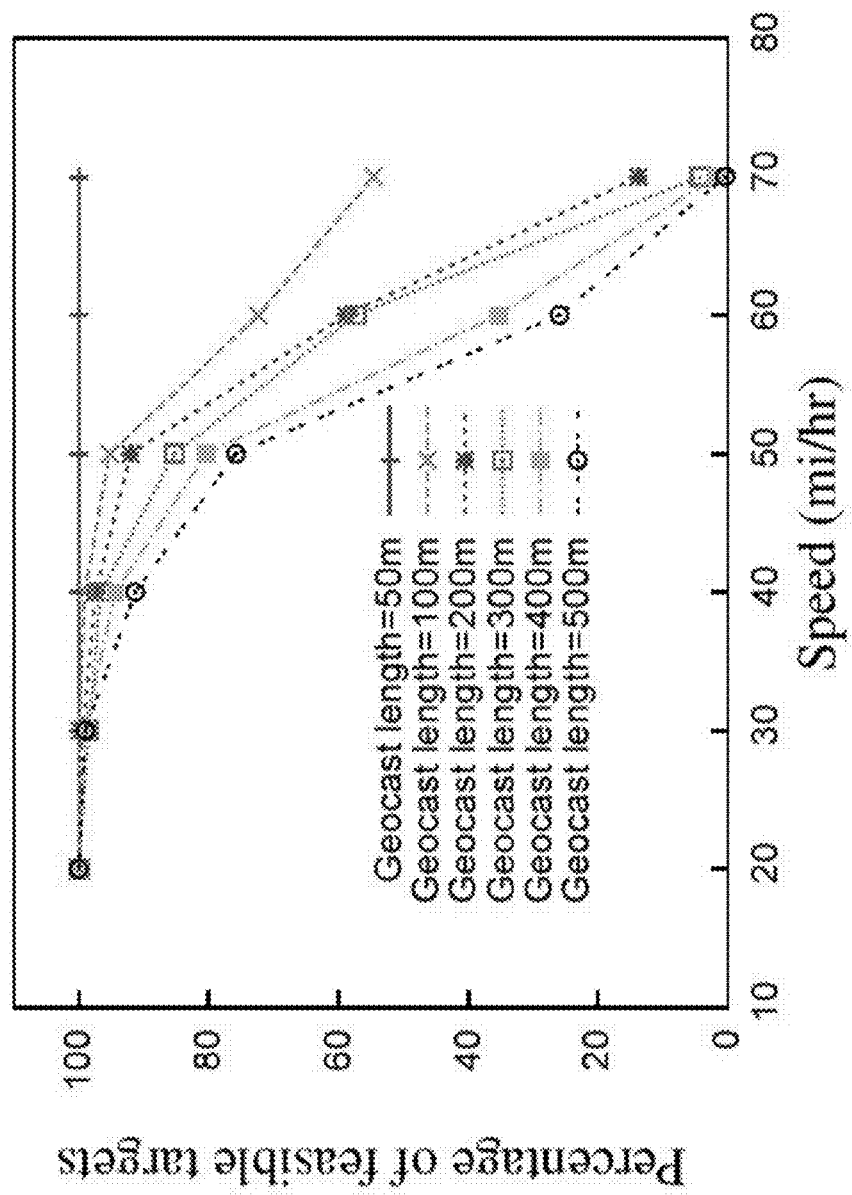
Figure 12D:
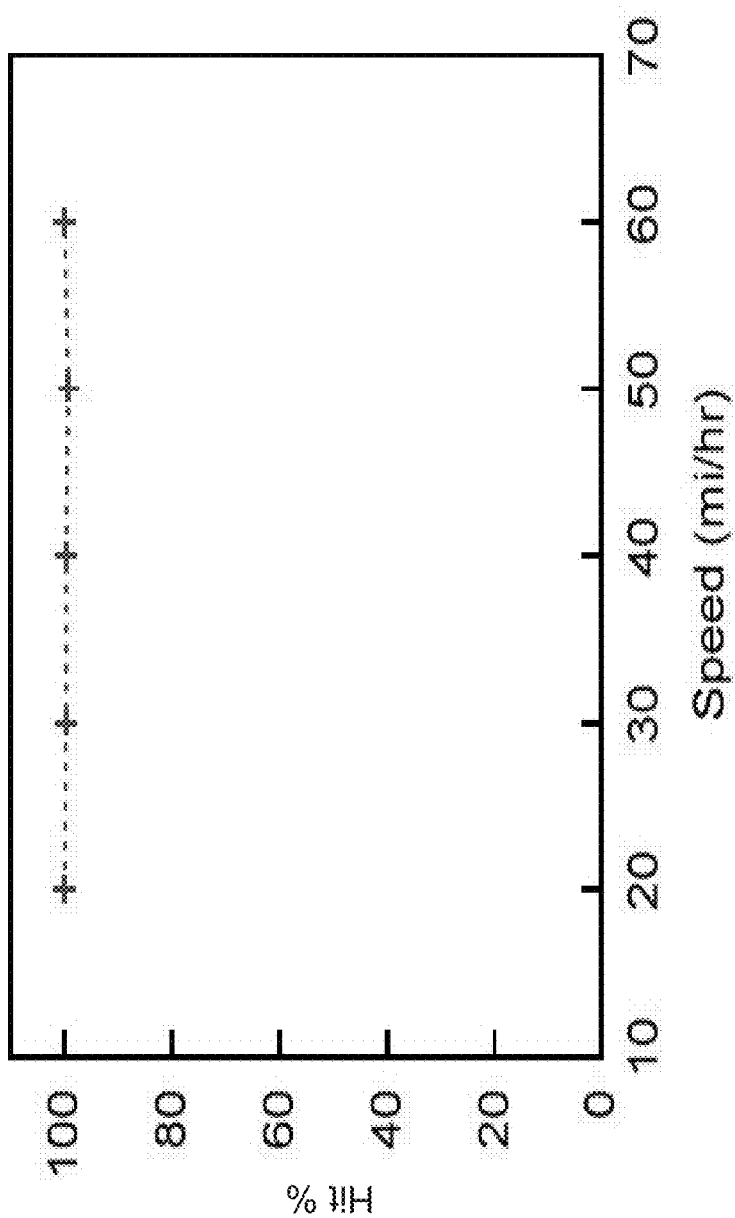
Figure 12E:
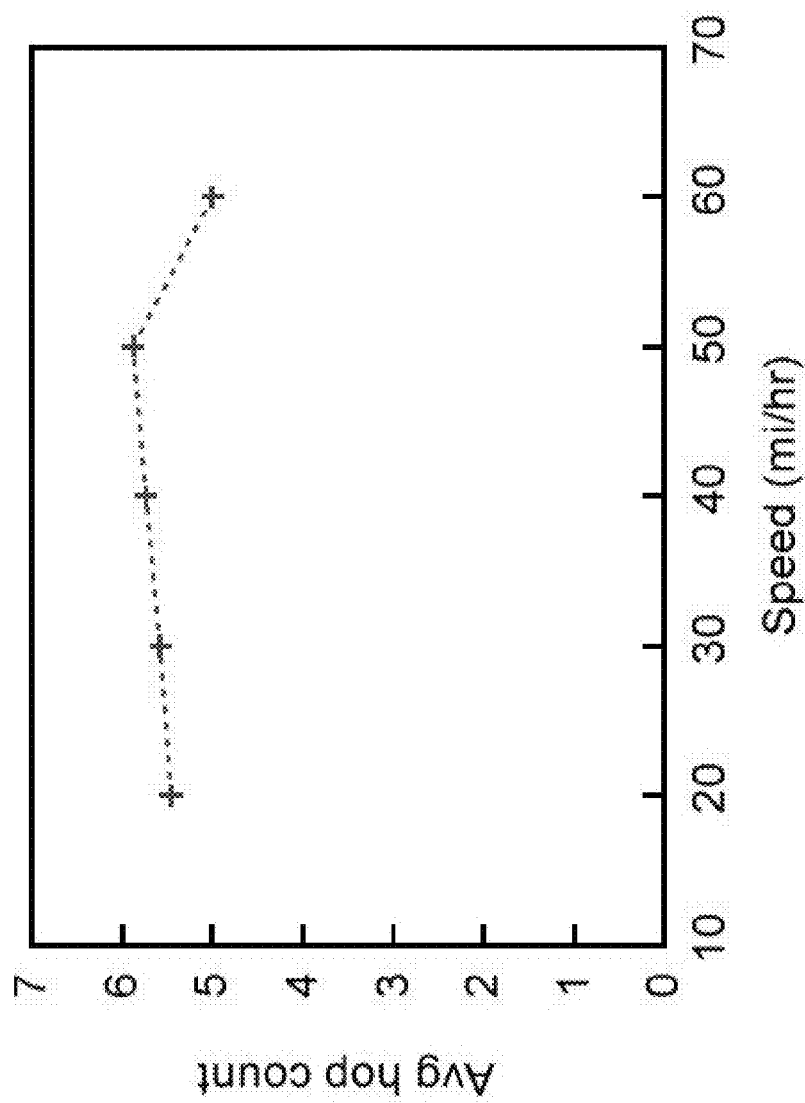
Figure 12F:
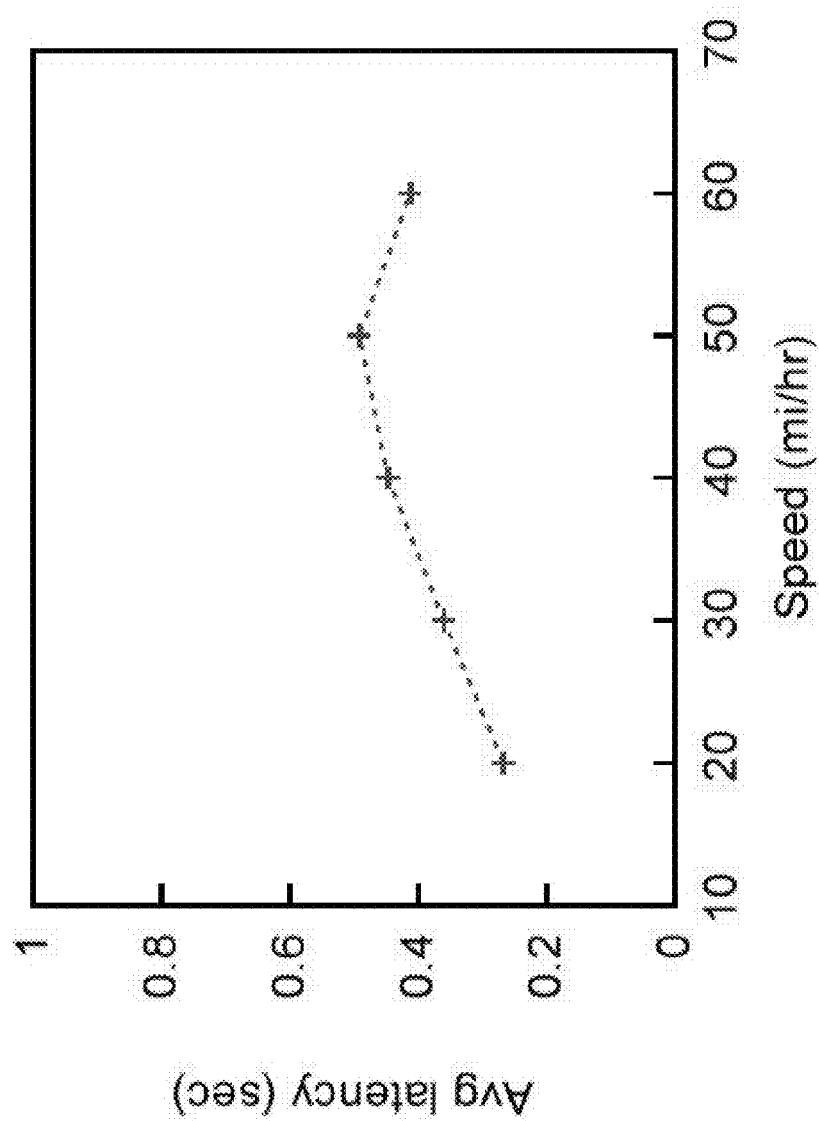
Figure 12G:
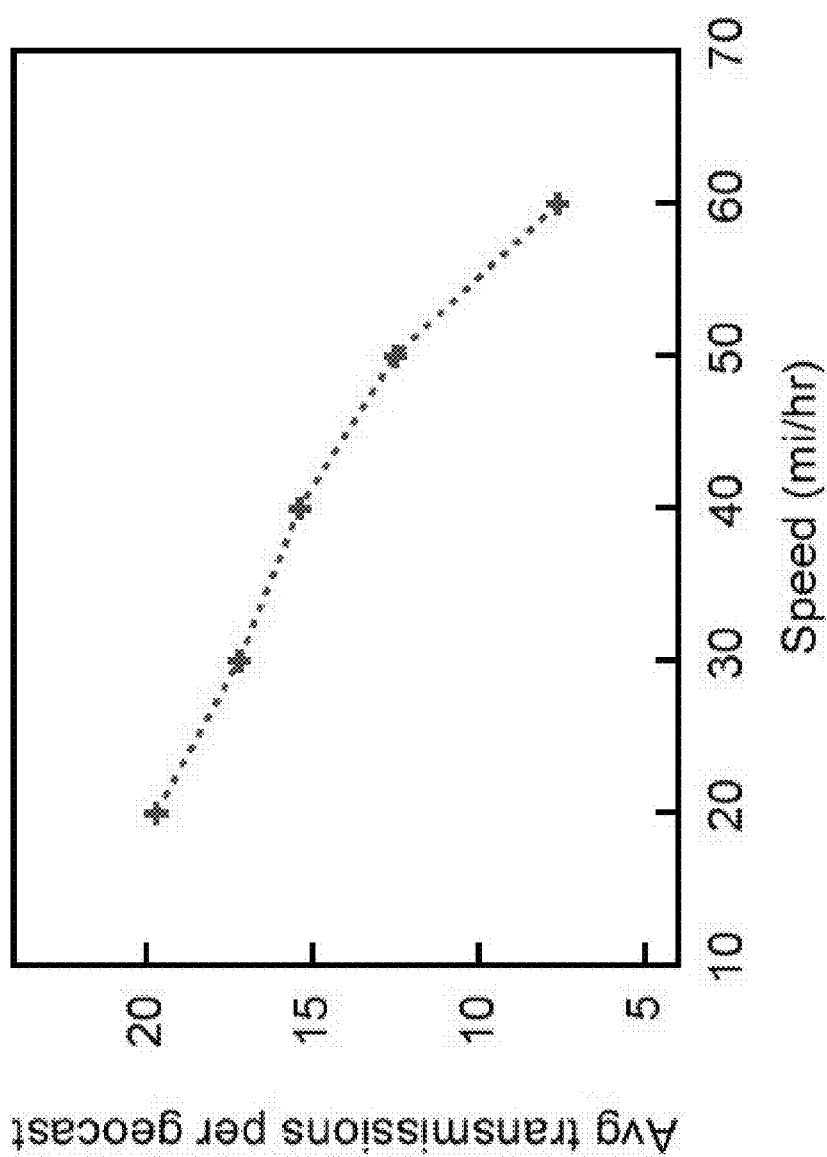
Figure 13A:
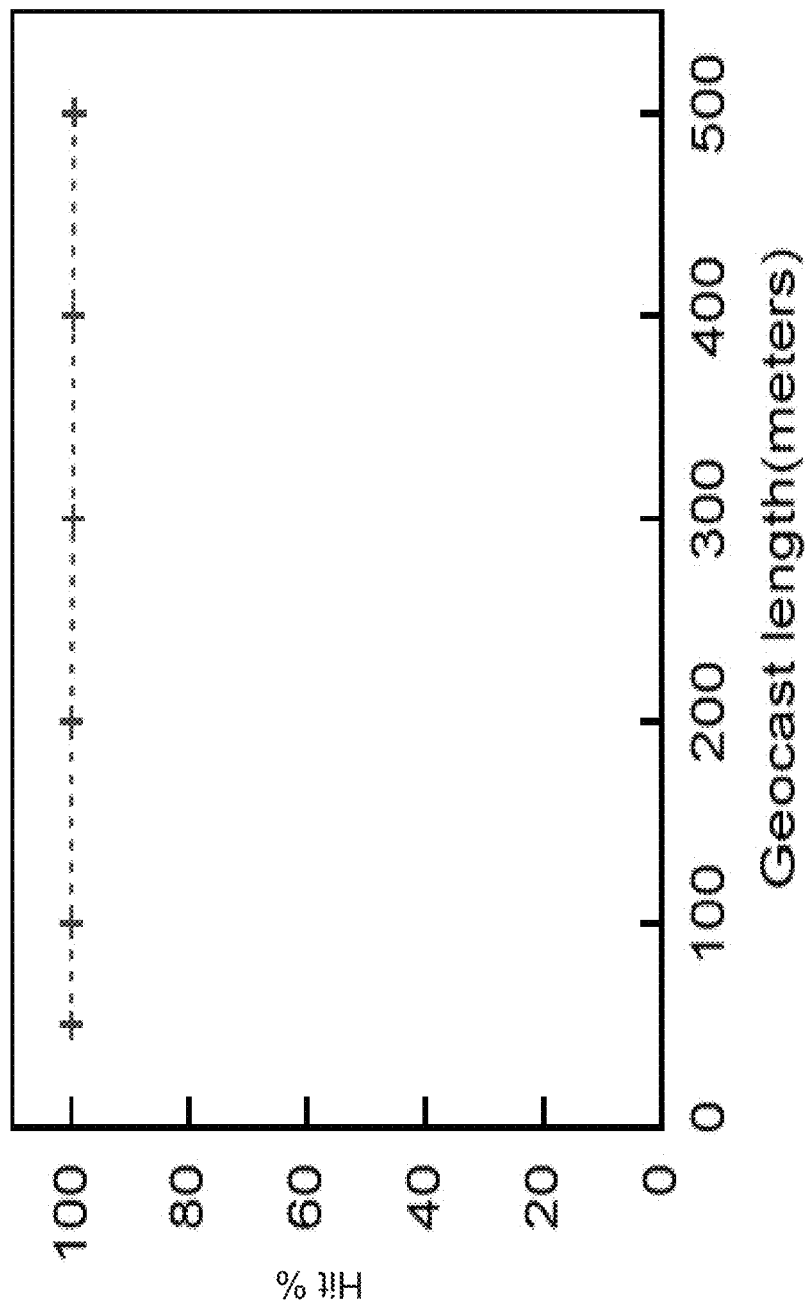
FIG. 13 illustrates graphs depicting single lane results for different geocast lengths. The performance of GeoV2V as a function of geocast length for a given road speed limit of 40 miles/hr. was evaluated. Other simulation parameters are the same as described above. Graph (a) depicts hit %, graph (b) depicts the number of hops to the target vehicles, graph (c) depicts time delay to deliver geocast messages to the target vehicles, and graph (d) depicts the number of transmissions per geocast.
Figure 13B:
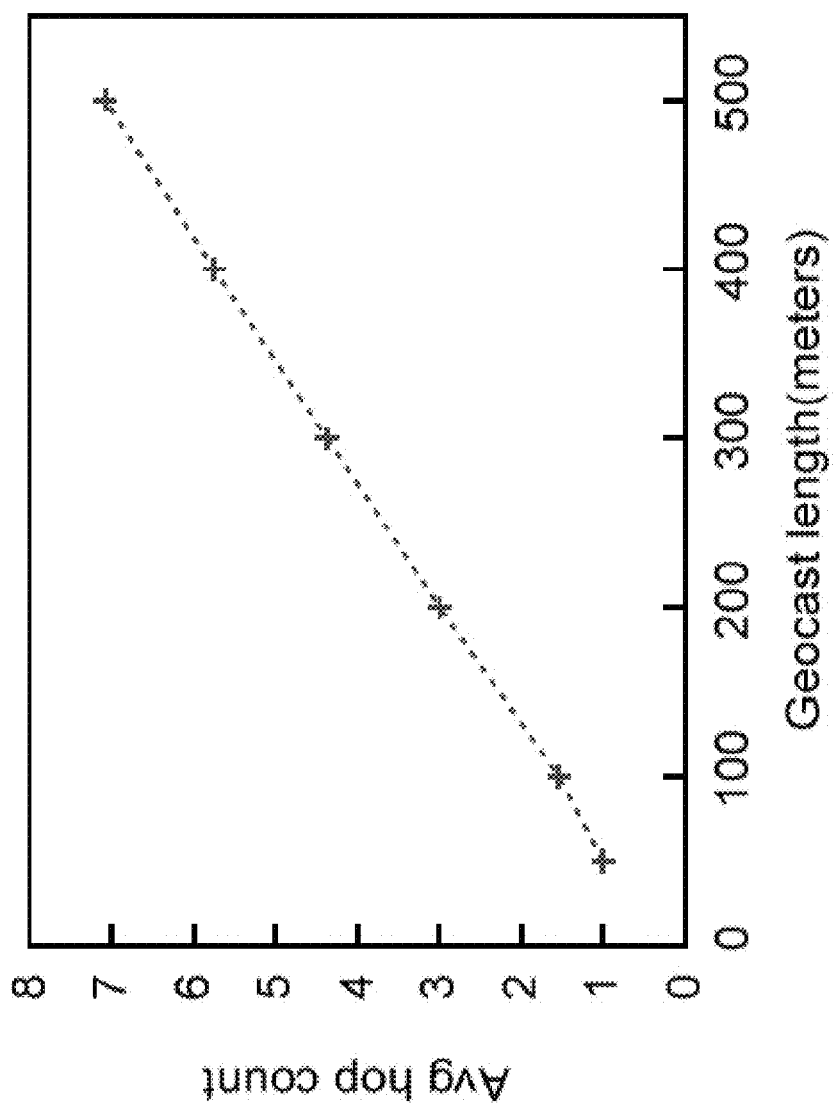
Figure 13C:
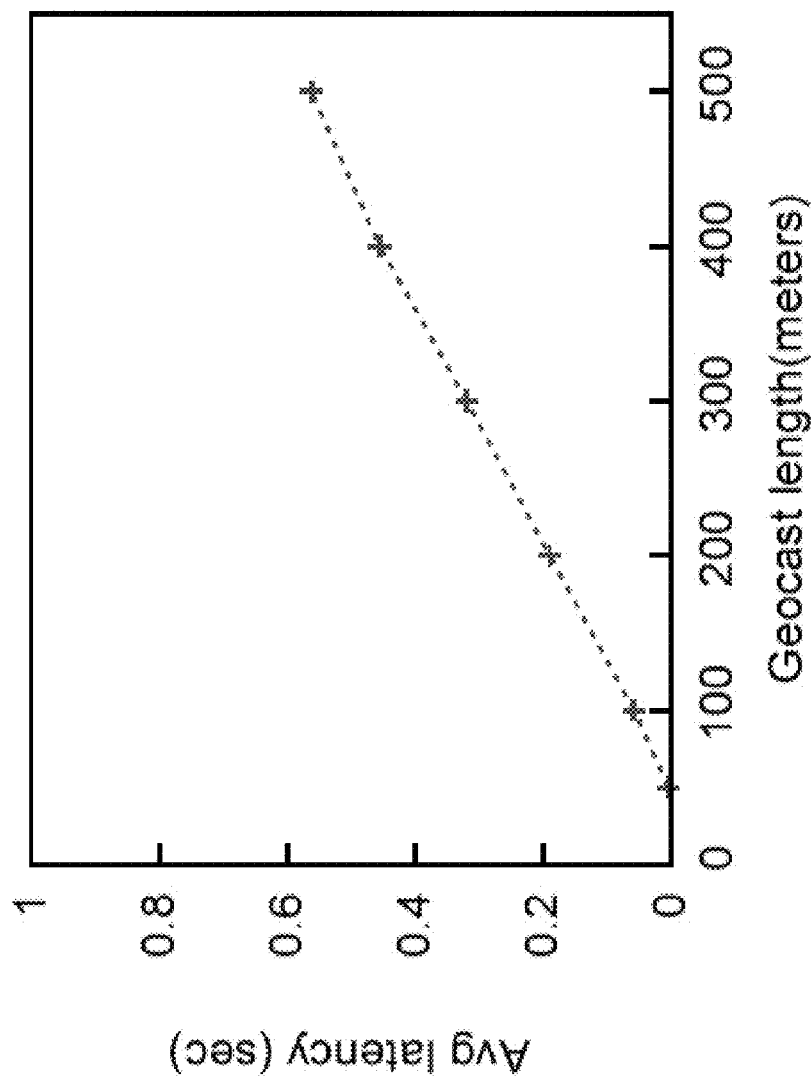
Figure 13D:
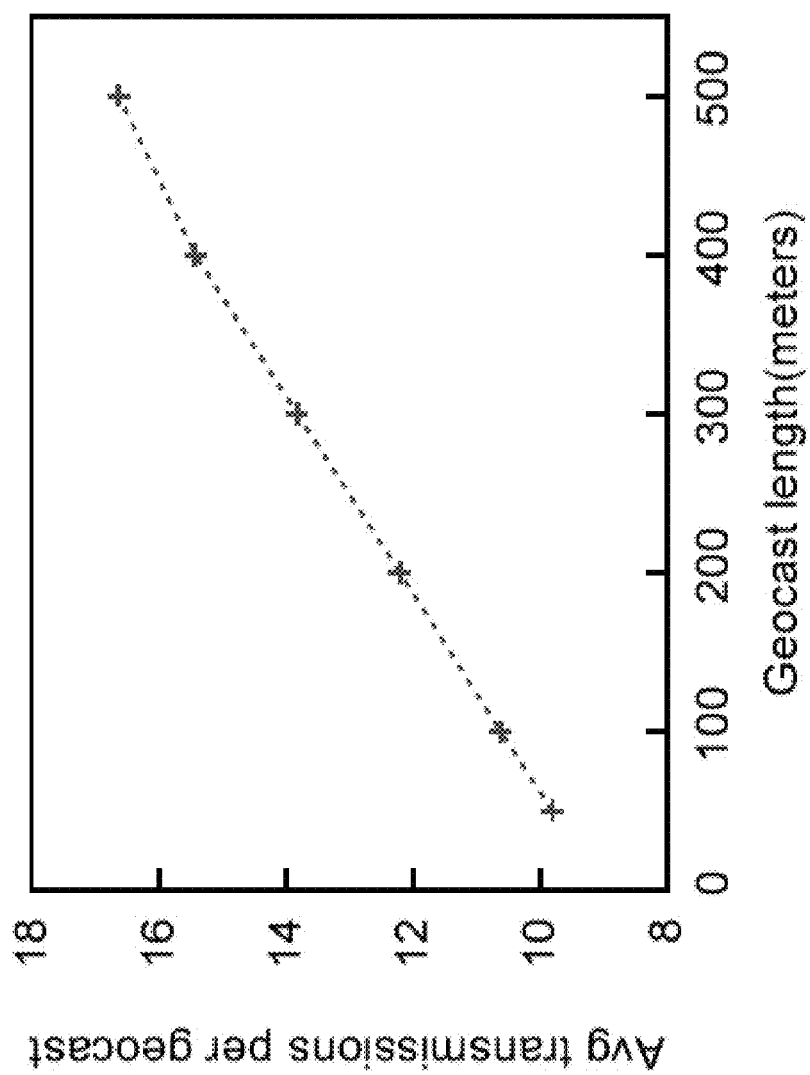
Figure 14A:
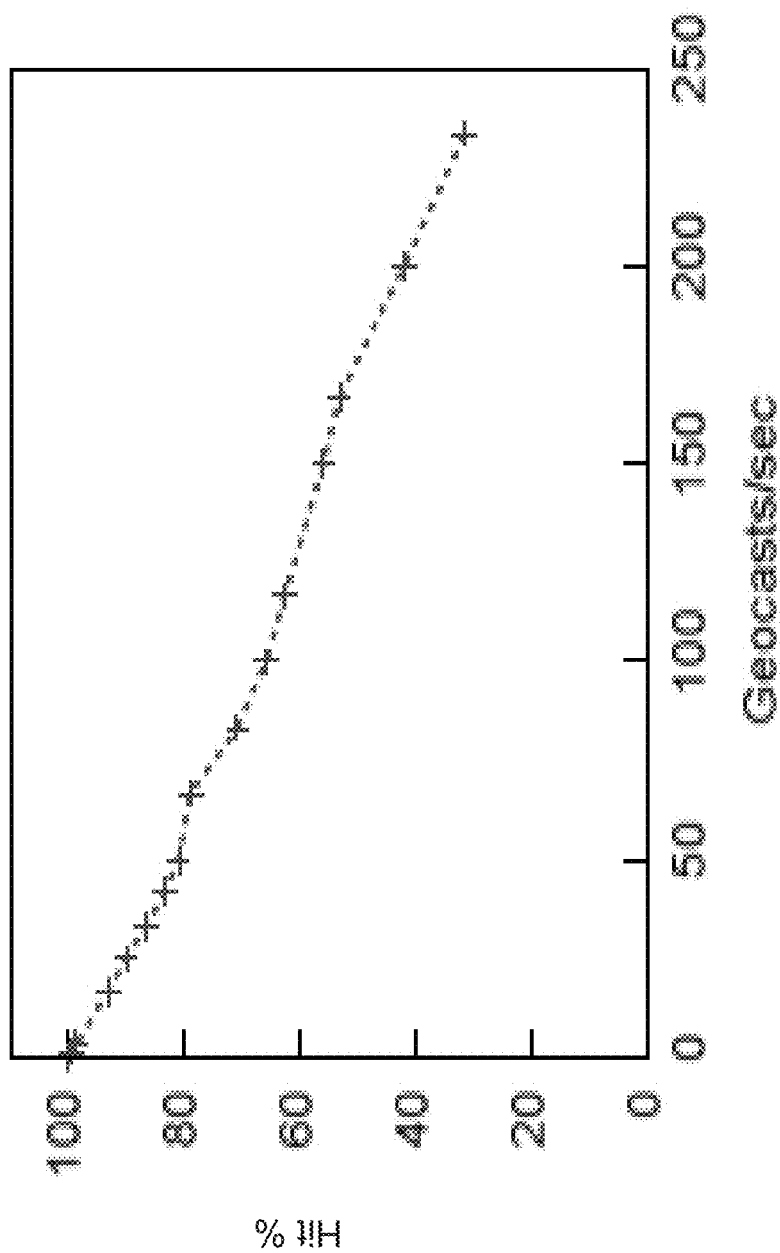
FIG. 14 illustrates graphs depicting single lane results for different offered loads. Graph (a) depicts hit %, graph (b) depicts the number of hops to the target vehicles, graph (c) depicts time delay to deliver geocast messages to the target vehicles, and graph (d) depicts the number of transmissions per geocast.
Figure 14B:
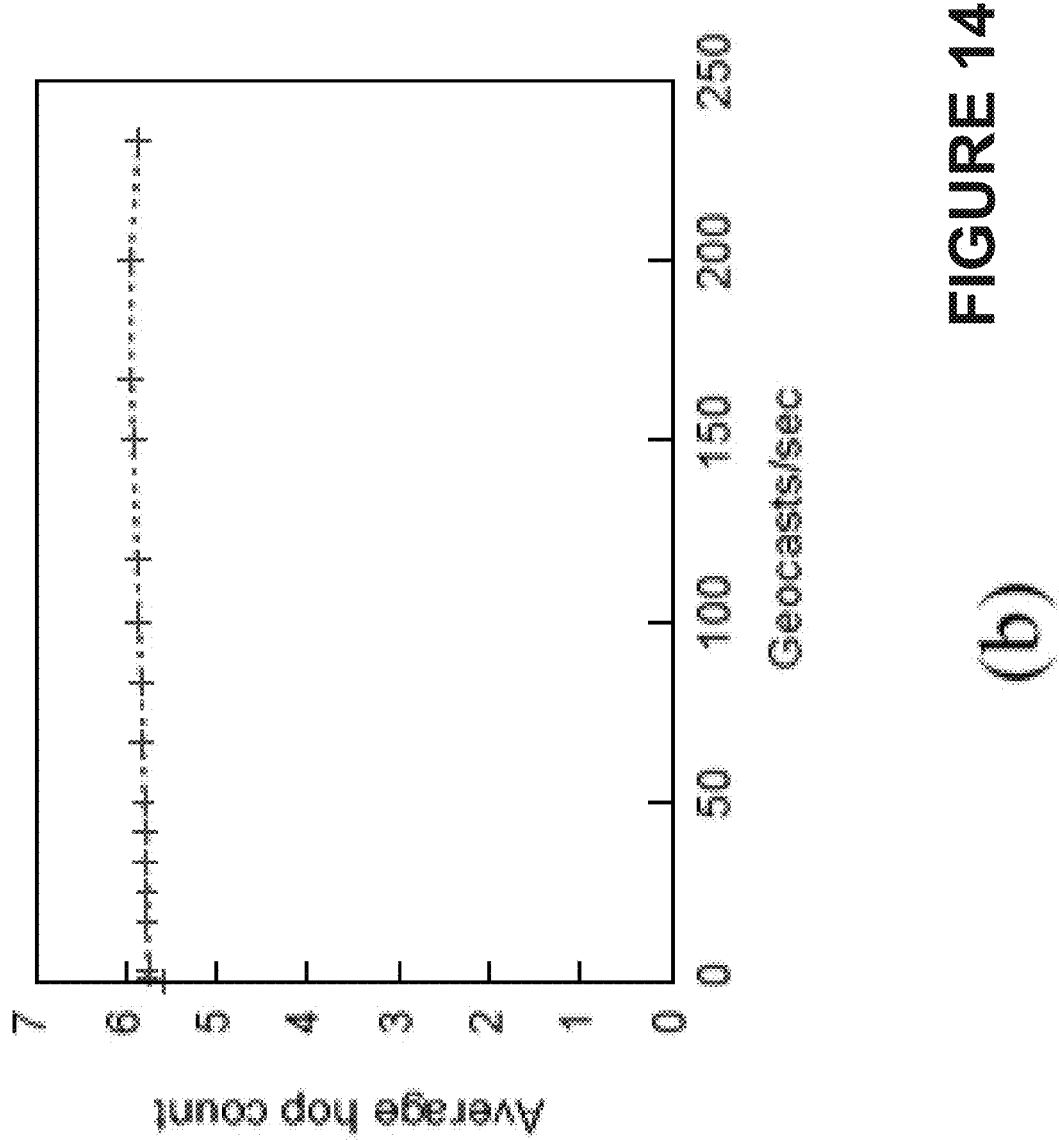
Figure 14C:
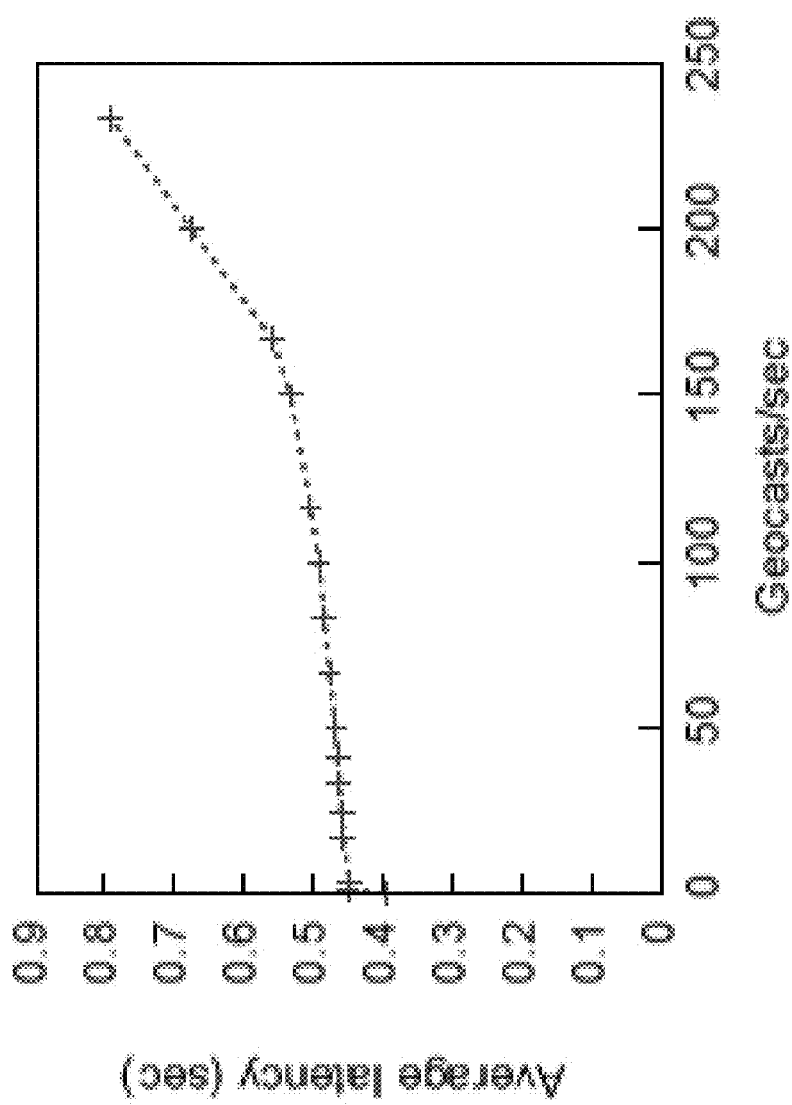
Figure 14D:
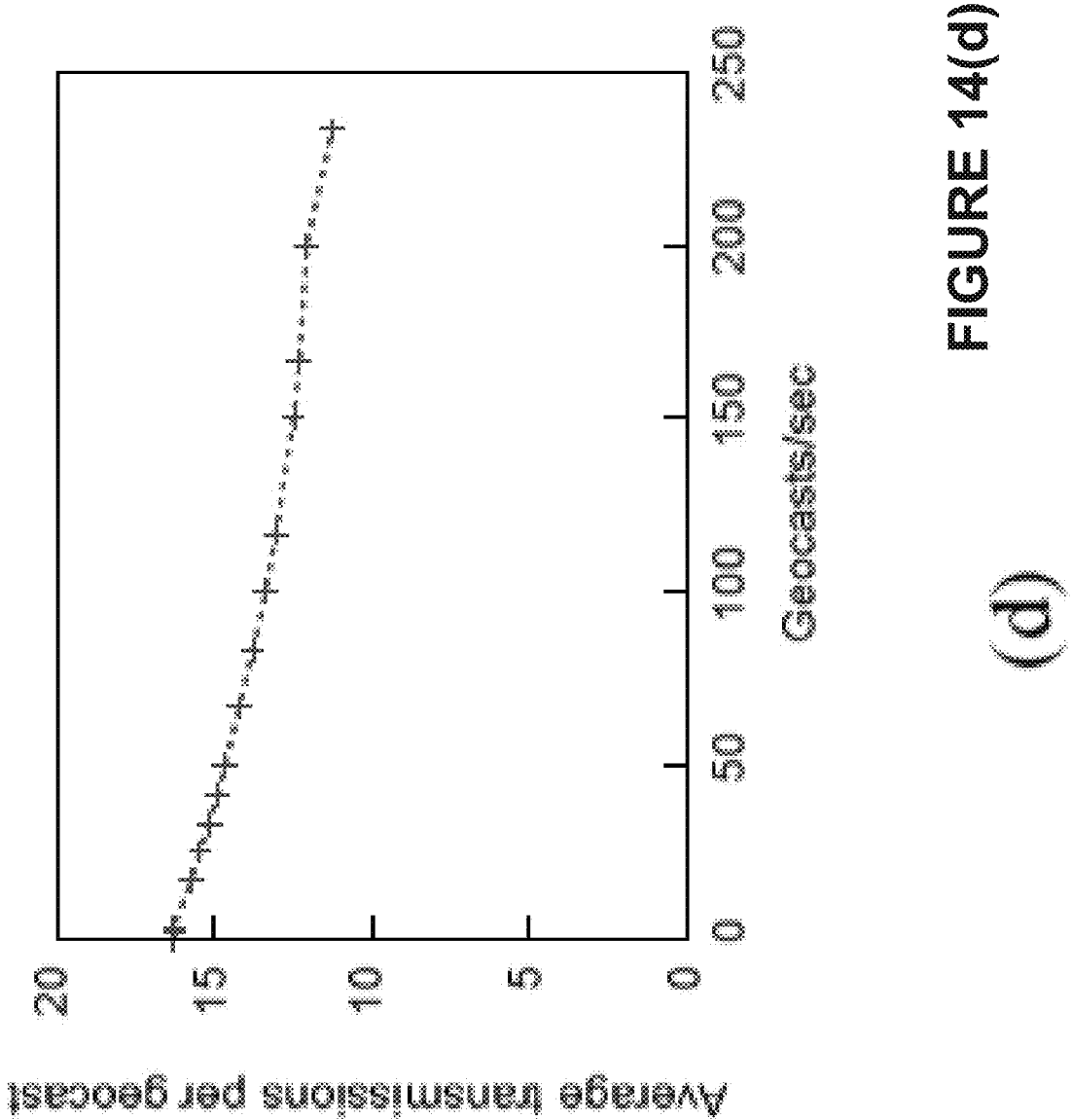
Figure 15A:
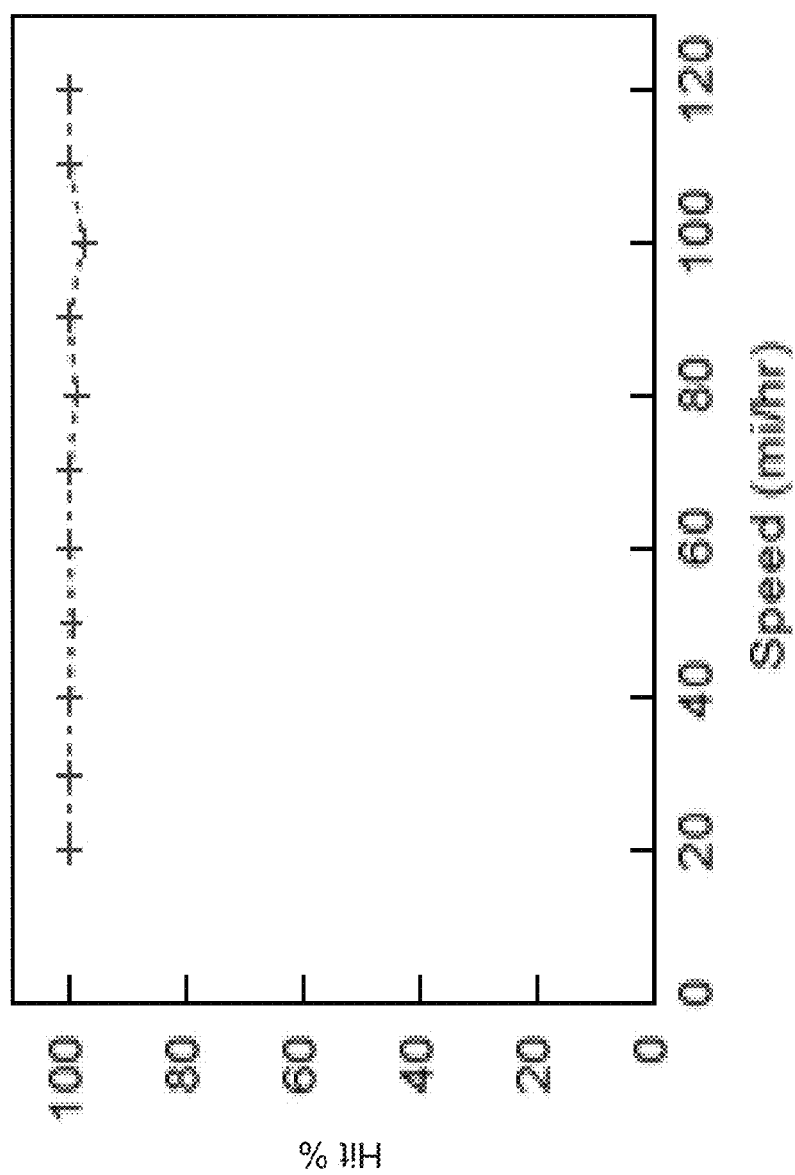
FIG. 15 illustrates graphs depicting double lane results for different vehicle speeds. Graph (a) depicts hit %, graph (b) depicts the number of hops to the target vehicles, graph (c) depicts time delay to deliver geocast messages to the target vehicles, and graph (d) depicts the number of transmissions per geocast.
Figure 15B:
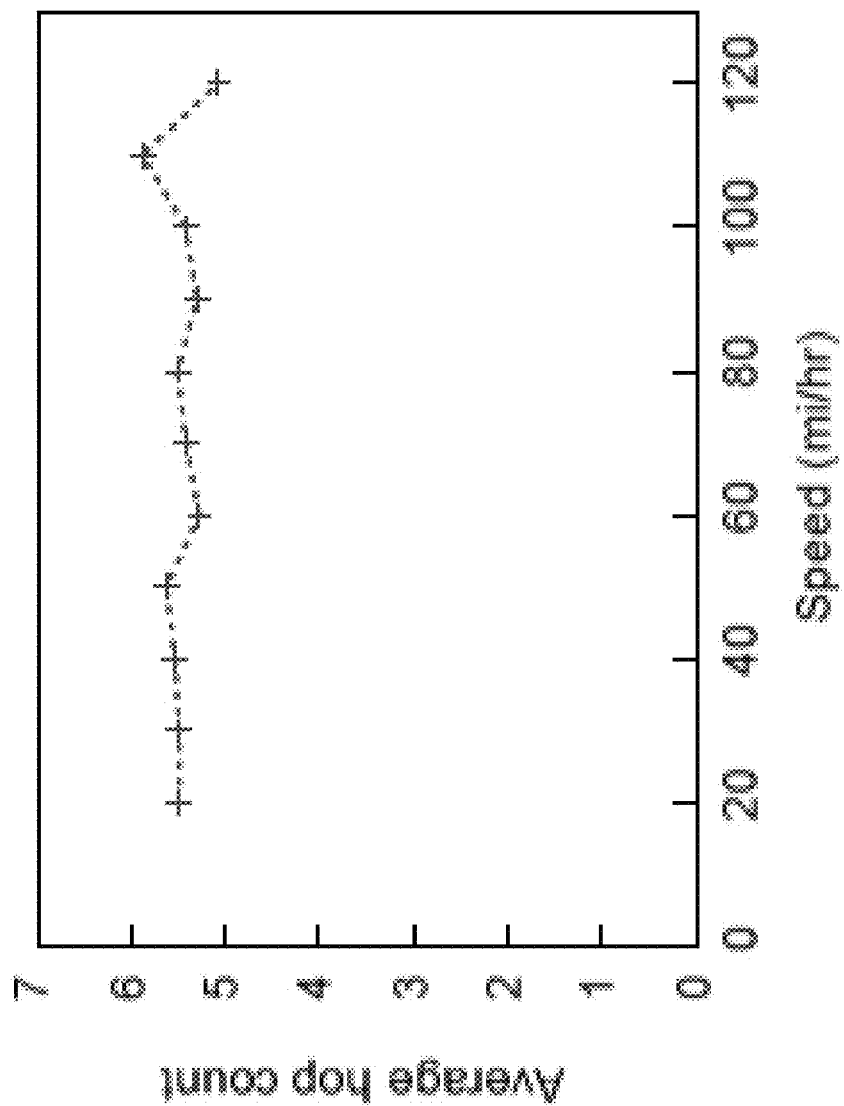
Figure 15C:
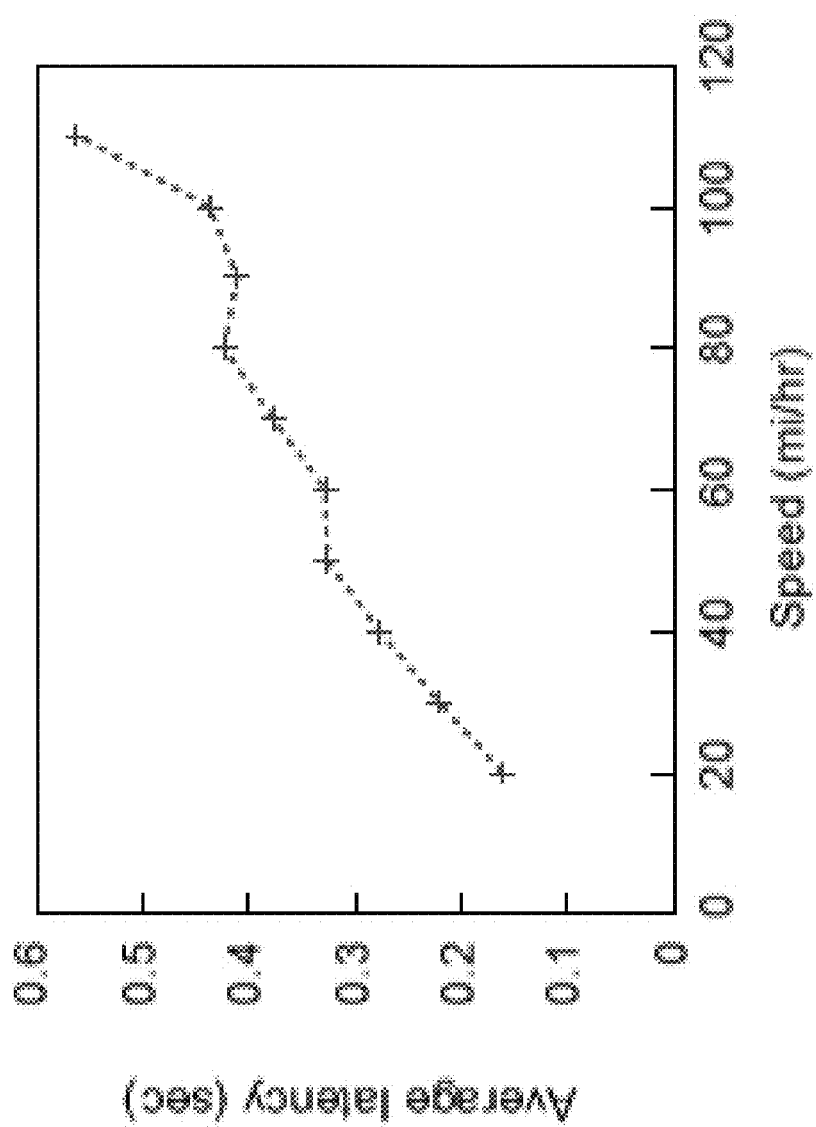
Figure 15D:
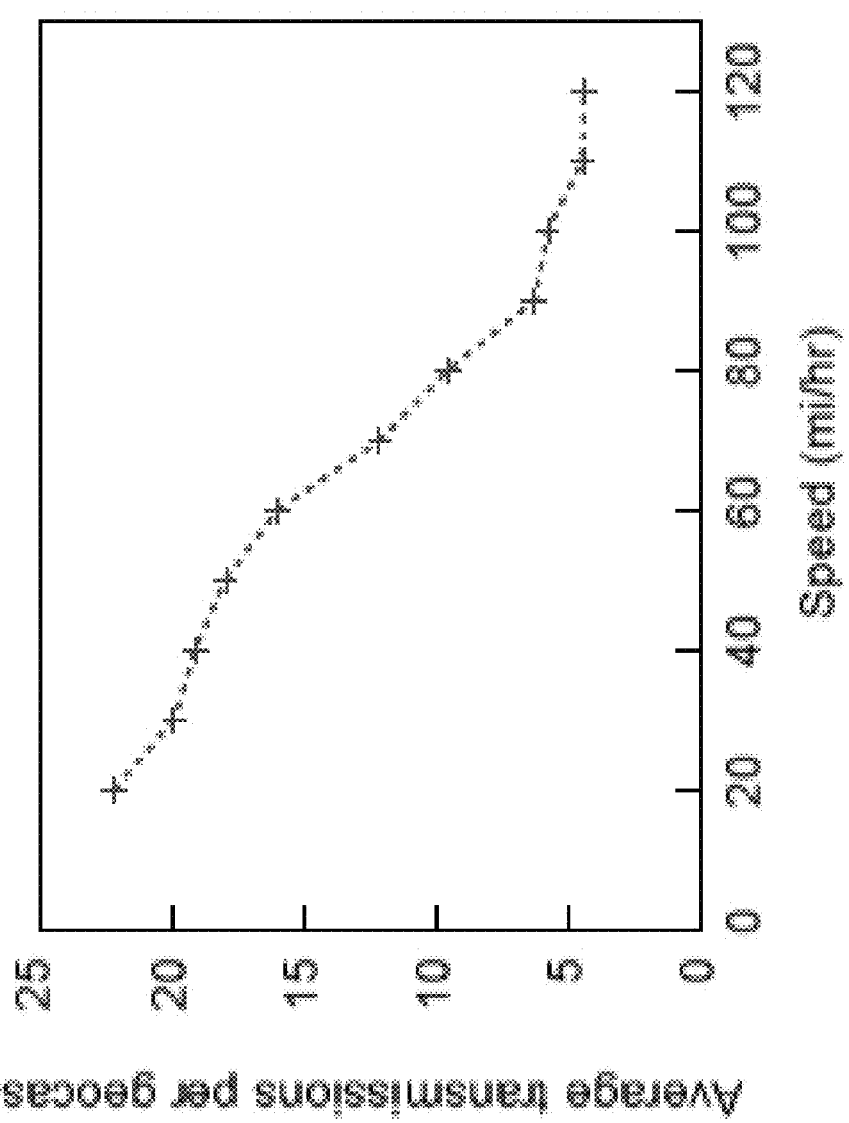
Figure 16A:
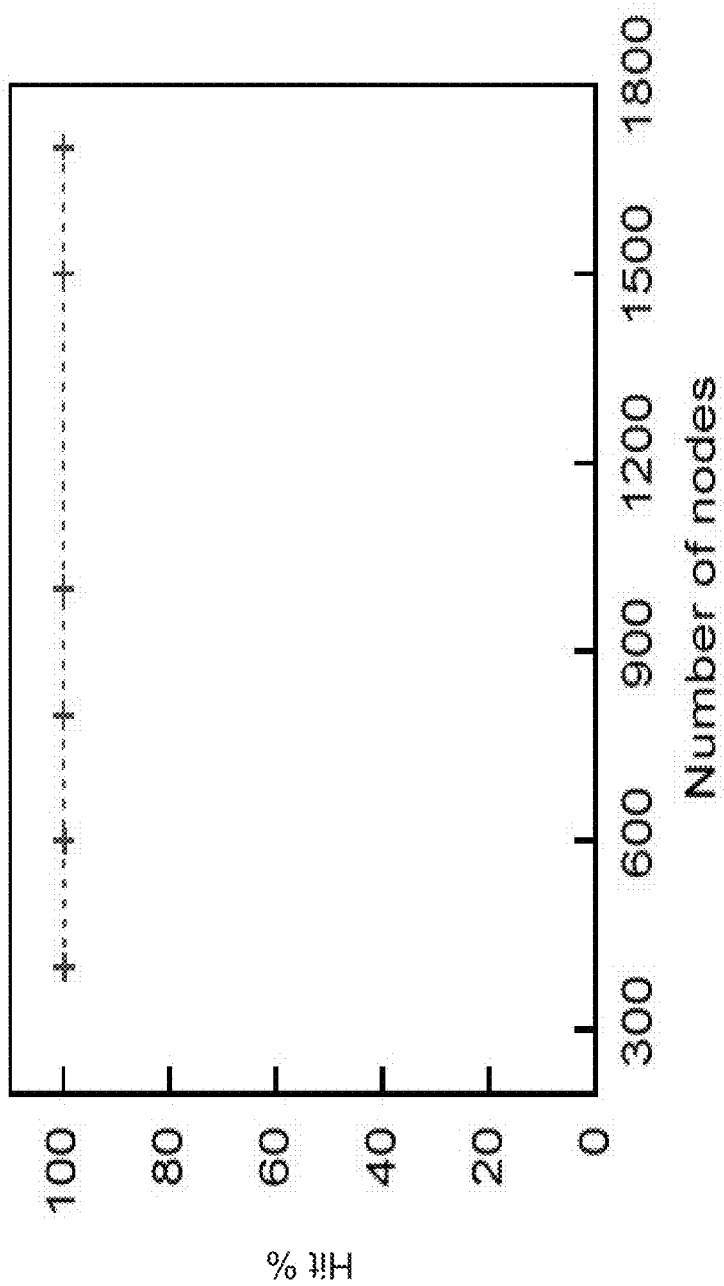
FIG. 16 illustrates graphs depicting static two dimensional simulation results. Graph (a) depicts hit %, graph (b)
Figure 16B:
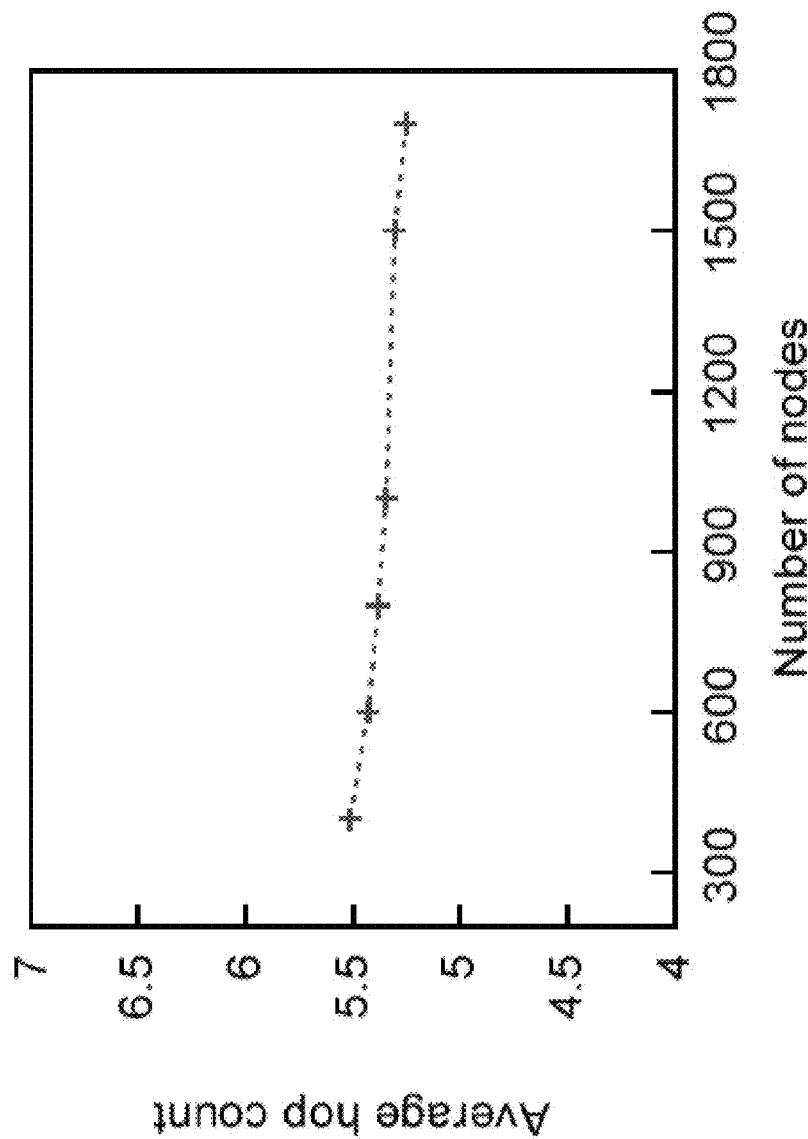
Figure 16C:
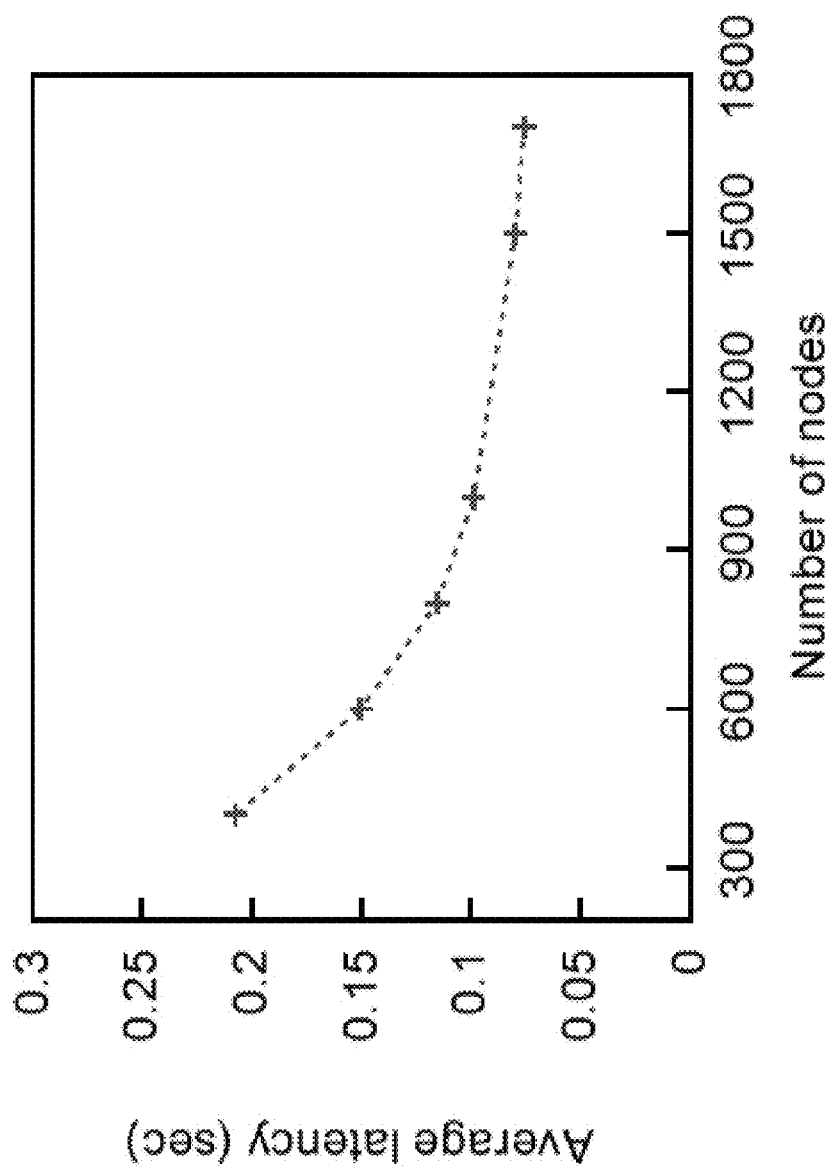
Figure 16D:
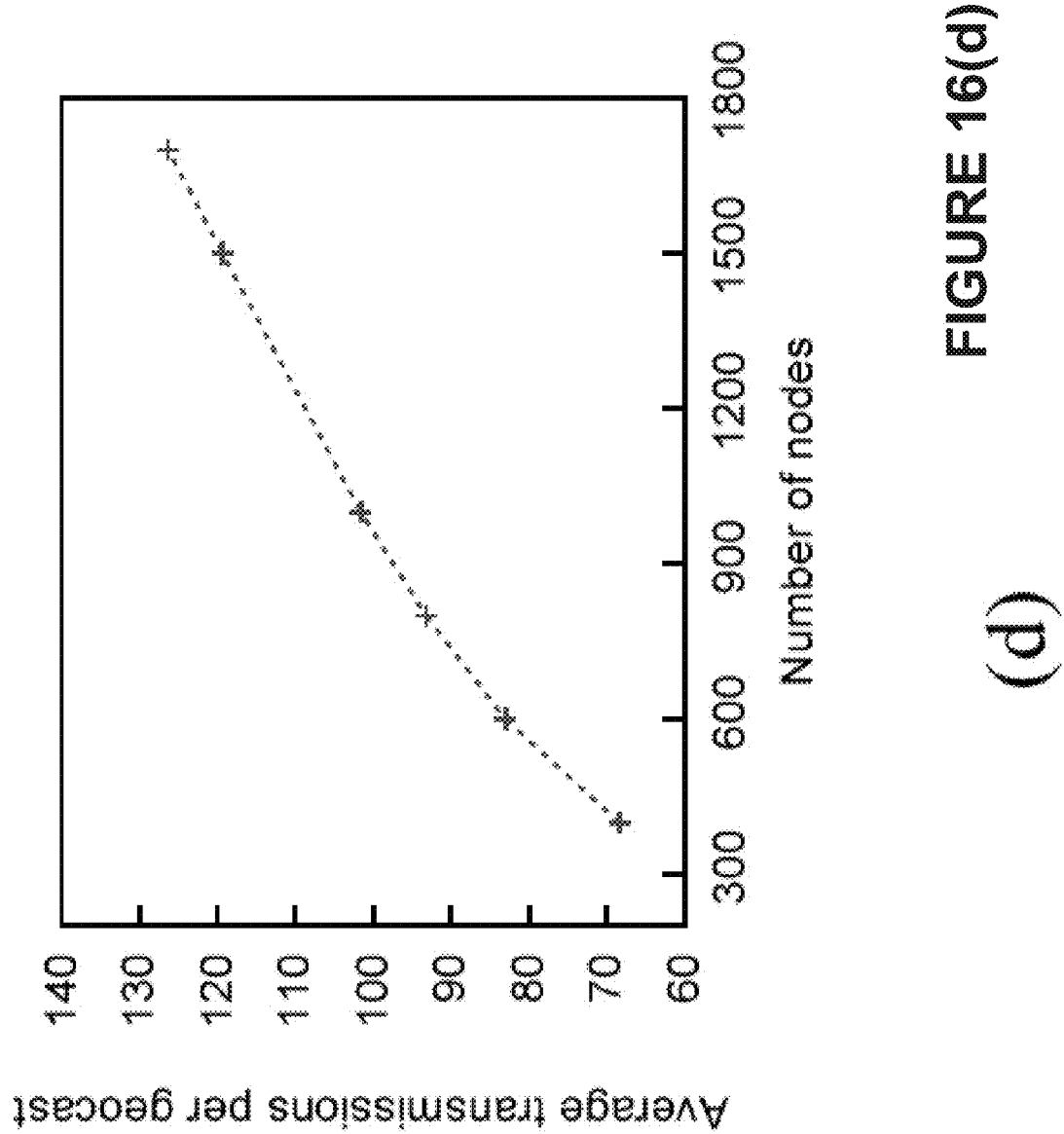

It is logistically challenging to perform large-scale real world experiments using vehicles. To this end, simulation experiments were performed to evaluate the scalability of GeoV2V under a wide range of operating conditions (e.g., vehicle speed, offered load, vehicle density, distance between the originator of the geocast and the center of the geocast region, etc.). A goal was to make the simulation environment as realistic as possible. FIG. 10 illustrates the components of the simulation environment. Vehicle traffic simulation is performed using a realistic road traffic model (SUMO). The core ad hoc communication geocast protocol (SAGP) was implemented via the NS-2 simulator. The SAGP protocol parameters were generated using the Geocast generator. The resulting mobility traffic files generated by SUMO and the geocast protocol parameters were used as inputs to drive the NS-2 simulator. This allows configuration of the various road network (vehicular) parameters and the ad hoc geocast protocol parameters independently to cover a wide range of realistic scenarios. Mobility files captured from the real world tests could also be used to drive the NS-2 simulator along with the field deployed geocast protocol parameters. In the previous section, it was found that the difference between simulation and real world experiment results was very small. And thus, it is believed that the simulation environment represents the real world tests quite accurately.

The SUMO simulator was used to simulate the movement of vehicles along a network of roads. SUMO uses a microscopic traffic model to simulate the movement of every vehicle in the network, considering both the vehicle's physical abilities to move and the driver's controlling behavior. Microscopic models resemble the real world road traffic more closely than the macroscopic models that use much coarser traffic flow as the basic unit for modeling. SUMO uses a so-called car following model, wherein the behavior of drivers is dependent on the distance to the vehicle in front of them and the leading vehicle's speed. SUMO uses more realistic models to simulate the effect of traffic lights, obstacles, accidents, etc. Routes taken by a vehicle can be controlled by simulation parameters like shortest path, fastest route, user-specified route, etc. The output of the SUMO simulator was converted to a mobility trace file that could be read by NS-2.

The geocast generator specified the properties of each unique geocast, time of generation, originator vehicle id, center of the geocast region, and radius of the geocast region. NS-2 ran the main simulation by using the mobility trace file from SUMO and geocast traffic file from the geocast generator. NS-2 is an open source discrete event network simulator. The SAGP protocol was implemented at the appropriate layer of the network stack. Every node in each simulation used the SAGP protocol, and the nodes themselves were connected over a single wireless ad-hoc network, which was limited by the normal constraints of radio range (100 m) and channel capacity (1 Mbps). Using the traffic and movement inputs as defined above (from the Geocast generator and SUMO, respectively), each simulation was run, and connectivity, bandwidth, and latency related issues that result from the input parameters were evaluated. Statistics were gathered on a per node and global basis.

Before presenting simulation results, some terms are defined as used herein. FIG. 11 illustrates a table, Table 3, summarizing the meaning of some terms and parameters used in simulation experiments. Total targets is the number of vehicles in the geocast region at the instant when the geocast message is transmitted by the geocast originator node. Feasible targets is the number of vehicles that have at least one network path to the geocast originator vehicle. There exists a network path <n0, n1, n2, . . . , nt> between an originator n0 and a target node nt in the geocast region if the distance between any two successive nodes in the path is less than the radio transmission range (100 meters in our case). It should be noted that this is a very simplistic definition of network connectivity because, in practice, the relationship between the probability of successful radio reception and distance between the transmitter and receiver is not a step function, but rather a decay function whose rate of decay is dependent on many factors such as environment of operation, interference, etc. By feasible targets, it is meant that if multiple retries (however large) are allowed and a perfect protocol exists, the originator of the geocast should be able to communicate with the feasible targets in the geocast region. Note that because of vehicle movement, it is possible that some nodes, which are within the geocast region when the geocast message is originated, may have moved out of the region by the time they receive the geocast message. Such nodes are called out of bound nodes. Out of bound target hits is the number of out of bound nodes that receive the geocast message. Similarly, non target hits is the number of nodes that are not in the geocast region when the geocast message is originated but are within the geocast region when they receive such message. Total hits is the number of nodes that are in the geocast region at the time instant of origination of geocast message as well as the instant when they receive the message. Hit % is the percentage of feasible targets that receive the geocast message. Note that hit %=(total hits+out of band target hits)/(feasible targets)*100. Geocast length is the distance between the originator of the geocast and the center of the geocast region. Separate NS-2 simulations were performed to correlate the transmission range and transmission power and it was found that the transmission power used throughout the experiments roughly corresponded to the transmission range of 100 meters.

GeoV2V was evaluated using the following vehicle traffic movement patterns: single lane case, double lane case, and static 2-dimensional case. In the single lane case, vehicles move along a single lane road. Each vehicle is equipped with a mobile or an embedded device that runs the GeoV2V protocol. 1000 geocasts are generated from randomly chosen vehicles. Geocast length is 400 meters and radius of geocast region is 20 meters for each geocast. The length of the road is 100 km. Other parameters are as mentioned in Table 3.

FIG. 12 illustrates graphs depicting results for different vehicle speeds. Graph (a) depicts target information, graph (b) depicts network density, graph (c) depicts feasible targets, graph (d) depicts hit %, graph (e) depicts the number of hops to the target vehicles, graph (f) depicts the time delay incurred to deliver geocast message to the target vehicles, and graph (g) depicts the number of transmission per geocast.

Graph (a) depicts various information about the destination vehicles targeted by the geocasts generated in the experiments for various values of speed limits of the road. As road speed limit (and thus the vehicle speed) increases, the ratio of feasible targets to total targets decreases, i.e., the network connectivity degrades as speed increases. When vehicle speed is 70 miles/hr., almost all of the targets are infeasible. To understand this, the average inter-vehicle distance was plotted as a function of road speed limit, and is depicted in graph (b). As vehicle speed increases, the average inter-vehicle distance increases because drivers keep more distance from the leading vehicle to allow for sufficient response time. As high speed leads to sparse network, network connectivity suffers.

Graph (c) depicts the ratio of feasible targets to total targets as a function of road speed limit for different geocast lengths. As expected, the percentage of feasible targets decreases as speed increases. Also, for a given speed, higher geocast length causes the percentage of feasible targets to decrease since more hops are required to deliver the message to the destination nodes. If the number of hops required for two vehicles to communicate increases, the probability of successful communication between them decreases because every hop in the multi-hop path must be successful.

Graph (d) depicts hit % as a function of vehicle speed. GeoV2V is an extremely reliable protocol since hit % is almost 100% for all speeds considered in our experiments. As long as network connectivity exists between the geocast originator vehicle and the target vehicles in the geocast region, GeoV2V reliably delivers the message to the target nodes.

Graph (e) depicts average hops required by GeoV2V to deliver the geocast message to the vehicles in the geocast region. On average, 5 to 6 hops are required to deliver geocast message to a region 400 meters away from the geocast originator. Since radio transmission range is 100 meters, this result indicates that because of the CD heuristic, nodes that are closer to the geocast region are more likely to forward the geocast message, thereby facilitating the progress of the geocast message towards its destinations.

Graph (f) depicts average time delay to deliver the geocast message to the destination nodes in the geocast region. Latency has an increasing trend with respect to speed because at high speeds, the network is sparse and the probability of a single-hop neighbor successfully receiving a packet decreases in a sparse network. As a result, more retransmissions are required and the delay increases. Another metric of a routing protocol is the number of radio transmissions required (by all nodes in the network) to deliver the message to the destination node(s). High number of radio transmissions means more energy consumption and bandwidth usage.

Graph (g) shows that GeoV2V requires a small number of transmissions per geocast. Also, as vehicle speed increases, the number of transmissions per geocast decreases. The increase in vehicle speed causes the inter-vehicle distance to increase and the network density to decrease. In a sparse network, the probability of a successful transmission is less, causing the number of transmissions to increase. However, this is dominated by the reduction in transmissions caused by the fact that in a sparse network, there are less nodes contending to forward the geocast message. As a result, overall number of transmissions per geocast decreases as vehicle speed increases. Furthermore, graph (g) shows that even at high vehicle densities, the number of transmissions per geocast is quite small. For example, at 20 miles/hr. speed (i.e., average inter-vehicle distance of 25.2 meters), the average number of transmissions required to deliver a geocast message to a region 400 meters away (between 5 and 6 hops, as shown in graph (e)) is 19.71. As described in more detail below, the effect of vehicle density on the number of transmissions per geocast was further investigated.

FIG. 13 illustrates graphs depicting single lane results for different geocast lengths. The performance of GeoV2V as a function of geocast length for a given road speed limit of 40 miles/hr. was evaluated. Other simulation parameters are the same as described above. Graph (a) depicts hit %, graph (b) depicts the number of hops to the target vehicles, graph (c)

depicts time delay to deliver geocast messages to the target vehicles, and graph (d) depicts the number of transmissions per geocast. Graph (a) shows that 100% of the feasible targets receive the geocast message for all geocast lengths (50 meters to 500 meters) considered in the experiments. As expected, graph (b) and graph (c) show that average hops and delay required to reach the target increases with the increase in the geocast length. As shown in graph (d), as geocast length increases, the average number of transmissions per geocast increases because more hops are required to reach the target (graph (b)).

FIG. 14 illustrates graphs depicting single lane results for different offered loads. Graph (a) depicts hit %, graph (b) depicts the number of hops to the target vehicles, graph (c) depicts time delay to deliver geocast messages to the target vehicles, and graph (d) depicts the number of transmissions per geocast. Experiments were conducted to evaluate GeoV2V's scalability with respect to geocast load—number of unique geocast originations per second. For this, considered were vehicles moving along a single lane road of length 2 km and speed limit=40 miles/hour. Unique geocasts are originated from randomly chosen vehicles. Geocast length is 400 meters and radius of the geocast region is 20 meters. Geocast loads were changed by varying the number of unique geocasts and keeping the simulation time constant. Other experimental parameters are same as those mentioned above. Graph (a) is a plots hit % as a function of geocast load. With the increase in the number of simultaneous geocasts, network congestion increases and hit % decreases. However, it was found that even under very high loads, GeoV2V provides a very good performance. For example, even when geocast load is 100 geocasts/sec, hit % is above 65%. Graph (b) and graph (c) show number of hops and time delay incurred in delivering geocast message to the target vehicles, respectively. GeoV2V does not incur significantly high delay even under very high load conditions. Graph (d) shows that the average number of transmissions per geocast does not change significantly with respect to the offered load.

The reason behind GeoV2V's excellent performance for a wide range of vehicle densities and offered load is that SAGP protocol offers an excellent balance between efficiency and reliability. The suppression mechanism (M heuristic) of the geocast protocol offers efficiency by making the scheme robust even under high load and vehicle densities. The network is not swamped by many redundant transmissions by nearby nodes. Similarly, T and CD heuristics help GeoV2V to be highly reliable by selecting those nodes to forward the message, which causes the geocast message to quickly progress towards the target nodes.

From the single lane results, it was observed that there is a fundamental limit on network connectivity caused by vehicles moving at high speed. As vehicle speed increases, drivers increase inter-vehicle distance between successive vehicles to allow for sufficient response time. As a result, beyond some threshold value of vehicle speed network connectivity becomes very poor. For example, for the single lane case and radio transmission range of 100 meters, as seen from FIG. 12, graph (c), there exists a reasonably good network connection up to vehicle speed of 60 miles/hr. The threshold also depends on the geocast length at a given speed. The larger the geocast length, the smaller is the probability of successful communication, as shown in FIG. 12, graph (c).

FIG. 15 illustrates graphs depicting double lane results for different vehicle speeds. Graph (a) depicts hit %, graph (b) depicts the number of hops to the target vehicles, graph (c) depicts time delay to deliver geocast messages to the target vehicles, and graph (d) depicts the number of transmissions per geocast. For a given speed limit, vehicle density in a multiple lane road is more than that in a single lane road. As a result, at high speeds when the network is sparse, a vehicle moving along a lane may not be able to forward a geocast message to a leading vehicle on the same lane, but it may be able to forward the message to another vehicle in another lane. This suggests that threshold vehicle speed up to which GeoV2V works should increase as the number of lanes increases. To study this, simulations were run for a double lane road with vehicles moving in the same direction in both lanes. Other parameters for the experiment are same as those in the single lane case. Graph (a) shows that a very high hit % can be achieved for speeds up to 120 miles/hr. The threshold vehicle speed is almost doubled by doubling the number of lanes. Graph (b) and graph (c) show that average hops and delay required to deliver the geocast message to destination nodes, respectively. As in single lane case, graph (d) shows that average transmissions per geocast decreases as vehicle speed increases. Simulations were also performed for the case where vehicles in a double lane road move in opposite directions. It was found that the results are similar to the double lane case with vehicles moving along the same direction.

It has been shown that a simple flooding scheme scales very poorly with node density. In high densities, the number of radio transmissions increases significantly causing the network throughput to collapse. From the simulation experiments, it was noticed that GeoV2V is very flexible. It delivers geocast messages to target nodes reliably in a wide range of vehicle densities (i.e., vehicle speeds) using a small number of transmissions. In order to further investigate this under very high vehicle density cases, simulations were performed in a static 2-dimensional (2D) setting. Since vehicle density is a function of vehicle speed, the static case was considered to simulate very high node densities like traffic jam conditions. N nodes placed randomly in an (1000 m×1000 m) area were considered. 100 geocasts were generated by randomly chosen nodes. For each geocast, the center of the target geocast region was chosen randomly. Radius of the geocast region was 20 meters. Various vehicle densities were simulated by varying the number of nodes N. 1000 topologies were generated randomly for each value of N and the average results are provided below.

FIG. 16 illustrates graphs depicting static two dimensional simulation results. Graph (a) depicts hit %, graph (b) depicts the number of hops to the target vehicles, graph (c) depicts time delay to deliver geocast messages to the target vehicles, and graph (d) depicts the number of transmissions per geocast. Graph (a) shows hit % for different node densities. It was found that GeoV2V achieves 100% success rate for all vehicle densities considered in our experiments. Graph (b) and graph (c) show the average number of hops and delay required to deliver the geocast message to the destination geocast region, respectively. As node density increases, the probability of a node successfully receiving a packet in each hop also increases. Also, as node density increases, the average number of transmissions per geocast increases because at high density there are more nodes which can forward the geocast message (see FIG. 16, graph (d)). However, it should be noted that the total number of transmissions increases at a very slow rate with density. In other words, GeoV2V scales very well with node density.

Also considered was a static case that is special case of geographic routing protocols in a congested area. Each node chooses a random geocast region of a certain area. With the increase in the area of the geocast region, simultaneous transmissions from multiple sources will be infeasible due to interference. Thus a question arises as to how many simultaneous geocasts can be supported. It was found that if there are n nodes spread uniformly in an area of 1 m² and the area of the geocast region is at-most $O(n^{-1/2})$, then the number of parallel geographical routing sessions is of the same order as the number of point to point sessions. However, when the area of geocast region increases, there comes a point when they start overlapping, and thus the messages from different geocasts interfere. This decreases the total number of feasible simultaneous geocasts. In the extreme case when the geocast region occupies the entire area, each node receives all the geocast messages. In such a case, only one geocast session can be supported. The throughput attained by each node is the sum throughput (or the number of simultaneous geocasts) divided by the total number of nodes. How throughput scales for geocasts in dense networks is described below. Consider n nodes randomly located, i.e., independently and uniformly distributed, either on a surface of a three dimensional sphere of area 1 m², or in a disc of area 1 m² in a plane. Each node chooses a geocast region randomly. It wishes to send (n) bits per second. The center of the geocast region is independently chosen as the node nearest to a randomly located point, i.e., uniformly and independently distributed. Therefore, the center of the geocast regions are on the order of 1 m away on average from the source. Further, the area of the geocast region is (n−d) for some d>0.

In this random setting, it is assumed that nodes are homogeneous, i.e., all transmissions employ the same nominal range or power. Two models of communication are used, namely Protocol model and Physical model. In the protocol model, all nodes employ a common range r for all their transmissions. When node $X_i$ transmits to a node $X_j$, the transmission is successfully received if the distance between $X_i$ and $X_j$ is no more than r, and any other transmitting node $X_k$ is at-least $(1+\Delta)r$ distant from $X_j$.

In the physical model, all nodes choose a common power P for the transmissions. Let $\{X_k; k \in T\}$ be the subset of nodes that are simultaneously transmitting at some time instant. A transmission from $X_i$, i∈T, is successfully received by node $X_j$ if SINR is greater than β or $$\frac{\frac{P}{|X_i - X_j|^\alpha}}{N + \sum_{k \in T, k \neq i} \frac{P}{|X_k - X_j|^\alpha}} \geq \beta \quad (1)$$

where N is the noise variance, and α is path loss parameter. The feasible throughput of geocast is now defined.

DEFINITION 1. Throughput of λ(n) bits per second for each node is said to be feasible if there is a spatio-temporal scheme of scheduling transmissions, such that by operating the network in a multihop fashion, every node can send λ(n) bits per second on an average to every node in its chosen geocast region.

The theorem for throughput scaling with respect to geocast for random networks.

THEOREM 1. Throughput of $\Theta(n^{-max(1/2,1-d)}/\log(n))$ is feasible when the area of geocast region is $\Theta(n^{-d})$ for both the protocol and the physical models.

PROOF. Consider a random subnetwork of the original network containing $n^{min(2d,1)}$ source nodes and their corresponding center of geocast regions. This choice is taken so as to create a sparser network of the nodes so that broadcasting from all the center of geocast regions will not interfere with each other as explained below.

Time is slotted into two halves. Messages will be transmitted from the sources to the center of geocast regions in the first time slot and then broadcast from the center of geocast region to all the nodes in the region in the second time-slot. The overall throughput is reduced by a factor of 2 due to these two time-slots which we are ignored since it does not impact the scaling.

In the first time slot, it is assumed that only the nodes in the subnetwork of size $m=n^{min(2d,1)}$ exist. All other nodes are turned off. Then, point-to-point transmission is from the sources to their corresponding center of geocast regions is performed. A total of $\Theta(m^{1/2}/\log m)$ sessions can run in parallel.

In the second time-slot, the message is broadcast from the center of each of these geocast regions to all the nodes in their respective regions. By appropriately selecting geocast regions, there is no interference between broadcasts from different centers of geocast regions. The geocast regions are non-overlapping. Hence, a total of $\Theta(m^{1/2}/\log m)$ geocast sessions can be supported simultaneously. The transmitting nodes in the subnetwork can be randomized and also the selection of random subnetwork can be randomized. This results in per node throughput of $\Theta(m^{1/2}/\log m/n) = \Theta(n^{-max(1/2,1-d)}/\log(n))$.

The number of simultaneous geocast sessions is $O(n^{min(1/2,d)}/\log n)$. The number of nodes that receive each message is $O(n^{max(0,1-d)})$. Thus, the total sum throughput that is received by all the nodes is $O(n^{min(1/2,d)}/\log n \times n^{max(0,1-d)})$. Thus, for d<1, it is found that the sum throughput of the network is $O(n^{1-max(d-1/2,0)}/\log n)$ while for d≥1, the sum throughput is $O(n^{1/2})$. Thus, the sum throughput decreases with d, or increases with the area of the geocast region. Note that when d is large enough, the geocast region is just a point. In this case the result reduces to that for point to point scaling throughput.

The number of transmissions for a flooding protocol is compared to the number of transmission for SAGP for a single geocast transmission when all nodes are static and spread uniformly over a straight line. It was found that the geocast protocol performs as good as flooding in the case of very sparse network. This is expected since the message has to reach the destination via all the nodes in-between. For a very dense network, geocast protocol suppresses a lot of transmissions. As used herein, a flooding protocol is defined as the protocol where every node that receives the packet forwards the packet.

A special case of the SAGP was considered for this comparison. Let the distance from source to center of geocast region be kT where T is the T heuristic. Let the radio transmission distance be cT, for some c≥2 (and the forwarding zone is ≥cT.). It is assumed that every node can receive the message in the radio transmission range successfully. It further is assumed that the geocast length is ≤T. It also is assumed that M=2. Further, k and c can be either independent or dependent. The scaling orders will be derived with respect to these parameters. The results are summarized in Table 4 in FIG. 17.

In a sparse network with at-most a constant number of nodes every distance cT, the number of transmissions is O(k/c) for both flooding and SAGP protocols. There are a total number of O(k/c) nodes. Flooding will go over at most all the nodes and thus achieve O(k/c) transmissions. Even the best scheduling has to go over one node every distance cT and thus get O(k/c) transmissions. Since number of transmissions in SAGP is in between best scheduling and flooding, the number of transmissions is O(k/c) for both flooding and SAGP protocols.

In a dense network with O(n) every distance T, the number of transmissions is O(k/c) for SAGP protocol while it is O(kn) for flooding protocol. The number of transmissions for flooding is O(kn) since these are the total number of nodes and each of them will transmit.

For SAGP protocol, let the node that forwards the message at time i be distance $d_i$ from the source. Since source sends the first packet, $d_1=0$. Nodes within distance 0 to cT receive the message. Let a node at distance $0<d2 \le cT$ transmit. With this, all the nodes from $0 \le d \le cT$ have received message twice and thus the M heuristic is not invoked. The T heuristic also is not invoked for all the nodes that are within $d_2$ distance from the source. The CD heuristic will be invoked for the nodes that are farther than $d_2$ but gives more probability of sending to nodes that are farther. An upper bound on the number of transmissions is considered by assuming that all the nodes in range (d2, d2+cT) are equally likely to send. This gives $d_3=d_2+x_1$ where $x_1$ is a uniform random variable in the range (0, cT). Continuing, it is found find that $di=d_{i-1}+x_{i-2}$ for i>3, where $x_{i-2}$ is a uniform random variable in the range (0, cT). Thus, it can be seen that $d_i=d_2+\Sigma_{j=1}^{i-2}x_j$. The probability that sum of 2 k/cm terms, each uniformly distributed with mean cT, is less than kT goes to zero for large m. Thus, probability that it takes more than 2 k/cm+2 times to reach destination is negligible. Thus, the number of transmissions is O(k/c). Note that a lot of transmissions are saved by the SAGP protocol in the dense network configuration.

FIG. 18 is a block diagram of an example wireless communications device that is configurable to facilitate GeoV2V. The mobile device 200 can include any appropriate device, mechanism, software, and/or hardware for facilitating GeoV2V as described herein. As described herein, the mobile device 200 comprises hardware, or a combination of hardware and software. And, each portion of the mobile device 200 comprises hardware, or a combination of hardware and software. In an example configuration, the mobile device 200 can comprise a processing portion 202, a memory portion 204, an input/output portion 206, a user interface (UI) portion 208, and a sensor portion 210 comprising at least one of a video camera portion 212, a force/wave sensor 214, a microphone 216, a moisture sensor 218, a compass, 219, or a combination thereof. The force/wave sensor 214 can comprise at least one of a motion detector, an accelerometer, an acoustic sensor, a tilt sensor, a pressure sensor, a temperature sensor, or the like. The motion detector can be configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 218 is capable of detecting moisture, such as detecting if the mobile device 200 is submerged in a liquid. The processing portion 202, memory portion 204, input/output portion 206, user interface (UI) portion 208, video camera portion 212, force/wave sensor 214, and microphone 216 are coupled together to allow communications therebetween (coupling not shown in FIG. 18). The mobile device 200 also can comprise a timer (not depicted in FIG. 18).

In various embodiments, the input/output portion 206 comprises a receiver of the mobile device 200, a transmitter of the mobile device 200, or a combination thereof. The input/output portion 206 is capable of, in conjunction with any other portion of the mobile device 200 as needed, receiving and/or providing information pertaining to facilitating GeoV2V as described herein. The input/output portion 206 also is capable of communications with other devices/sensors, as described herein. For example, the input/output portion 206 can include a wireless communications (e.g., 2.5G/3G/4G) SIM card. The input/output portion 206 is capable of receiving and/or sending text information, video information, audio information, control information, image information, data, or any combination thereof. In an example embodiment, the input/output portion 206 is capable of receiving and/or sending information to determine a location of the mobile device 200. In an example configuration, the input\output portion 206 comprises a GPS receiver. In an example configuration, the mobile device 200 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 206 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 202 is capable of facilitating GeoV2V, as described herein. The processing portion 202, in conjunction with any other portion of the mobile device 200, can provide the ability for users/subscribers to enable, disable, and configure various features of an application for facilitating GeoV2V, as described herein. The processing portion 202, in conjunction with any other portion of the mobile device 200 as needed, can enable the mobile device 200 to covert speech to text when it is configured to send text messages. In an example embodiment, the processing portion 202, in conjunction with any other portion of the mobile device 200 as needed, can convert text to speech for rendering via the user interface portion 208.

In a basic configuration, the mobile device 200 can include at least one memory portion 204. The memory portion 204 can store any information utilized in conjunction with facilitating GeoV2V, as described herein. Depending upon the exact configuration and type of processor, the memory portion 204 can be volatile (such as some types of RAM), non-volatile (such as ROM, flash memory, for example.). The mobile device 200 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 204, or a portion of the memory portion 202 is hardened such that information stored therein can be recovered if the mobile device 200 is exposed to extreme heat, extreme vibration, extreme moisture, corrosive chemicals or gas, or the like. In an example configuration, the information stored in the hardened portion of the memory portion 204 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 204 intelligible.

The mobile device 200 also can contain a UI portion 208 allowing a user to communicate with the mobile device 200. The UI portion 208 is capable of rendering any information utilized in conjunction with the mobile device 200 to facilitate GeoV2V, as described herein. For example, the UI portion 208 can provide means for entering text, entering a phone number, rendering text, rendering images, rendering multimedia, rendering sound, rendering video, receiving sound, rendering mechanical vibration, or the like, as described herein. The UI portion 208 can provide the ability to control the mobile device 200, via, for example, buttons, soft keys, voice actuated controls, a touch screen, movement of the mobile device 200, visual cues (e.g., moving a hand or finger in front of a camera on the mobile device 200), or the like. The UI portion 208 can provide visual information (e.g., via a display), audio information (e.g., via speaker), mechanically (e.g., via a vibrating mechanism), or a combination thereof. In various configurations, the UI portion 208 can comprise a display, a touch screen, a keyboard, a speaker, or any combination thereof. The UI portion 208 can comprise means for inputting biometric information, such as, for example, fingerprint information, retinal information, voice information, and/or facial characteristic information. The UI portion 208 can be utilized to enter an indication of the designated destination (e.g., the phone number, IP address, geographic information, or the like).

In an example embodiment, the sensor portion 210 of the mobile device 200 comprises the video camera portion 212, the force/wave sensor 214, and the microphone 216. The video camera portion 212 comprises a camera (or cameras) and associated equipment capable of capturing still images and/or video and to provide the captured still images and/or video to other portions of the mobile device 200. In an example embodiment, the force/wave sensor 214 comprises an accelerometer, a tilt sensor, an acoustic sensor capable of sensing acoustic energy, an optical sensor (e.g., infrared), or any combination thereof.

Although not necessary to implement the mobile device 200 to facilitate GeoV2V, a communications device can be part of and/or in communications with various wireless communications networks. Some of which are described below.

FIG. 19 depicts an overall block diagram of an exemplary packet-based mobile cellular network environment, such as a GPRS network, within which a mobile device configured to facilitate GeoV2V can be implemented. In the exemplary packet-based mobile cellular network environment shown in FIG. 19, there are a plurality of Base Station Subsystems ("BSS") 1100 (only one is shown), each of which comprises a Base Station Controller ("BSC") 1102 serving a plurality of Base Transceiver Stations ("BTS") such as BTSs 1104, 1106, and 1108. BTSs 1104, 1106, 1108, etc. are the access points where users of packet-based mobile devices become connected to the wireless network. In exemplary fashion, the packet traffic originating from user devices is transported via an over-the-air interface to a BTS 1108, and from the BTS 1108 to the BSC 1102. Base station subsystems, such as BSS 1100, are a part of internal frame relay network 1110 that can include Service GPRS Support Nodes ("SGSN") such as SGSN 1112 and 1114. Each SGSN is connected to an internal packet network 1120 through which a SGSN 1112, 1114, etc. can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 mainly provide an interface to external Internet Protocol ("IP") networks such as Public Land Mobile Network ("PLMN") 1150, corporate intranets 1140, or Fixed-End System ("FES") or the public Internet 1130. As illustrated, subscriber corporate network 1140 may be connected to GGSN 1124 via firewall 1132; and PLMN 1150 is connected to GGSN 1124 via boarder gateway router 1134. The Remote Authentication Dial-In User Service ("RADIUS") server 1142 may be used for caller authentication when a user of a mobile cellular device calls corporate network 1140.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

FIG. 20 illustrates an architecture of a typical GPRS network within which a mobile device configured to facilitate GeoV2V can be implemented. The architecture depicted in FIG. 20 is segmented into four groups: users 1250, radio access network 1260, core network 1270, and interconnect network 1280. Users 1250 comprise a plurality of end users. Note, device 1212 is referred to as a mobile subscriber in the description of network shown in FIG. 20. In an example embodiment, the device depicted as mobile subscriber 1212 comprises a communications device (e.g., device/sensor 70). Radio access network 1260 comprises a plurality of base station subsystems such as BSSs 1262, which include BTSs 1264 and BSCs 1266. Core network 1270 comprises a host of various network elements. As illustrated in FIG. 20, core network 1270 may comprise Mobile Switching Center ("MSC") 1271, Service Control Point ("SCP") 1272, gateway MSC 1273, SGSN 1276, Home Location Register ("HLR") 1274, Authentication Center ("AuC") 1275, Domain Name Server ("DNS") 1277, and GGSN 1278. Interconnect network 1280 also comprises a host of various networks and other network elements. As illustrated in FIG. 20, interconnect network 1280 comprises Public Switched Telephone Network ("PSTN") 1282, Fixed-End System ("FES") or Internet 1284, firewall 1288, and Corporate Network 1289.

A mobile switching center can be connected to a large number of base station controllers. At MSC 1271, for instance, depending on the type of traffic, the traffic may be separated in that voice may be sent to Public Switched Telephone Network ("PSTN") 1282 through Gateway MSC ("GMSC") 1273, and/or data may be sent to SGSN 1276, which then sends the data traffic to GGSN 1278 for further forwarding.

When MSC 1271 receives call traffic, for example, from BSC 1266, it sends a query to a database hosted by SCP 1272. The SCP 1272 processes the request and issues a response to MSC 1271 so that it may continue call processing as appropriate.

The HLR 1274 is a centralized database for users to register to the GPRS network. HLR 1274 stores static information about the subscribers such as the International Mobile Subscriber Identity ("IMSI"), subscribed services, and a key for authenticating the subscriber. HLR 1274 also stores dynamic subscriber information such as the current location of the mobile subscriber. Associated with HLR 1274 is AuC 1275. AuC 1275 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 20, when mobile subscriber 1212 initiates the attach process by turning on the network capabilities of the mobile device, an attach request is sent by mobile subscriber 1212 to SGSN 1276. The SGSN 1276 queries another SGSN, to which mobile subscriber 1212 was attached before, for the identity of mobile subscriber 1212. Upon receiving the identity of mobile subscriber 1212 from the other SGSN, SGSN 1276 requests more information from mobile subscriber 1212. This information is used to authenticate mobile subscriber 1212 to SGSN 1276 by HLR 1274. Once verified, SGSN 1276 sends a location update to HLR 1274 indicating the change of location to a new SGSN, in this case SGSN 1276. HLR 1274 notifies the old SGSN, to which mobile subscriber 1212 was attached before, to cancel the location process for mobile subscriber 1212. HLR 1274 then notifies SGSN 1276 that the location update has been performed. At this time, SGSN 1276 sends an Attach Accept message to mobile subscriber 1212, which in turn sends an Attach Complete message to SGSN 1276.

After attaching itself with the network, mobile subscriber 1212 then goes through the authentication process. In the authentication process, SGSN 1276 sends the authentication information to HLR 1274, which sends information back to SGSN 1276 based on the user profile that was part of the user's initial setup. The SGSN 1276 then sends a request for authentication and ciphering to mobile subscriber 1212. The mobile subscriber 1212 uses an algorithm to send the user identification (ID) and password to SGSN 1276. The SGSN 1276 uses the same algorithm and compares the result. If a match occurs, SGSN 1276 authenticates mobile subscriber 1212.

Next, the mobile subscriber 1212 establishes a user session with the destination network, corporate network 1289, by going through a Packet Data Protocol ("PDP") activation process. Briefly, in the process, mobile subscriber 1212 requests access to the Access Point Name ("APN"), for example, UPS.com, and SGSN 1276 receives the activation request from mobile subscriber 1212. SGSN 1276 then initiates a Domain Name Service ("DNS") query to learn which GGSN node has access to the UPS.com APN. The DNS query is sent to the DNS server within the core network 1270, such as DNS 1277, which is provisioned to map to one or more GGSN nodes in the core network 1270. Based on the APN, the mapped GGSN 1278 can access the requested corporate network 1289. The SGSN 1276 then sends to GGSN 1278 a Create Packet Data Protocol ("PDP") Context Request message that contains necessary information. The GGSN 1278 sends a Create PDP Context Response message to SGSN 1276, which then sends an Activate PDP Context Accept message to mobile subscriber 1212.

Once activated, data packets of the call made by mobile subscriber 1212 can then go through radio access network 1260, core network 1270, and interconnect network 1280, in a particular fixed-end system or Internet 1284 and firewall 1288, to reach corporate network 1289.

FIG. 21 illustrates an exemplary block diagram view of a GSM/GPRS/IP multimedia network architecture within which a mobile device configured to facilitate inter-vehicle communications utilizing a scalable ad hoc geocast protocol can be implemented. As illustrated, the architecture of FIG. 21 includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1304 is physical equipment, such as a radio tower, that enables a radio interface to communicate with the MS. Each BTS may serve more than one MS. The BSC 1306 manages radio resources, including the BTS. The BSC may be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1318, and an Equipment Identity Register (EIR) 1316. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. Thus, the GMSC 1310 provides interworking functionality with external networks.

The HLR 1312 is a database that contains administrative information regarding each subscriber registered in a corresponding GSM network. The HLR 1312 also contains the current location of each MS. The VLR 1314 is a database that contains selected administrative information from the HLR 1312. The VLR contains information necessary for call control and provision of subscribed services for each MS currently located in a geographical area controlled by the VLR. The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (i.e., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations and security functions and access controls.

A Cell Broadcast Center (CBC) 1317 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS through the SGSN. When packet-switched data leaves the GPRS network, it is transferred to an external TCP-IP network 1336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1338 was introduced with 3GPP Release 5, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 may be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 may also modify an outgoing request according to a set of rules defined by the network operator (for example, address analysis and potential modification).

The I-CSCF 1343, forms an entrance to a home network and hides the inner topology of the home network from other networks and provides flexibility for selecting an S-CSCF. The I-CSCF 1343 may contact a subscriber location function (SLF) 1345 to determine which HSS 1350 to use for the particular subscriber, if multiple HSS's 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with other IP multimedia networks 1354.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

FIG. 22 illustrates a PLMN block diagram view of an exemplary architecture in which a mobile device configured to facilitate inter-vehicle communications utilizing a scalable ad hoc geocast protocol may be incorporated. Mobile Station (MS) 1401 is the physical equipment used by the PLMN subscriber. In one illustrative embodiment, WT 200 and/or communications device 120 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 22 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Exemplary data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of inter-vehicle communications utilizing a scalable ad hoc geocast protocol have been described in connection with various computing devices/processors, the underlying concepts can be applied to any computing device, processor, or system capable of implementing inter-vehicle communications utilizing a scalable ad hoc geocast protocol. The various techniques described herein can be implemented in connection with hardware or software or, where appropriate, with a combination of both. Thus, the methods and apparatuses for implementing inter-vehicle communications utilizing a scalable ad hoc geocast protocol, or certain aspects or portions thereof, can utilize program code (i.e., instructions) embodied in tangible storage media having a tangible physical structure. Examples of tangible storage media include floppy diskettes, CD-ROMs, DVDs, hard drives, or any other tangible machine-readable storage medium (tangible computer-readable storage medium). Thus, a tangible storage medium as described herein is not a transient propagating signal. When the program code is loaded into and executed by a machine, such as a computer, the machine becomes an apparatus for implementing a mobile device configured to facilitate inter-vehicle communications utilizing a scalable ad hoc geocast protocol. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for implementing a mobile device configured to facilitate inter-vehicle communications utilizing a scalable ad hoc geocast protocol also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing a mobile device configured to facilitate inter-vehicle communications utilizing a scalable ad hoc geocast protocol. When implemented on a general-purpose processor, the program code combines with the processor to provide a unique apparatus that operates to invoke the functionality of a mobile device configured to facilitate inter-vehicle communications utilizing a scalable ad hoc geocast protocol.

While a mobile device configured to facilitate inter-vehicle communications utilizing a scalable ad hoc geocast protocol has been described in connection with the various embodiments of the various figures, it is to be understood that other similar embodiments can be used or modifications and additions can be made to the described embodiments for a mobile device configured to facilitate inter-vehicle communications utilizing a scalable ad hoc geocast protocol without deviating therefrom. For example, one skilled in the art will recognize that a mobile device configured to facilitate inter-vehicle communications utilizing a scalable ad hoc geocast protocol as described in the present application may apply to any environment, whether wired or wireless, and may be applied to any number of such devices connected via a communications network and interacting across the network. A mobile device configured to facilitate inter-vehicle communications utilizing a scalable ad hoc geocast protocol should not be limited to any single embodiment, but rather should be construed in breadth and scope in accordance with the appended claims.

What is claimed:
1. A method comprising:
 receiving, by a first processor-based device, a message, the message broadcasted and comprising a description of a region of intended reception of the message;

determining, by the first device, whether to retransmit the message based at least in part on a distance from the first device to a center point of the region;

when it is determined to retransmit the message, retransmitting the message, the retransmitted message comprising the description of the region; and receiving, by the first device, a response indicative of a determination by a second processor-based device that the second device is within the region, wherein the response comprises a description of the location of the second device.

2. The method of claim 1, wherein:
when it is determined that the second device is within the region, the response comprises an indication of a speed at which the second device is moving.

3. The method of claim 1, wherein:
when it is determined that the second device is within the region, the response comprises an indication of a direction in which the second device is moving.

4. The method of claim 1, wherein
when it is determined that the second device is within the region, the response comprises an indication of availability of a parking space.

5. The method of claim 1, wherein:
when it is determined that the second device is within the region, the response comprises information pertaining to at least one of an advertisement or seating availability.

6. The method of claim 1, wherein the second device is located within a vehicle.

7. The method of claim 1, further comprising:
determining whether the message was received at least a predetermined number of times by the first device; and
when it is determined that the message has not been received the predetermined number of times, retransmitting the message.

8. The method of claim 1, further comprising:
determining whether the message was sent from a location closer than or equal to a predetermined minimum distance from a location of the first device; and
when it is determined that the message was not sent from a location closer than or equal to the predetermined minimum distance from the location of the first device, retransmitting the message.

9. The method of claim 1, further comprising:
determining a first distance from the first device to a point in the intended reception of the message;
determining a plurality of distances between the point and each of a plurality of sources from which the second device previously has received the message; and
retransmitting the message when the first distance is less than each of the plurality of distances.

10. The method of claim 1, further comprising:
determining if the second device has received the message at least a predetermined number of times; and
when it is determined that the second device has not received the message at least the predetermined number of times, retransmitting the message.

11. A first device comprising:
a processor; and memory coupled to the processor, the memory comprising executable instructions that when executed by the processor cause the processor to effectuate operations comprising:
receiving a message, the message broadcasted and comprising a description of a region of intended reception of the message;

determining whether to retransmit the message based at least in part on a distance from the first device to a center point of the region;
when it is determined to retransmit the message, retransmitting the message, the retransmitted message comprising the description of the region;
receiving a response indicative of a determination by a second device that the second device is within the region, wherein the response comprises a description of the location of the second device.

12. The first device of claim 11, wherein the response comprises at least one of:
an indication of a speed at which the second device is moving;
an indication of a direction in which the second device is moving;
an indication of availability of a parking space;
an advertisement; or
information pertaining to seating availability.

13. The first device of claim 11, wherein the first device is located within a vehicle.

14. The first device of claim 11, the operations further comprising:
determining whether the message was received at least a predetermined number of times by the first device; and
when it is determined that the message has not been received the predetermined number of times, retransmitting the message.

15. The first device of claim 11, the operations further comprising:
determining whether the message was sent from a location closer than or equal to a predetermined minimum distance from a location of the first device; and
when it is determined that the message was not sent from a location closer than or equal to the predetermined minimum distance from the location of the first device, retransmitting the message.

16. The first device of claim 11, the operations further comprising:
determining a first distance from the first device to a point in the intended reception of the message;
determining a plurality of distances between the point and each of a plurality of other devices from which the first device previously has received the message; and
retransmitting the message when the first distance is less than each of the plurality of distances.

17. The first device of claim 11, the operations further comprising:
determining if the second device has received the message at least a predetermined number of times; and
when it is determined that the second device has not received the message at least the predetermined number of times, retransmitting the message.

18. A first device comprising:
a processor; and memory coupled to the processor, the memory comprising executable instructions that when executed by the processor cause the processor to effectuate operations comprising:
broadcasting a query, the query comprising a description of a region of intended reception of the query;
receiving, in response to the query, a plurality of response messages indicative of determinations that each of a plurality of devices receiving the plurality of response messages is within the region and not closer to a center point of the region than the first device, wherein each determination is made by a different device of the plurality of devices, wherein each response message of the plurality of response messages comprises at least one of an indication of a speed at which the respective device of the plurality of devices receiving the query is moving, an indication of a direction in which the respective device of the plurality of devices receiving the query is moving, or a location of the respective device of the plurality of devices receiving the query; and rendering an indication of at least one of the plurality of response messages.

19. The first device of claim 18, wherein the first device is located in a vehicle.

20. The first device of claim 18, the operation further comprising rendering an indication of the at least one response messages overlaid with a geographic map of a location of at least one of the devices of the plurality of devices receiving the query.

* * * * *